United States Patent
Gotou et al.

(10) Patent No.: US 7,866,455 B2
(45) Date of Patent: Jan. 11, 2011

(54) CLUTCH, MOTOR DEVICE, AND VEHICLE DOOR OPENING AND CLOSING APPARATUS

(75) Inventors: Chikara Gotou, Kosai (JP); Tomoaki Ozaki, Kosai (JP); Satoshi Ohta, Kosai (JP); Masaaki Shimizu, Kosai (JP)

(73) Assignee: ASMO Co., Ltd. (JP)

( * ) Notice: Subject to any disclaimer, the term of this patent is extended or adjusted under 35 U.S.C. 154(b) by 177 days.

(21) Appl. No.: 12/137,921

(22) Filed: Jun. 12, 2008

(65) Prior Publication Data

US 2008/0245636 A1   Oct. 9, 2008

Related U.S. Application Data

(63) Continuation-in-part of application No. 11/697,215, filed on Apr. 5, 2007, now Pat. No. 7,780,221.

(30) Foreign Application Priority Data

| Apr. 6, 2006 | (JP) | 2006-105222 |
| Apr. 6, 2006 | (JP) | 2006-105223 |
| Nov. 1, 2006 | (JP) | 2006-297948 |
| Oct. 26, 2007 | (JP) | 2007-279316 |

(51) Int. Cl.
F16D 43/22 (2006.01)
F16D 43/28 (2006.01)
F16D 41/10 (2006.01)

(52) U.S. Cl. .................. 192/38; 192/54.52; 192/55.61; 192/105 BA

(58) Field of Classification Search .................. 192/38, 192/54.52, 105 A
See application file for complete search history.

(56) References Cited

U.S. PATENT DOCUMENTS 3,414,097 A * 12/1968 Denkowski .................. 192/38
3,505,888 A *  4/1970 Denkowski .................. 192/38

(Continued)

FOREIGN PATENT DOCUMENTS

JP   2002327576   11/2002

OTHER PUBLICATIONS

Notice of Allowance, dated May 27, 2010, issued in connection with U.S. Appl. No. 11/697,215.

*Primary Examiner*—Rodney H Bonck
(74) *Attorney, Agent, or Firm*—Fulwider Patton LLP

(57) ABSTRACT

When a drive shaft is in a non-drive state, a second drive rotor is in a non-engaged state with a driven rotor with respect to its own rotating direction. When the drive shaft is in a drive state, a rotating force of a first drive rotor is transmitted to the second drive rotor through an urging member. As a result, a power transmitting member revolves, and a centrifugal force arranges the power transmitting member at a second clamping position. The second drive rotor receives a reaction force from a driven rotor via the power transmitting member. As a result, the second drive rotor is relatively rotated in an opposite direction to a rotating direction of the first drive rotor with respect to the first drive rotor, against an urging force of the urging member. As a result, the first drive rotor is engaged with the driven rotor with respect to its own rotating direction. Accordingly, the clutch is stably operated.

5 Claims, 28 Drawing Sheets

U.S. PATENT DOCUMENTS

| | | |
|---|---|---|
| 3,768,611 A | 10/1973 | Frederickson |
| 3,893,553 A | 7/1975 | Hansen |
| 3,971,463 A | 7/1976 | Zindler |
| 4,866,458 A | 9/1989 | Kimura |
| 5,437,356 A | 8/1995 | Lohr |
| 5,495,904 A | 3/1996 | Zwaan |
| 5,503,261 A | 4/1996 | Schultz |
| 6,000,512 A * | 12/1999 | Cronin et al. .................. 192/38 |
| 6,242,824 B1 | 6/2001 | Torii |
| 6,516,929 B1 * | 2/2003 | Baniak et al. .................. 192/38 |
| 6,700,245 B2 * | 3/2004 | Yamamura et al. ............ 192/38 |
| 7,021,446 B2 | 4/2006 | Edwards |
| 2007/0283628 A1 * | 12/2007 | Gotou et al. .................. 49/360 |

* cited by examiner

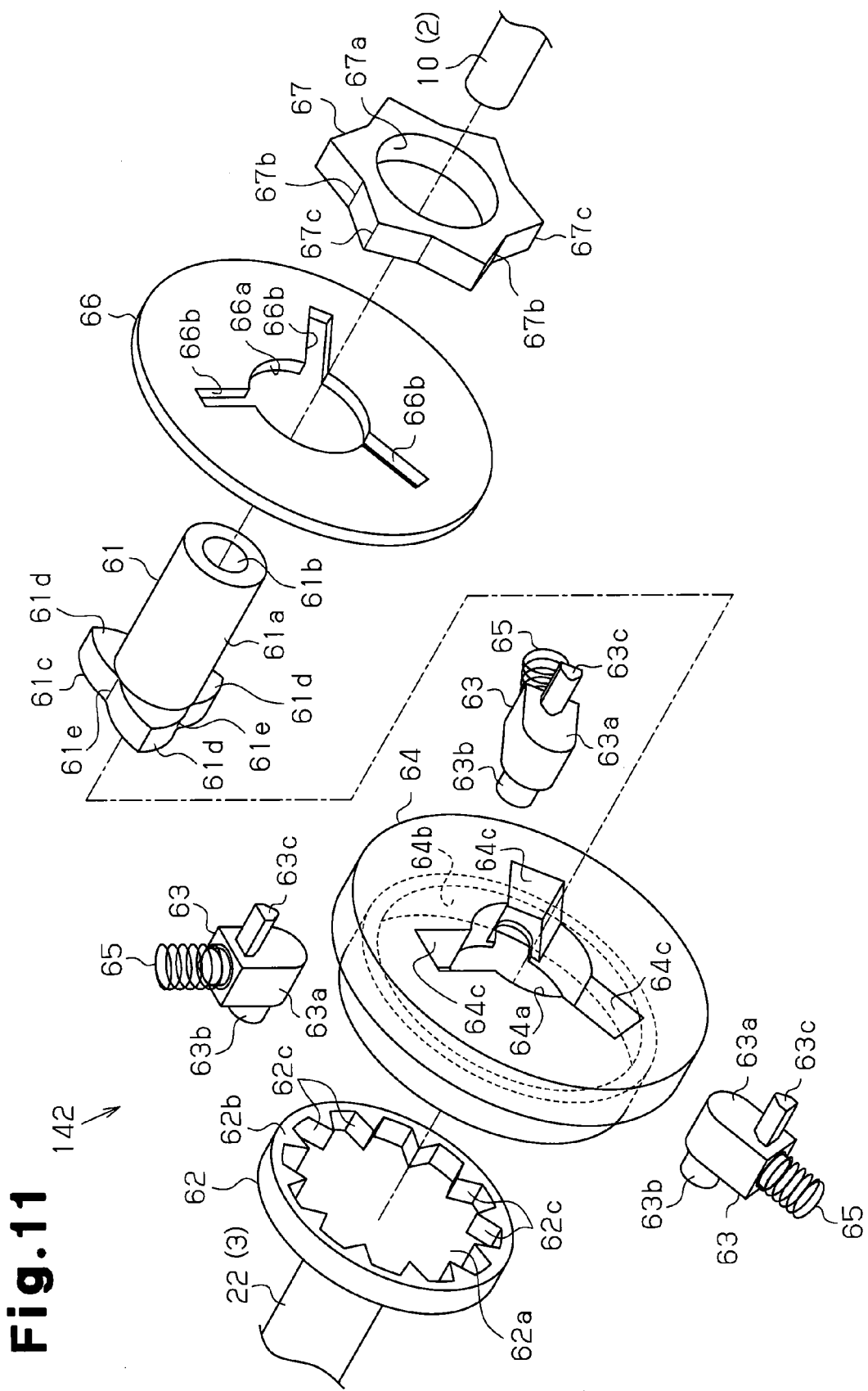

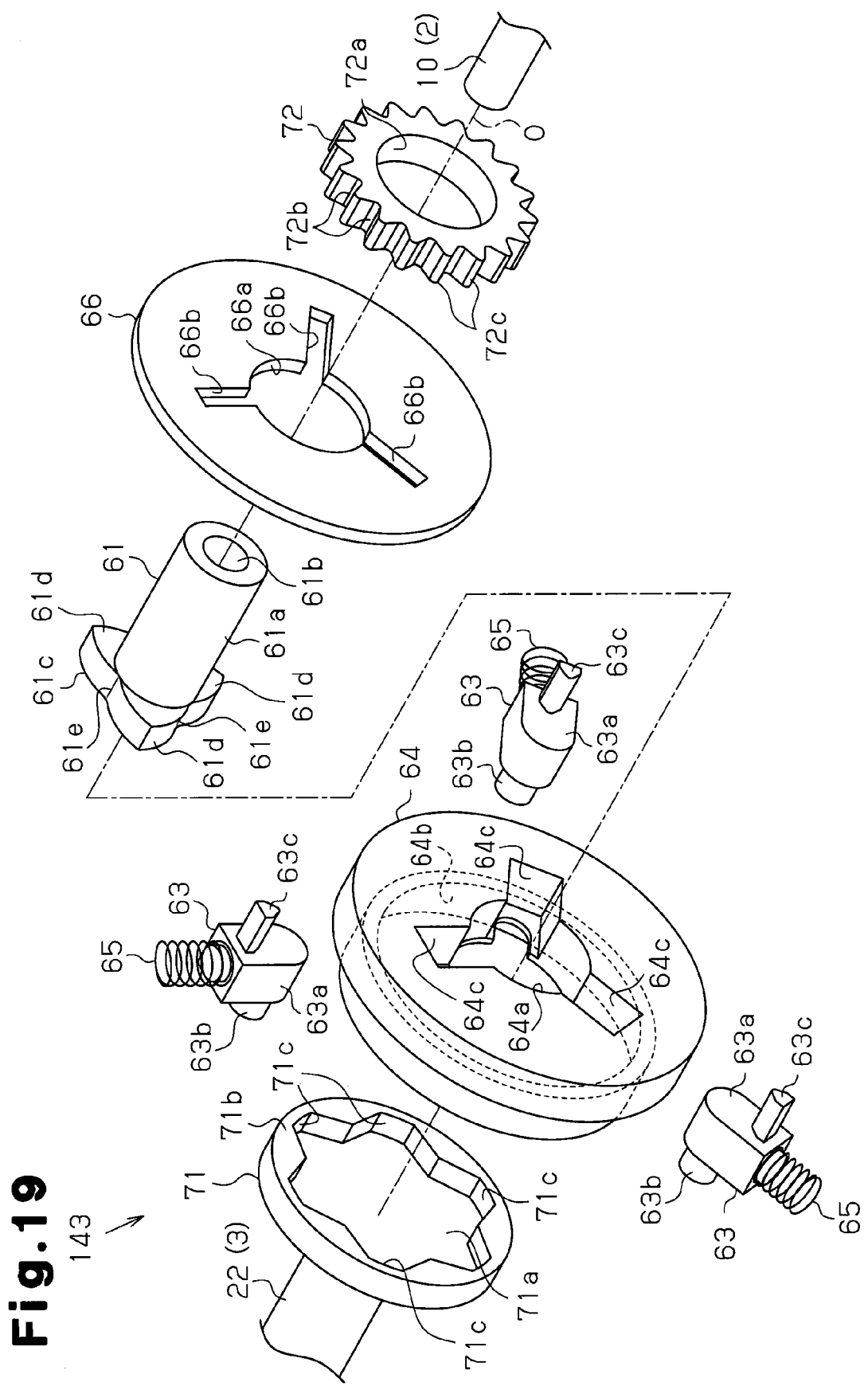

CLUTCH, MOTOR DEVICE, AND VEHICLE DOOR OPENING AND CLOSING APPARATUS

CROSS REFERENCE TO RELATED APPLICATION

This application is a continuation-in-part of pending U.S. patent application Ser. No. 11/697,215, filed Apr. 5, 2007, entitled "CLUTCH, MOTOR DEVICE, AND VEHICLE DOOR OPENING AND CLOSING APPARATUS", the entire content of which is incorporated herein by reference.

BACKGROUND OF THE INVENTION

The invention relates to a clutch, a motor provided with the clutch, and a vehicle door opening and closing apparatus provided with the motor. The vehicle door opening and closing apparatus includes a vehicle slide door opening and closing apparatus and a vehicle backdoor opening and closing apparatus. The motor can serve as a drive source of the vehicle door opening and closing apparatus.

In recent years, there have been cases in which a motor vehicle has a slide door opening and closing apparatus. The slide door opening and closing apparatus has a motor device serving as a drive source for driving a slide door. The slide door opens and closes a door opening provided in a side portion of a vehicle body. The motor device is provided with a motor main body having a stator and an armature, and a speed reducing mechanism decelerating a rotation output by the motor main body. An output from the speed reducing mechanism drives the slide door.

It is necessary that the slide door opening and closing apparatus allow the slide door to open and close in accordance with a manual operation. Japanese Laid-Open Patent Publication No. 2002-327576 proposes a door opening and closing apparatus equipped with an electromagnetic clutch in an output shaft extending from the speed reducing mechanism.

In the publication mentioned above, when the motor device drives the slide door, the electromagnetic clutch is turned on. Accordingly, the electromagnetic clutch couples a rotating shaft extending from the armature to a worm wheel. Therefore, a rotating force output from the motor main body is transmitted to the worm wheel, and the slide door is automatically opened and closed in accordance with an electric motor control. In the case of manually operating the slide door, the electromagnetic clutch is turned off. Accordingly, the electromagnetic clutch shuts off the rotating shaft from the worm wheel, and allows the manual operation of the slide door.

However, it is complicated to arrange a wiring for supplying electricity to the electromagnetic clutch. Therefore, a mechanical clutch is desired. The mechanical clutch is demanded to be stably actuated at a time of coupling a drive shaft to a driven shaft and at a time of shutting off the drive shaft from the driven shaft.

SUMMARY OF THE INVENTION

An objective of the present invention is to provide a stably operating clutch, a motor using the clutch, and a vehicle door opening and closing apparatus provided with the motor.

In accordance with one aspect of the present invention, there is provided a clutch arranged between a drive shaft and a driven shaft. The driven shaft is arranged coaxially with the drive shaft. When the drive shaft is in a drive state, the clutch couples the drive shaft to the driven shaft. When the drive shaft is in a non-drive state, the clutch shuts off the driven shaft from the drive shaft. The clutch includes a first drive rotor which is integrally rotatable with the drive shaft. The first drive rotor is arranged coaxially with the drive shaft. The clutch includes a second drive rotor provided coaxially with the first drive rotor, and an urging member arranged between the first drive rotor and the second drive rotor. The urging member holds the second drive rotor at a predetermined relative rotational position with respect to the first drive rotor. The clutch includes a driven rotor which is integrally rotatable with the driven shaft. The driven rotor is arranged coaxially with the driven shaft. A power transmitting member is arranged between the first drive rotor and the driven rotor, and between the second drive rotor and the driven rotor, with respect to a radial direction. The power transmitting member is movable among a first clamping position, a second clamping position and a non-engaging position. The non-engaging position exists in an inner side in a radial direction than the first clamping position and the second clamping position. The first drive rotor and the driven rotor clamps the power transmitting member located at the first clamping position. The second drive rotor and the driven rotor clamp the power transmitting member located at the second clamping position. The first drive rotor and the driven rotor do not clamp the power transmitting member located at the non-engaging position. The second drive rotor and the driven rotor do not clamp the power transmitting member located at the non-engaging position. When the drive shaft is in a non-drive state, the power transmitting member exists at the non-engaging position. As a result, the second drive rotor is in a non-engaging state with the driven rotor with respect to its own rotating direction. When the drive shaft is in a drive state, a rotating force of the first drive rotor is transmitted to the second drive rotor through the urging member. As a result, the second drive rotor is rotated, and the power transmitting member revolves accordingly. A centrifugal force caused by the revolution arranges the power transmitting member at the second clamping position. The second drive rotor receives a reaction force from the driven rotor via the power transmitting member. As a result, the second drive rotor is relatively rotated in an opposite direction to the rotating direction of the first drive rotor with respect to the first drive rotor, against the urging force of the urging member. The power transmitting member is arranged at the first clamping position. As a result, the first drive rotor is engaged with the driven rotor with respect to its own rotating direction.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

FIG. 11 is an exploded perspective view of the second clutch shown in FIG. 10;

FIGS. 13A to 17A are cross-sectional views showing operations of the drive disc, the driven rotor, and the first contact protrusion shown in FIG. 12A;

FIGS. 13B to 17B are cross-sectional views showing operations of the fixed gear, and the second contact protrusion shown in FIG. 12B;

FIG. 19 is an exploded perspective view of the third clutch shown in FIG. 18;

FIGS. 21A to 25A are cross-sectional views showing operations of the drive disc, the driven rotor and the first contact protrusion shown in FIG. 20A;

FIGS. 21B to 25B are cross-sectional views showing operations of the fixed gear and the second contact protrusion shown in FIG. 20B;

FIGS. 30A to 32A are side elevational views explaining an operation of the fourth clutch shown in FIG. 29A; and FIGS. 30B to 32B are cross-sectional views explaining the operation of the fourth clutch shown in FIG. 29B.

DETAILED DESCRIPTION OF PREFERRED EMBODIMENTS

A description will be given below of a first embodiment of the present invention with reference to FIGS. 1 to 8.

Figure 1:
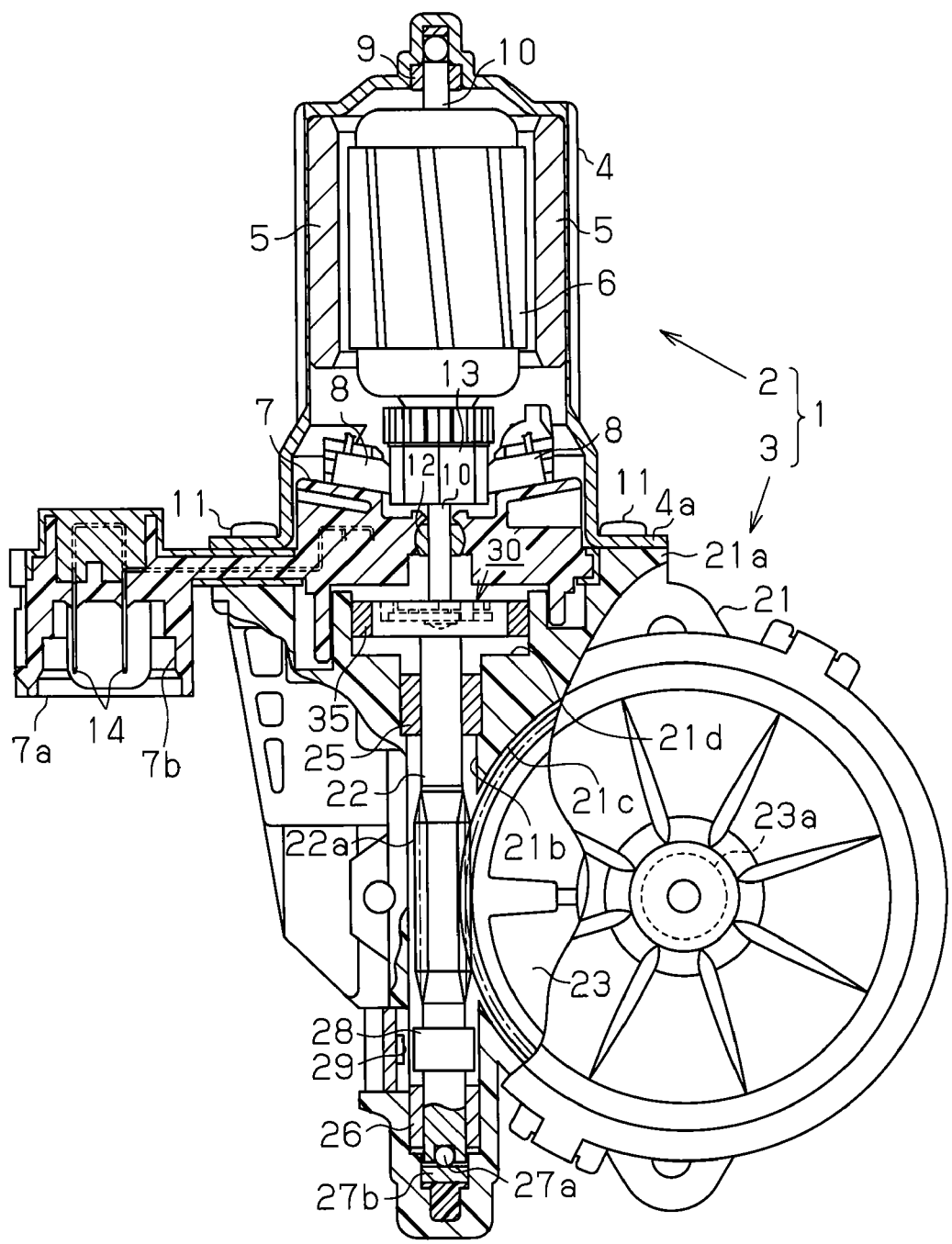
FIG. 1 is a vertical cross-sectional view of a motor device including a first clutch in accordance with a first embodiment of the present invention.
Figure 8:
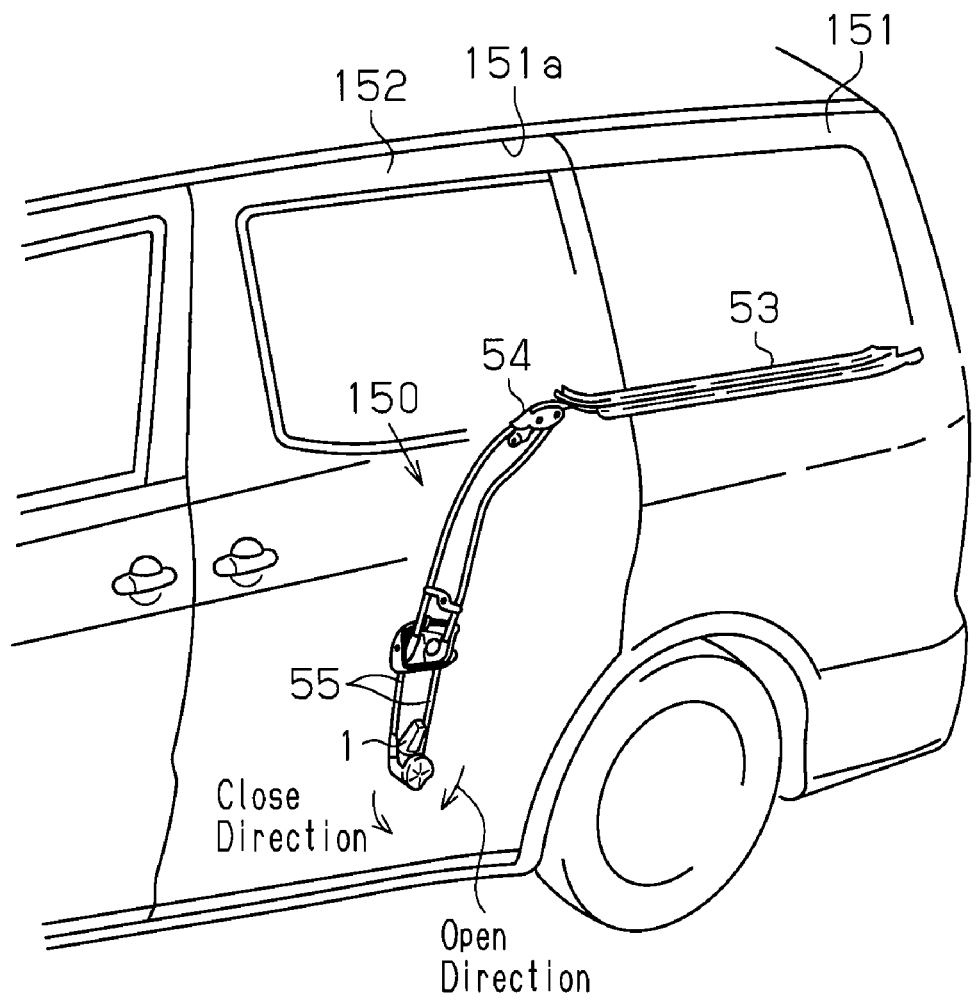
FIG. 8 is a schematic perspective view of a slide door opening and closing apparatus including the motor device shown in FIG. 1.

FIG. 1 shows a motor device 1 in accordance with a first embodiment. FIG. 8 shows a door opening and closing apparatus 150 mounted to a motor vehicle. The motor device 1 serves as a drive source of the door opening and closing apparatus 150 operating a slide door 152. As shown in FIG. 8, a side surface of a vehicle body 151 has a door opening 151a corresponding to an opening, a guide rail 53, and a slide door 152 opening and closing the door opening 151a. A coupler 54 supports the slide door 152 with respect to a guide rail 53. The door opening and closing apparatus 150 is arranged in an inner portion of the slide door 152. The motor device 1 takes up or discharge a wire cable 55 with respect to the coupler 54. As a result, the slide door 152 moves along the guide rail 53.

As shown in FIG. 1, the motor device 1 has a motor main body 2, and a speed reducing mechanism 3 decelerating a rotation output from the motor main body 2. The motor main body 2 serving as a geared motor is provided with a yoke housing 4, a pair of magnets 5, an armature 6, a brush holder 7, and a pair of brushes 8. The armature 6 is provided with a rotary shaft 10, and a commutator 13 firmly attached to the rotary shaft 10.

The yoke housing 4 is formed in a flat closed-end cylindrical shape. The magnet 5 is firmly attached to an inner surface of the yoke housing 4. A first bearing 9 is arranged in a center of a bottom portion of the yoke housing 4. The first bearing 9 rotatably supports the rotary shaft 10 serving as the drive shaft. The motor device 1 has a first bearing 9, a second bearing 12, a third bearing 25, and a fourth bearing 26 in the order facing the speed reducing mechanism 3 from the motor main body 2. The first bearing 9 and the second bearing 12 rotatably support the rotary shaft 10. The third bearing 25 and the fourth bearing 26 rotatably support a worm shaft 22 in the speed reducing mechanism 3. A fifth bearing 35 is positioned between the second bearing 12 and the third bearing 25. The rotary shaft 10 serves as a drive shaft. The worm shaft 22 serves as a driven shaft. The worm shaft 22 can also serve as an input shaft in the speed reducing mechanism 3.

The yoke housing 4 has a flange-shaped yoke opening portion 4a. The speed reducing mechanism 3 has a gear housing 21 made of a resin. The gear housing 21 has a gear opening portion 21a facing the yoke opening portion 4a. The yoke opening portion 4a is fixed to the gear opening portion 21a by a plurality of screws 11. The yoke opening portion 4a and the gear opening portion 21a clamp the brush holder 7. The brush holder 7 and the gear housing 21 can serve as a mounted body to which the fifth bearing 35 can be attached.

The brush holder 7 holds the second bearing 12 and a pair of brushes 8. The second bearing 12 rotatably supports a distal end of the rotary shaft 10 within the yoke housing 4. The brush 8 is brought into slidable contact with the commutator 13. The brush holder 7 has a motor connector 7a. The motor connector 7a protrudes from both of the yoke housing 4 and the gear housing 21. The motor connector 7a is coupled to a vehicle body side connector (not shown) extending from a vehicle body. The motor connector 7a is provided with a recess 7b, and a plurality of terminals 14 exposing to an inner portion of the recess 7b. The terminals 14 are inserted to the brush holder 7. The respective terminals 14 are electrically connected to the corresponding brush 8 and Hall element 29.

The Hall element 29 serves as a rotary sensor provided in an inner portion of the motor device 1. The motor connector 7a is coupled to a vehicle body side connector, whereby the motor device 1 is electrically connected to a controller (not shown) serving as a motor control device provided in the vehicle body. Accordingly, a power supply is executed to the motor device 1 from the vehicle body. An output of a sensor signal is executed between the vehicle body and the motor device 1.

The speed reducing mechanism 3 is provided with a worm shaft 22, a worm wheel 23, an output shaft 23a and a first clutch 30. The gear housing 21 accommodates the worm shaft 22, the worm wheel 23 and the first clutch 30.

The gear housing 21 is provided with a shaft accommodating cylinder 21b, a wheel accommodating recess 21c, and a clutch accommodating recess 21d. The shaft accommodating cylinder 21b is formed in a cylindrical shape extending in an axial direction from the gear opening portion 21a for accommodating the worm shaft 22. The wheel accommodating recess 21c communicates the shaft accommodating cylinder 21b for accommodating the worm wheel 23. The clutch accommodating recess 21d is formed in the shaft accommodating cylinder 21b in such a manner as to be adjacent to the motor main body 2 for accommodating the first clutch 30.

The shaft accommodating cylinder 21b has the third bearing 25 and the fourth bearing 26. The third bearing 25 rotatably supports a first end of the worm shaft 22, and the fourth bearing 26 rotatably supports a second end of the worm shaft 22. The worm shaft 22 has a worm portion 22a positioned between the third bearing 25 and the fourth bearing 26. The worm shaft 22 is inserted to the shaft accommodating cylinder 21b from an opening of the shaft accommodating cylinder 21b. The worm shaft 22 is arranged coaxially with the rotary shaft 10. The second end of the worm shaft 22 is provided with a thrust bearing ball 27a receiving a thrust load of the worm shaft 22 and a plate 27b. The thrust bearing ball 27a reduces a rotary load of the output shaft 23a by making a rotary load of the worm shaft 22 small.

A ring-shaped sensor magnet 28 is firmly attached to the worm shaft 22 in such a manner as to be integrally rotatable. The sensor magnet 28 is positioned between the worm portion 22a and the fourth bearing 26. The sensor magnet 28 is multipolar magnetized in a circumferential direction. The Hall element 29 is arranged in the shaft accommodating cylinder 21b. The Hall element 29 faces an outer circumferential surface of the sensor magnet 28. The Hall element 29 detects a rotation information such as a rotational position and a rotating speed of the worm shaft 22, by detecting a magnetic field change accompanying with the rotation of the sensor magnet 28. In other words, the Hall element 29 detects an opening and closing position and an opening and closing speed of the slide door 152.

The worm wheel 23 engaged with the worm portion 22a is rotatably accommodated in the wheel accommodating recess 21c. The output shaft 23a is coupled to the worm wheel 23 in such a manner as to be integrally rotated. A drive pulley (not shown) around which a wire cable 55 for actuating so as to open and close the slide door 152 is wound is coupled to the output shaft 23a in such a manner as to be integrally rotated.

The first clutch 30 mechanically switches between a state in which the worm shaft 22 is shut off from the rotary shaft 10, and a state in which the rotary shaft 10 is coupled to the worm shaft 22. As shown in FIGS. 2 to 5, the first clutch 30 includes a first drive rotor 31, a driven cylinder 32, three roller members 33, and a second drive rotor 34. The first drive rotor 31 serving as a drive coupling body is coupled to the rotary shaft 10. The driven cylinder 32 serves as a driven rotor coupled to the worm shaft 22. Each of the roller members 33 serves as a power transmitting member arranged between the first drive rotor 31 and the driven cylinder 32. The second drive rotor 34 serves as an intermediate plate.

The first drive rotor 31 is integrally formed in a distal end of the rotary shaft 10. The structure is not limited to this, but the first drive rotor 31 may be formed as an independent member from the rotary shaft 10, and may be structured such as to couple the first drive rotor 31 to the rotary shaft 10. The disc-shaped first drive rotor 31 is arranged coaxially with the rotary shaft 10. The first drive rotor 31 is provided with three first drive surfaces 31a having the same shape at an equal interval (at an interval of 120 degrees) in a circumferential direction. Each of three first drive surfaces 31a serving as a control surface is formed in a V shape which is recessed shallowly to an inner side in a radial direction from an outer circumferential surface of the first drive rotor 31. Each of the first drive surfaces 31a includes a pair of first drive inclined surfaces 31b serving as a pair of first clamping surfaces. A pair of first drive inclined surfaces 31b are symmetrical with each other with respect to a radial line extending in a radial direction from a rotation center O of the rotary shaft 10 and the worm shaft 22. An angle between a pair of first drive inclined surfaces 31b, that is, a center angle of the first drive surface 31a is larger than 60 degrees.

Figure 4:
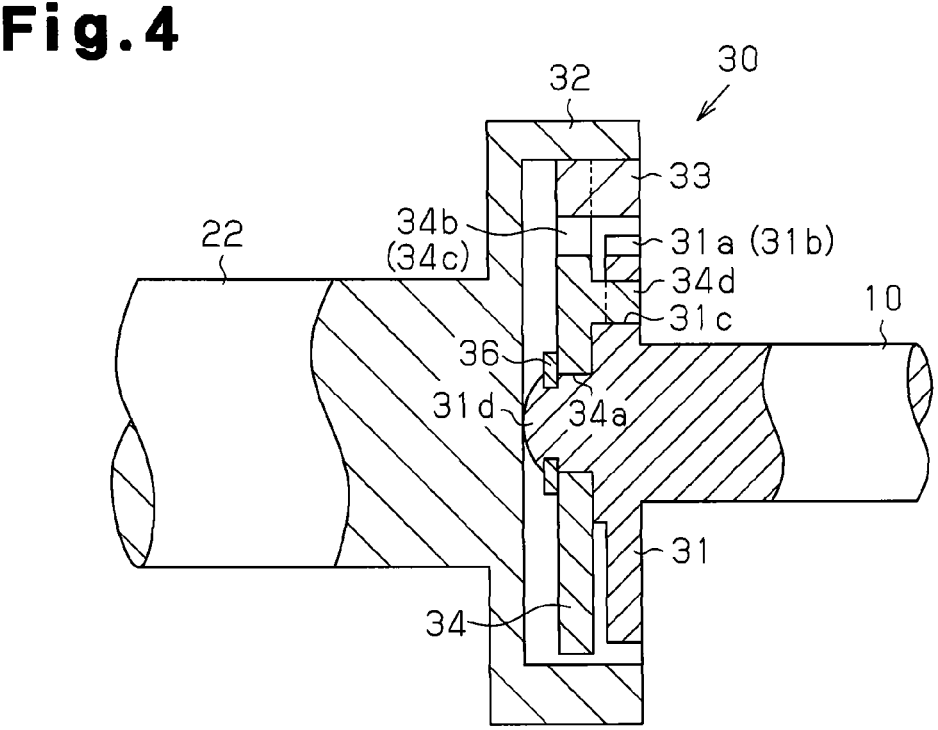
FIG. 4 is a vertical cross-sectional view of the first clutch shown in FIG. 2.

An outer circumferential surface of the first drive rotor 31 has three guide grooves 31c having the same shape and an equal interval on a concentric circle around the rotation center O. Each of the guide grooves 31c is formed in an arcuate shape extending in a circumferential direction, and corresponds to each of the first drive surfaces 31a. A radial dimension, that is, a width of the guide groove 31c is constant over the circumferential direction. As shown in FIG. 4, a shaft support portion 31d is extended toward the worm shaft 22 from the first drive rotor 31. The shaft support portion 31d is formed in a columnar shape which is coaxial with the rotary shaft 10. A distal end surface of the shaft support portion 31d is formed in a semispherical shape. The shaft support portion 31d has a groove to which a lock ring 36 is fitted.

Figure 2:
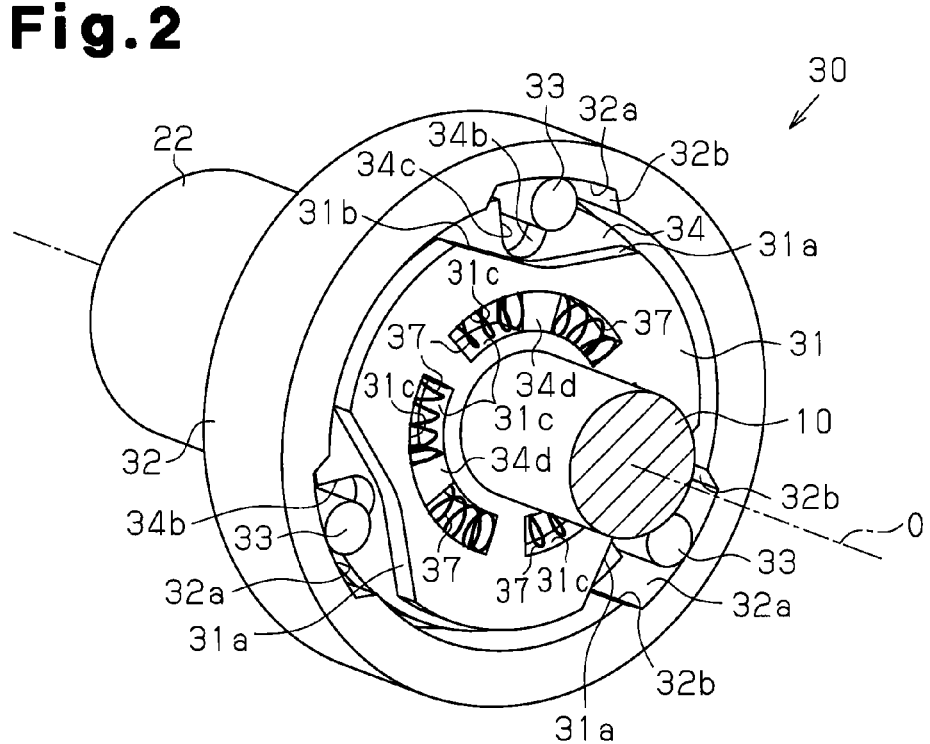
FIG. 2 is a perspective view of the first clutch shown in FIG. 1.
Figure 3:
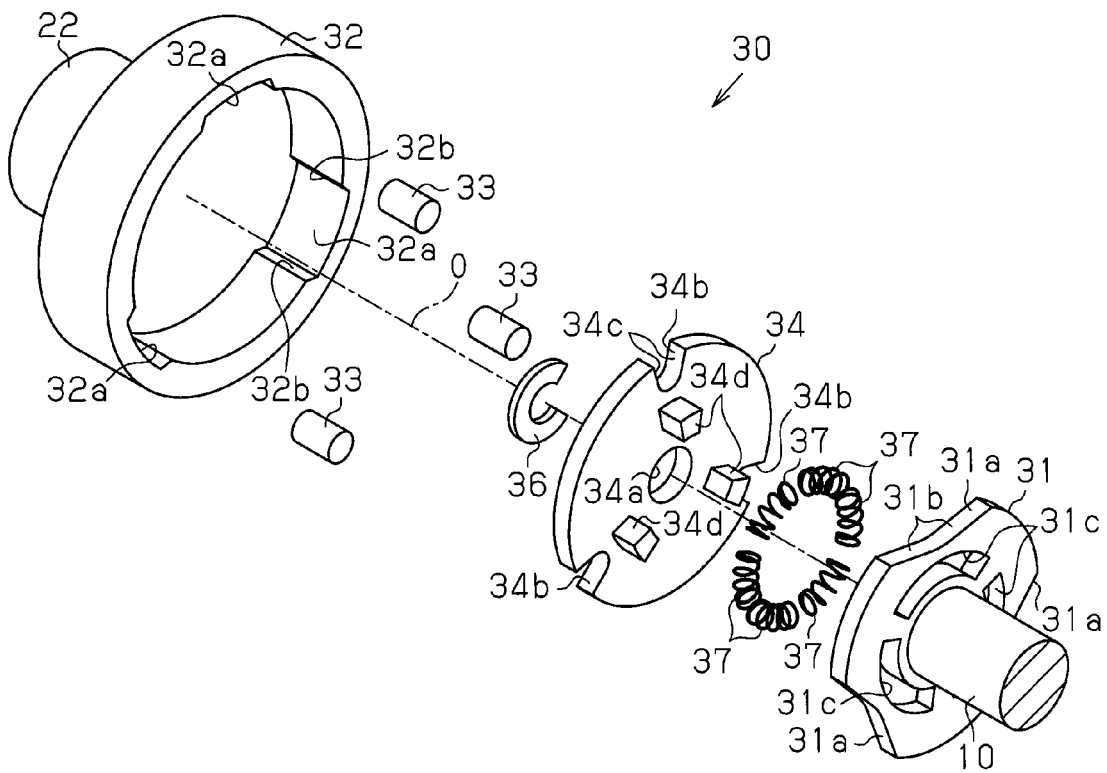
FIG. 3 is an exploded perspective view of the first clutch shown in FIG. 2.

As shown in FIG. 3, the driven cylinder 32 is integrally formed in an end portion of the worm shaft 22. The driven cylinder 32 may be structured detachable from the worm shaft 22 by modifying the structure mentioned above. The driven cylinder 32 is arranged coaxially with the worm shaft 22. As shown in FIG. 2, the first drive rotor 31 is arranged in an inner portion of the driven cylinder 32. An inner circumferential surface of the driven cylinder 32 faces the first drive surface 31a. Three driven recesses 32a are provided in the inner circumferential surface of the driven cylinder 32 at a uniform interval in the circumferential direction. Each of the driven recesses 32a is open so as to be spread toward an inner side in a radial direction, and is formed in the same shape with each other. The center angle of the driven recess 32a is smaller than 60 degrees. Each of both side walls of the driven recess 32a serves as a driven inclined surface 32b corresponding to a driven clamping surface. A pair of driven inclined surfaces 32b are symmetrical with each other with respect to a radial line extending in a radial direction from the rotation center O. The driven cylinder 32 is rotatably supported to the gear housing 21 by the fifth bearing 35 positioned in the clutch accommodating recess 21d.

Three roller members 33 are formed in a columnar shape extending in the axial direction of the rotary shaft 10, and are formed in the same shape with each other.

Figure 5:
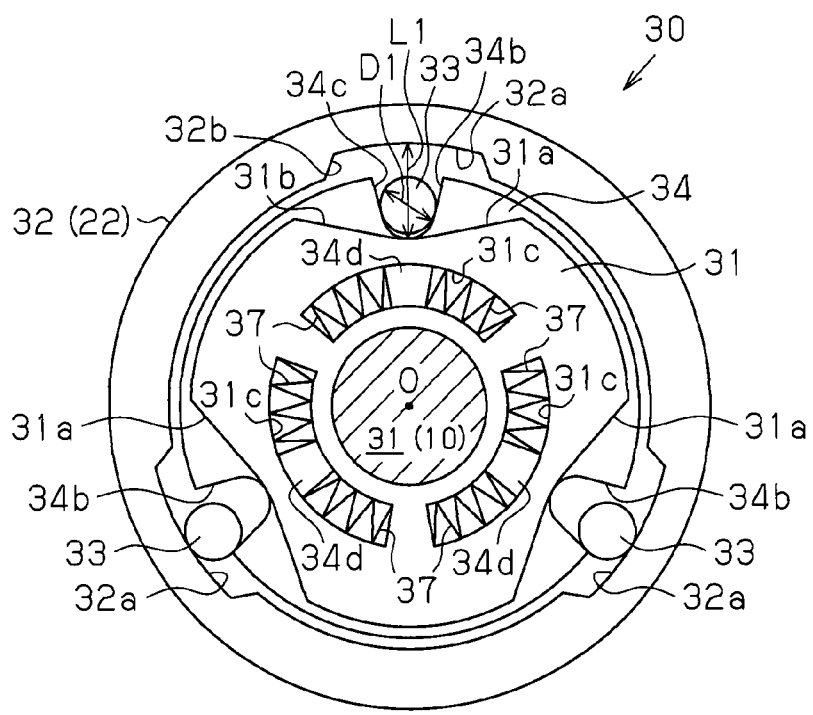
FIG. 5 is a plan view of the first clutch shown in FIG. 2.

The second drive rotor 34 is formed in a disc shape having the same diameter as the first drive rotor 31. A center portion of the second drive rotor 34 has a support hole 34a. The lock ring 36g is locked to the shaft support portion 31d passing through the support hole 34a, whereby the second drive rotor 34 is supported to the first drive rotor 31 so as to be relatively rotatable. The lock ring 36g prevents the second drive rotor 34 from falling away from the first drive rotor 31. An outer circumferential surface of the second drive rotor 34 has three second drive recesses 34b at a uniform interval in the circumferential direction. Each of the second drive recesses 34b is formed in a U shape extending to an inner side in a radial direction, and has the same shape with each other. Each of the second drive recesses 34b has a depth capable of accommodating the entire roller member 33. As shown in FIG. 5, the depth of the second drive recess 34b is equal to or more than a diameter D1 of the roller member 33. In other words, each of the second drive recesses 34b can accommodate the roller member 33 in such a manner as to prevent from protruding to an outer side in a radial direction from the outer circumferential surface of the second drive rotor 34. A position in a radial direction of the bottom portion of the second drive recess 34b is equal to the center of the V shape of the first drive surface 31a.

The second drive recess 34b is defined by a pair of second drive inclined surface 34c corresponding to a pair of side surfaces positioned in both sides of the second drive recess 34b. Each of the second drive inclined surfaces 34c serves as a second clamping surface. A pair of second drive inclined surfaces 34c are symmetrical with each other with respect to a radial line extending in a radial direction from the rotation center O. Each of the second drive recesses 34b accommodates the roller member 33.

Figure 6:
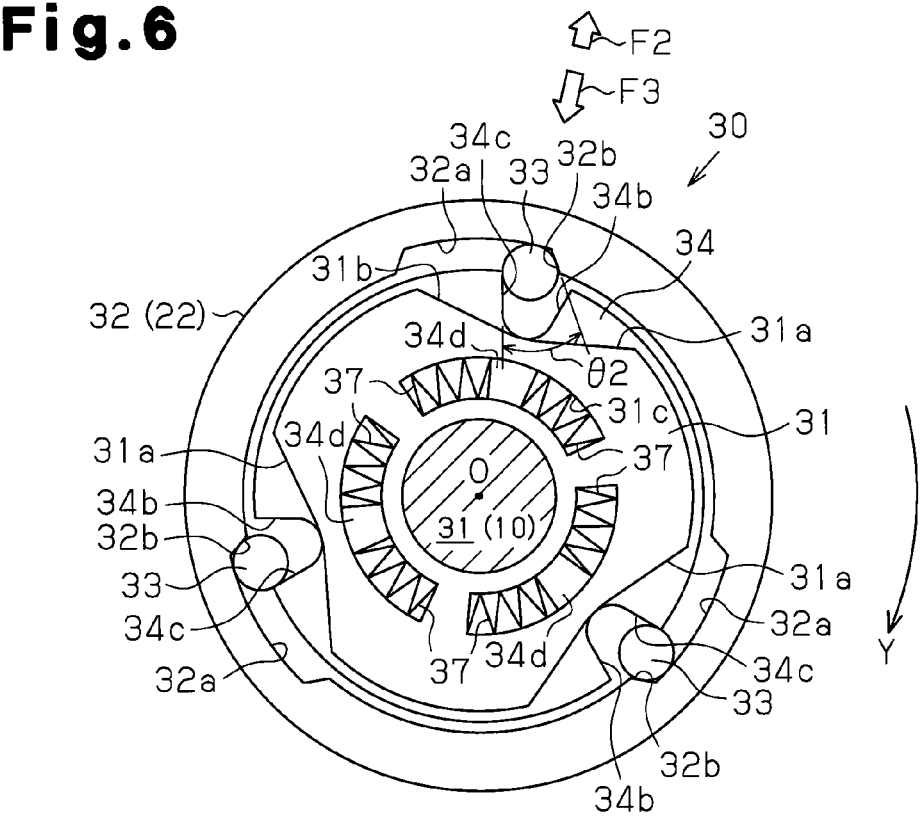
FIGS. 6 and 7 are plan views explaining an operation of the clutch shown in FIG. 5.
Figure 7:
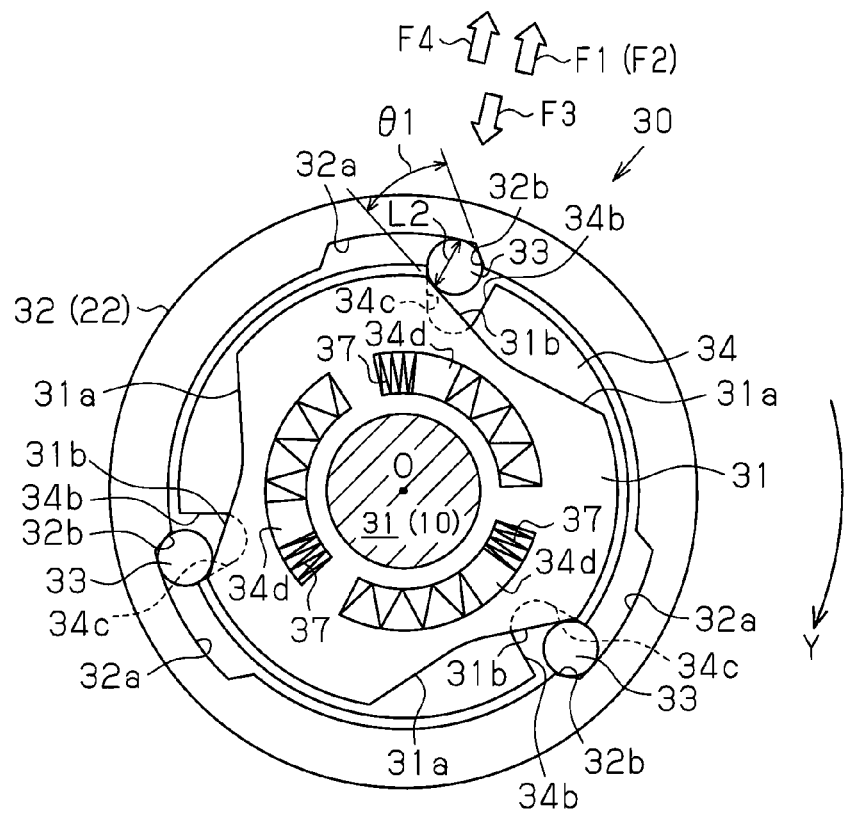

Each of the roller members 33 is movable in a radial direction in the second drive recess 34b. The roller member 33 can move between an engaging position which can be engaged with the driven inclined surface 32b, and a non-engaging position which is not engaged with the driven inclined surface 32b. FIGS. 4, 6 and 7 show the roller member 33 located at the engaging position. FIG. 5 shows the roller member 33 located at the non-engaging position. The non-engaging position is positioned in an inner side in the radial direction than the engaging position. In a state in which the whole of the roller member 33 is accommodated in the second drive recess 34b, the roller member 33 is positioned at the non-engaging position, and is not positioned within the driven recess 32a. A part of the roller member 33 at the engaging position is positioned within the driven recess 32a.

The second drive rotor 34 has three square pole shaped insertion projections 34d extending in an axial direction, at a uniform interval in a circumferential direction. Each of the insertion projections 34d is inserted to the guide groove 31c. When each of the insertion projections 34d is positioned at the center in the circumferential direction of the corresponding guide groove 31c, each of the second drive recesses 34b is positioned at the center of the V shape of the corresponding first drive surface 31a. Each of the guide grooves 31c accommodates a pair of coil springs 37 serving as an urging member in both sides of the insertion projection 34d. A pair of coil springs 37 applies an elastic force acting to hold the insertion projection 34d at the center in the circumferential direction of the guide groove 31c to the insertion projection 34d. The state in which the insertion projection 34d is positioned at the center in the circumferential direction of the guide groove 31c is referred to as "the second drive rotor 34 exists at a predetermined relative rotational position with respect to the driven cylinder 32". In other words, a pair of coil springs 37 in each of the guide grooves 31c acts to hold the second drive rotor 34 at the predetermined relative rotational position with respect to the driven cylinder 32.

As shown in FIG. 5, a first interval L1 corresponding to an interval between the center of the V shape of the first drive surface 31a and a bottom portion of the driven recess 32a is larger than a diameter D1 of the roller member 33. As shown in FIG. 7, a second interval L2 corresponding to an interval between an end portion of the first drive surface 31a and the bottom portion of the driven recess 32a is smaller than the diameter D1. FIG. 7 rhetorically shows the second interval L2 so as to be easily viewed.

As shown in FIG. 5, when the roller member 33 is positioned at the center of the V shape of the first drive surface 31a, a gap is generated between the roller member 33 and the first drive inclined surface 31b. In other words, the first drive rotor 31 and the driven cylinder 32 do not clamp the roller member 33. As a result, the first drive rotor 31 is not engaged with the driven cylinder 32 with respect to the rotating direction. Accordingly, the rotary shaft 10 is in a shut-off state from the worm shaft 22.

As shown in FIG. 7, when the roller member 33 is positioned at the end of the first drive surface 31a, the first drive inclined surface 31b and the driven inclined surface 32b clamp the roller member 33. As a result, the first drive rotor 31 is engaged with the driven cylinder 32 with respect to the rotating direction. Accordingly, the rotary shaft 10 is in a coupled state to the worm shaft 22.

As shown in FIG. 7, when the first drive inclined surface 31b and the driven inclined surface 32b clamp the roller member 33, a first angle θ1 formed by the first drive inclined surface 31b and the driven inclined surface 32b is spread to an outer side in the radial direction in the first clutch 30. In FIG. 7, a clockwise direction is set to a relative rotating direction Y of the first drive rotor 31 with respect to the driven cylinder 32. If the first drive rotor 31 is rotated in the rotating direction Y, the first drive inclined surface 31b applies a first outer urging force F1 directed toward an outer side in the radial direction of the first clutch 30 to the roller member 33. The first outer urging force F1 is a pressing force for urging the roller member 33 toward the driven recess 32a.

FIG. 6 shows a rotational position of the first drive rotor 31 in a step prior to the step of FIG. 7. In other words, in a step prior to a step by which the first drive inclined surface 31b and the driven inclined surface 32b clamp the roller member 33, there is a case that the second drive inclined surface 34c and the driven inclined surface 32b clamp the roller member 33. In this case, a second angle θ2 formed by the second drive inclined surface 34c and the driven inclined surface 32b is spread to an inner side in a radial direction in the first clutch 30. In this case, if the second drive rotor 34 is relatively rotated in the rotating direction Y with respect to the driven cylinder 32, the driven inclined surface 32b applies an inner urging force F3 directed toward the inner side in the radial direction to the roller member 33. The inner urging force F3 corresponds to a pressing force for urging the roller member 33 toward the second drive recess 34b. The second drive inclined surface 34c urges a second outer urging force F2 directed toward an outer side in the radial direction to the roller member 33. The second outer urging force F2 corresponds to a pressing force for urging the roller member 33 facing the driven recess 32a.

As shown in FIG. 5, at a time when the motor main body 2 is not driven, that is, when a rotational driving force is not generated in the rotary shaft 10, the second drive recess 34b is positioned at the center of the V shape of the first drive surface 31a, on the basis of an elastic force of the coil spring 37.

A description will be given below of an operation of the first clutch 30.

When the slide door 152 is opened and closed in accordance with a manual operation, the output shaft 23a is rotated by moving the slide door 152, and the worm shaft 22 is rotated. As shown in FIG. 5, when the roller member 33 exists at the non-engaging position, the driven cylinder 32 is not engaged with the first drive rotor 31 and the second drive rotor 34 with respect to the rotating direction. As shown in FIG. 6, even if the driven inclined surface 32b and the second drive inclined surface 34c clamp the roller member 33, the inner urging force F3 presses the roller member 33 toward the non-engaging position. Accordingly, the roller member 33 enters the second drive recess 34b.

Accordingly, the driven cylinder 32 is shut off from the first drive rotor 31 and the second drive rotor 34. In other words, the rotary shaft 10, which may form a rotary load with respect to the output shaft 23a, is disconnected from the worm shaft 22. Accordingly, the driven cylinder 32 runs idle with respect to the first drive rotor 31 and the second drive rotor 34. In other words, the worm shaft 22 is easily rotated in a state of being shut off from the rotary shaft 10. Therefore, any large manual operating force is not required in the slide door 152, and it is easy to manually operate the slide door 152.

If a command of automatically opening and closing the slide door 152 in accordance with an electric motor control is input to a motor drive circuit (not shown) from the controller, the motor drive circuit drives the motor main body 2, so that the rotary shaft 10 is rotated. If the first drive rotor 31 is rotated together with the rotary shaft 10, the second drive rotor 34 is rotated, and each of the roller members 33 revolves around the rotation center O. The second drive inclined surface 34c causes the roller member 33 to revolve. The roller member 33 is moved to an outer side in the radial direction by receiving a centrifugal force F4 caused by the revolution, and a second outer urging force F2 from the second drive inclined surface 34c, and enters the driven recess 32a as shown in FIG. 6.

When a total of the centrifugal force F4 and the second outer urging force F2 is smaller than the inner urging force F3, the roller member 33 again enters the second drive recess 34b on the basis of the inner urging force F3. As a result, only the first drive rotor 31 and the second drive rotor 34 rotate, and the driven cylinder 32 and the worm shaft 22 remain stopped.

When the total of the centrifugal force F4 and the second outer urging force F2 is equal to or more than the inner urging force F3, a state is maintained in which the driven inclined surface 32b and the second drive inclined surface 34c clamp the roller member 33 as shown in FIG. 6.

If the first drive rotor 31 is further rotated in the rotating direction Y in a state in which the driven inclined surface 32b and the second drive inclined surface 34c clamp the roller member 33 as shown in FIG. 6, the first drive rotor 31 is relatively rotated in the rotating direction Y with respect to the second drive rotor 34 against the elastic force of the coil spring 37. In other words, the second drive rotor 34 is relatively rotated toward an opposite direction to the rotating direction Y with respect to the first drive rotor 31 against the urging force of the coil spring 37, by receiving the reaction force from the driven cylinder 32 via the roller member 33. As a result, as shown in FIG. 7, the first drive inclined surface 31b is brought into contact with the roller member 33. In other words, the first drive inclined surface 31b and the driven inclined surface 32b clamp the roller member 33. Since the centrifugal force F4 and the first outer urging force F1 press the roller member 33 to an outer side in the radial direction, the roller member 33 is urged toward the driven recess 32a. Accordingly, it is possible to maintain the state in which the first drive inclined surface 31b and the driven inclined surface 32b clamp the roller member 33.

As a result, the first drive rotor 31 is engaged with the driven cylinder 32 with respect to the rotating direction, and the rotary shaft 10 is coupled to the worm shaft 22. In other words, the rotating force caused by driving the motor main body 2 is transmitted to the worm shaft 22, the output shaft 23a is rotated, and the slide door 152 is electrically operated. The slide door 152 is opened or closed in correspondence to a normal rotation or a reverse rotation of the motor main body 2.

When the drive of the motor main body 2 is eventually stopped, the rotation of the rotary shaft 10 is stopped. Accordingly, the first drive rotor 31 is relatively rotated in the opposite direction to the rotating direction Y with respect to the second drive rotor 34 on the basis of the elastic force of the coil spring 37. As a result, as shown in FIG. 6, the insertion projection 34d is returned to the center in the circumferential direction of the guide groove 31c. The second drive recess 34b is returned to the center of the V shape of the first drive surface 31a. The roller member 33 is moved away from the first drive inclined surface 31b. Accordingly, the first drive rotor 31 is shut off from the driven cylinder 32. As a result, the rotary shaft 10 is shut off from the worm shaft 22. In other words, there is achieved a state in which the manual operation of the slide door 152 can be executed.

In the present embodiment, a distance at which the lead of the worm portion 22a, that is, the worm shaft 22 moves in the axial direction at a time when the worm shaft is rotated at one time is previously set to an optimum value in accordance with an experiment, a simulation or the like. As a result, the slide door 152 is smoothly operated in both of the electric motor control and the manual operation. In other words, the lead of the worm portion 22a is set such that both of the driving force transmission from the worm shaft 22 to the worm wheel 23 at a time of the electric motor control of the slide door 152 and the driving force transmission from the worm wheel 23 to the worm shaft 22 at a time of the manual operation of the slide door 152 are optimum.

The first embodiment has the following advantages.

(1) When the motor main body 2 is in the non-drive state, the coil spring 37 arranges the second drive recess 34b at the center of the V shape of the first drive surface 31a. The roller member 33 is positioned within the second drive recess 34b. Accordingly, both of the first drive rotor 31 and the second drive rotor 34 are not engaged with the driven cylinder 32 with respect to the rotating direction. In other words, the rotary shaft 10 is shut off from the worm shaft 22. Accordingly, in the case of manually operating the slide door 152, it is not necessary to rotate the motor main body 2 which may form the operating load. The slide door 152 can be easily operated manually.

When the motor main body 2 is in the drive state, the rotating force of the first drive rotor 31 is transmitted to the second drive rotor 34 via the coil spring 37. As a result, the second drive rotor 34 is rotated, and the roller member 33 revolves. If the centrifugal force F4 and the second outer urging force F2 become equal to or more than the inner urging force F3, the roller member 33 is moved outward in the radial direction, and is engaged with the driven inclined surface 32b. As a result, the first drive rotor 31 is relatively rotated with respect to the second drive rotor 34, and the first drive inclined surface 31b and the driven inclined surface 32b clamp the roller member 33. In other words, the first drive rotor 31 is engaged with the driven cylinder 32 in the rotating direction. As mentioned above, since the roller member 33 is moved to the driven recess 32a from the second drive recess 34b when the motor main body 2 is in the drive state, the first drive rotor 31 is securely engaged with the driven cylinder 32 with respect to the rotating direction. Accordingly, the rotary shaft 10 is coupled to the worm shaft 22. As a result, the driving force output from the motor main body 2 is reliably transmitted to the worm shaft 22.

If the drive of the motor main body 2 is stopped, the second drive recess 34b is returned to the center of the V shape of the first drive surface 31a on the basis of the urging force of the coil spring 37. The roller member 33 is returned within the second drive recess 34b. Accordingly, both of the first drive rotor 31 and the second drive rotor 34 become in the non-engaged state with the driven cylinder 32 with respect to the rotating direction, and the rotary shaft 10 is shut off from the worm shaft 22.

As mentioned above, the first clutch 30 reliably executes the coupling operation and the shut-off operation of the rotary shaft 10 and the worm shaft 22, and is stably operated. As a result, it is possible to improve a reliability of the motor device 1 and the door opening and closing apparatus 150.

(2) The first clutch 30 is arranged between the rotary shaft 10 and the worm shaft 22. In other words, the first clutch 30 is arranged at a position where a torque is comparatively small in the motor device 1. Accordingly, it is possible to make a rigidity of each of the first drive rotor 31, the driven cylinder 32, the roller member 33 and the second drive rotor 34 corresponding to the parts of the first clutch 30 comparatively lower so as to make compact and light in weight. Accordingly, it is possible to make the first clutch 30 compact and light in weight and it is possible to make the motor device 1 compact and light in weight.

The first clutch 30 is of a mechanical type. Accordingly, it is possible to prevent an increase of an electric power consumption of the motor device 1. Further, the first clutch 30 does not require any electric wiring. Accordingly, it is possible to suppress a wiring space in the motor device 1, and it is possible to downsize the motor device 1. In a vehicle mounting apparatus such as the door opening and closing apparatus 150, it is always necessary to downsize a mounting space to the vehicle. Accordingly, a great significance is obtained by downsizing the first clutch 30 and the motor device 1 assembled in the door opening and closing apparatus 150.

(3) As shown in FIG. 7, a first angle θ1 formed by the first drive inclined surface 31b and the driven inclined surface 32b is spread toward the outer side in the radial direction of the first clutch 30, that is, toward the driven recess 32a. At a time of driving the motor main body 2, in the state in which the first drive inclined surface 31b and the driven inclined surface 32b clamp the roller member 33, the roller member 33 receives the first outer urging force from the first drive inclined surface 31b, and stays in the driven recess 32a. Accordingly, it is possible to maintain the engaged state between the first drive rotor 31 and the driven cylinder 32.

As shown in FIG. 6, a second angle θ2 formed by the second drive inclined surface 34c and the driven inclined surface 32b is spread toward the inner side in the radial direction of the first clutch 30, that is, toward the second drive recess 34b. At a time when the motor main body 2 is not driven, even if the driven cylinder 32 is relatively rotated with respect to the second drive rotor 34, whereby the second drive inclined surface 34c and the driven inclined surface 32b clamp the roller member 33, the roller member 33 receives the inner urging force F3 from the driven inclined surface 32b, and enters the second drive recess 34b. Accordingly, it is possible to maintain the non-engaged state between the second drive rotor 34 and the driven cylinder 32. The first clutch 30 is further stably operated.

(4) The first drive rotor 31 has an arcuate guide groove 31c extending in the circumferential direction. The second drive rotor 34 has an insertion projection 34d extending in the axial direction. Since the insertion projection 34d is inserted to the guide groove 31c, the first drive rotor 31 is smoothly rotated relative to respect to the second drive rotor 34. The first clutch 30 is further stably operated.

The coil spring 37 for arranging the second drive recess 34b at the center of the V shape of the first drive surface 31a is accommodated in the guide groove 31c. Accordingly, it is not necessary to independently set the space for accommodating the coil spring 37, and it is easy to downsize the first clutch 30.

(5) The first drive rotor 31 has the first drive surface 31a defining the V-shaped recess. The second drive rotor 34 has the second drive recess 34b. The driven cylinder 32 has the driven recess 32a. The roller member 33 is accommodated in the recesses (31a, 34b, and 32a). Accordingly, it is possible to limit an unexpected movement of the roller member 33, and the first clutch 30 is stably operated. It is not necessary to independently set any member for guiding the movement of the roller member 33.

(6) Each of the roller members 33 is formed in a columnar shape. Accordingly, the roller member 33 can be smoothly moved without unnecessarily being caught on the first drive rotor 31, the second drive rotor 34 and the driven cylinder 32.

Further, a plurality of roller members 33 are arranged at a uniform interval in the circumferential direction in the first clutch 30. Accordingly, it is possible to arrange the engaging portion between the first drive rotor 31 and the driven cylinder 32 with a good balance in the circumferential direction. As a result, the first clutch 30 is further stably operated.

(7) The first clutch 30 couples the rotary shaft 10 to the worm shaft 22 regardless of a forward rotation or a backward rotation of the rotary shaft 10. The first clutch 30 shuts off the worm shaft 22 from the rotary shaft 10 regardless of a forward rotation or a backward rotation of the worm shaft 22. The first clutch 30 is easily applied to the motor device 1 which can be rotated forward and backward.

A description will be given below of a second embodiment of the present invention with reference to FIGS. 9 to 17B.

Figure 9:
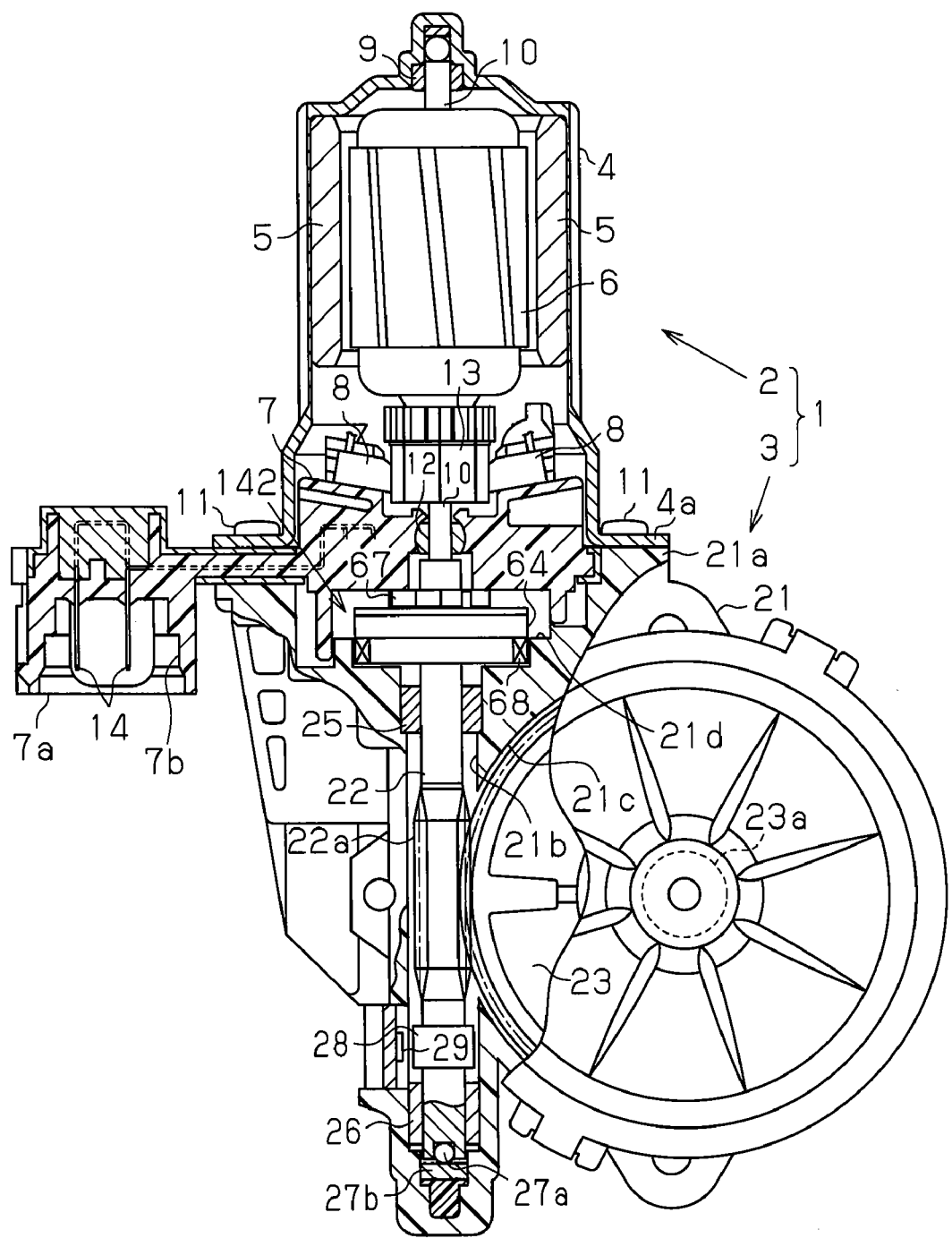
FIG. 9 is a vertical cross-sectional view of a motor device including a second clutch in accordance with a second embodiment of the present invention.
Figure 10:
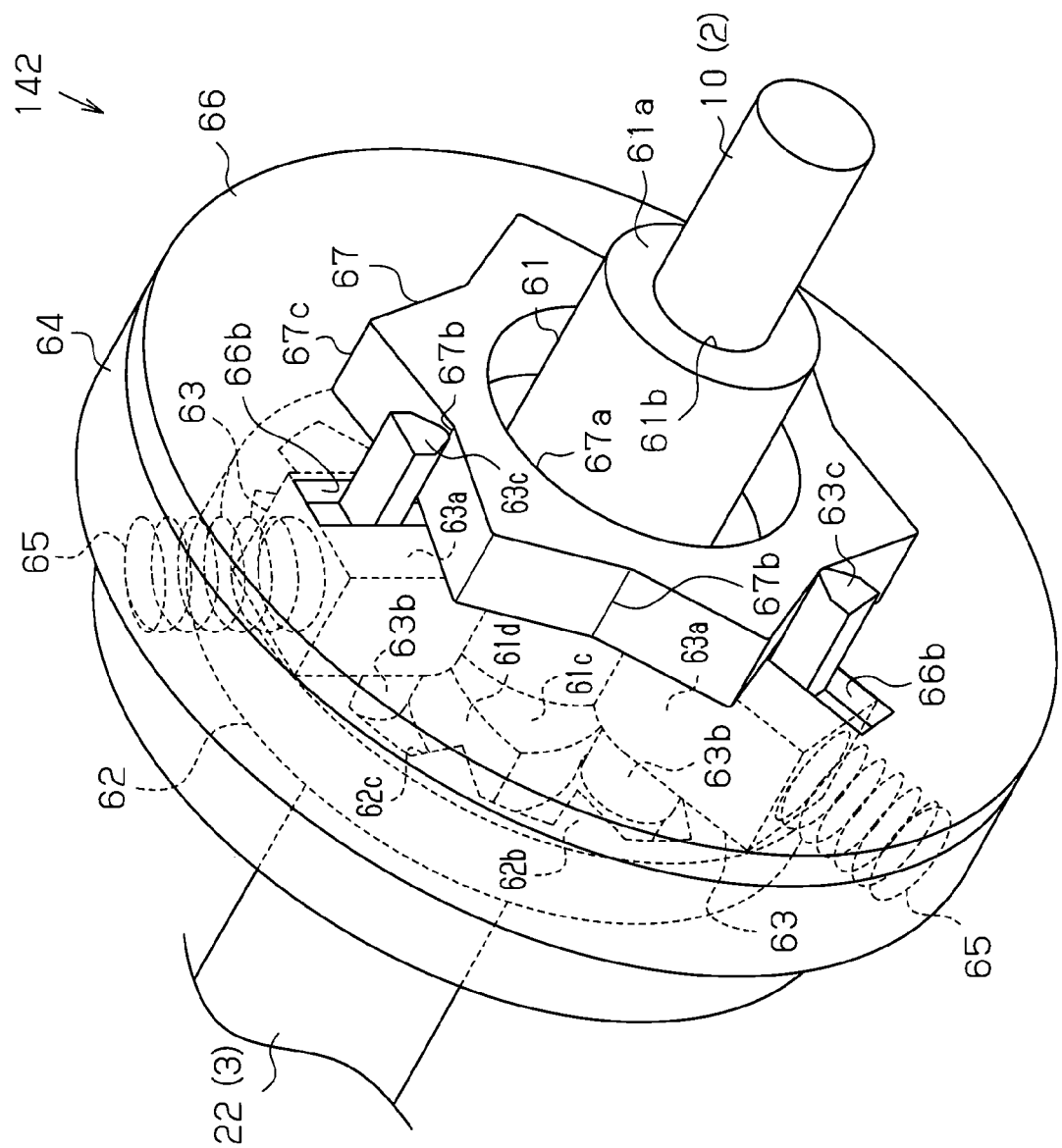
FIG. 10 is a perspective view of the second clutch shown in FIG. 9.

As shown in FIGS. 10 and 11, a second clutch 142 is provided with a drive rotor 61 serving as an input rotor attached to the rotary shaft 10, a driven rotor 62 serving as an output rotor attached to the worm shaft 22, and three contact members 63. Each of the contact members 63 serving as a coupling member is arranged between the drive rotor 61 and the driven rotor 62. Further, the second clutch 142 is further provided with a fixed gear 67 fixed to the brush holder 7 by a screw (not shown), and a support plate 64 which is rotatable with respect to the fixed gear 67. As shown in FIG. 9, the support plate 64 is rotatably supported to the gear housing 21 via a fifth bearing 68. The support plate 64 and a lid body 66 bonded to the support plate 64 accommodate each of the contact members 63. The drive rotor 61 will be referred to as a first rotor, and the driven rotor 62 will be referred to as a second rotor.

As shown in FIG. 11, the drive rotor 61, for example, made of a resin, has a mounting cylinder 61a, and a drive disc 61c provided in a first end of the mounting cylinder 61a. The drive disc 61c is expanded vertically with respect to the mounting cylinder 61a corresponding to a shaft portion. The drive disc 61c is coaxial with the mounting cylinder 61a. A second end of the mounting cylinder 61a has a mounting hole 61b. A distal end of the rotary shaft 10 is fitted and inserted to the mounting hole 61b. In other words, a cross-sectional shape of the mounting hole 61b is the same as a cross-sectional shape of the rotary shaft 10. A cross-sectional shape of a distal end of the rotary shaft 10 can be formed, for example, in a D-shaped form. The cross-sectional shape of the distal end of the rotary shaft 10 may be formed in a shape obtained by cutting a circle by two parallel lines, that is, a width across flat shape. The rotary shaft 10 is fitted and inserted to the mounting hole 61b, whereby the drive rotor 61 is coupled to the rotary shaft 10 so as to be integrally rotatable.

The drive disc 61c is formed in a triangular shape as a whole. The drive disc 61c has three drive protrusions 61d serving as a drive engagement portion individually formed in a triangular shape at a uniform interval (at an interval of 120 degrees) in a circumferential direction. An outer surface in a radial direction of each of the drive protrusions 61d is formed in a curved shape which is somewhat bulged to an outer side in the radial direction. In other words, the adjacent drive protrusions 61d define a drive recess 61e which is recessed to an inner side in the radial direction. The total three drive recesses 61e are positioned at a uniform interval (at an interval of 120 degrees) in the circumferential direction.

The driven rotor 62 is integrally formed in an end portion of the worm shaft 22 so as to be coaxial with the worm shaft 22. The driven rotor 62 may be formed as an independent member from the worm shaft 22, and may be coupled to the worm shaft 22. Both of the driven rotor 62 and the worm shaft 22 are made, for example, of a metal.

The driven rotor 62 has an accommodating recess 62a accommodating the drive disc 61c. The driven rotor 62 has a driven outer ring 62b defining the accommodating recess 62a. The driven outer ring 62b is formed coaxial with the worm shaft 22, that is, coaxial with the drive disc 61c. Twelve driven recesses 62c are formed on an inner circumferential surface of the driven outer ring 62b at a uniform interval. Each of the driven recesses 62c serving as a coupling recess is open toward an inner side in the radial direction, that is, toward the drive rotor 61. Each of the driven recesses 62c is formed in a trapezoidal shape which is spread toward an inner side in the radial direction. In a state in which the drive disc 61c is positioned at the accommodating recess 62a, the driven outer ring 62b and the drive disc 61c face to each other in the radial direction.

As shown in FIGS. 10 and 11, the contact member 63, for example, made of a resin, has a rectangular parallelepiped contact main body 63a, a first contact protrusion 63b extending in an axial direction from the contact main body 63a, and a second contact protrusion 63c extending to an opposite side to the first contact protrusion 63b from the contact main body 63a. The first contact protrusion 63b extends toward the worm shaft 22, and the second contact protrusion 63c extends toward the rotary shaft 10. The first contact protrusion 63b is positioned in an inner side in the radial direction than the second contact protrusion 63c. The first contact protrusion 63b serves as a columnar coupling protrusion. The second contact protrusion 63c serves as a pentagon prismatic locking protrusion extending toward the rotary shaft 10. The respective contact members 63 are arranged at a uniform interval (at an interval of 120 degrees) in the circumferential direction with respect to the support plate 64. Each of the contact members 63 is movable in the radial direction with respect to the support plate 64.

Figure 12A:
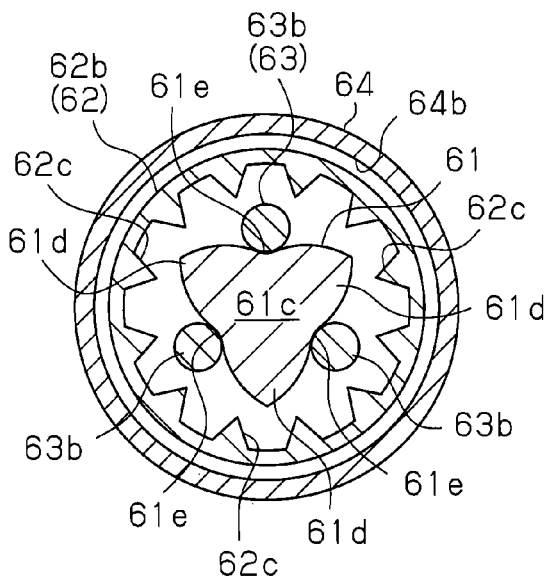
FIG. 12A is a cross-sectional view of the second clutch shown in FIG. 10, and shows the relation among a drive disc, a driven rotor, and a first contact protrusion.

As shown in FIGS. 10 and 11, the support plate 64 serving as a holding member, and a lid body 66 cover the driven rotor 62 and the drive disc 61c. For example, the resin support plate 64 is formed in a step shape, and has a large-diameter disc facing the rotary shaft 10, and a small-diameter cylinder facing the worm shaft 22. A center of the large-diameter disc has an insertion hole 64a having a circular cross section. The mounting cylinder 61a extends through the insertion hole 64a. The small-diameter cylinder defines an accommodating hole 64b having a circular cross section. The accommodating hole 64b communicates with the insertion hole 64a. As shown in FIG. 12A, the accommodating hole 64b accommodates the driven rotor 62.

As shown in FIG. 11, the large-diameter disc of the support plate 64 has three guide grooves 64c at a uniform interval (at an interval of 120 degrees). Each of the guide grooves 64c extends in the radial direction from the insertion hole 64a. Each of the guide groove 64c has a quadrangular cross-sectional shape corresponding to the contact main body 63a. An outer end in the radial direction of each of the guide grooves 64c is closed. Each of the guide grooves 64c serves as an accommodating groove accommodating the contact main body 63a. Each of the guide grooves 64c allows the corresponding contact main body 63a to move in the radial direction, however, inhibits from moving in the circumferential direction. Each of the first contact protrusions 63b is positioned between the driven outer ring 62b, and the drive disc 61c which is in the inner side in the radial direction than the driven outer ring 62b.

Each of the guide grooves 64c accommodates a coil spring 65. The coil spring 65 is positioned between the contact main body 63a, and an outer end in the radial direction of the guide groove 64c. Each of the coil springs 65 serves as an urging member urging the contact main body 63a in the inner side in the radial direction. The discoid lid body 66 closes the guide groove 64c in the state of accommodating the contact member 63 and the coil spring 65 with respect to the axial direction. The lid body 66 is fixed to the support plate 64. The center of the lid body 66 has a circular insertion hole 66a corresponding to the insertion hole 64a. The lid body 66 has three notch grooves 66b extending outward in the radial direction from the insertion hole 66a. Each of the second contact protrusions 63c passes through the corresponding notch groove 66b so as to protrude from the lid body 66. At a time when each of the notch grooves 66b is moved in the radial direction along the guide groove 64c, each of the guide grooves 64c allows the second contact protrusion 63c to move in the radial direction.

As shown in FIG. 10, the fixed gear 67 serving as a regulating and guiding member is a hexagram shaped plate member facing the lid body 66. A distal end of each of the second contact protrusions 63c protruding from the lid body 66 can be locked to an outer circumferential surface of the fixed gear 67 from the radial direction. A corner portion in an inner side in the radial direction of each of the second contact protrusions 63c is locked to the outer circumferential surface of the fixed gear 67. The fixed gear 67 is formed, for example, by a resin. The fixed gear 67 may be integrally formed with the brush holder 7. The center of the fixed gear 67 has a circular insertion hole 67a corresponding to the insertion hole 64a of the support plate 64. An outer peripheral edge of the fixed gear 67 has a fixed recess 67b which is somewhat recessed in a V shape toward the inner side in the radial direction, in an intermediate portion of individual portions corresponding six lines of the hexagon. Each of fixed corner portions 67c in the outer edge portion of the fixed gear 67 somewhat protrudes to an outer side in the radial direction. The outer surface in the radial direction of the fixed gear 67 defining the fixed recess 67b serves as a guide portion guiding the contact member 63.

Figure 12B:
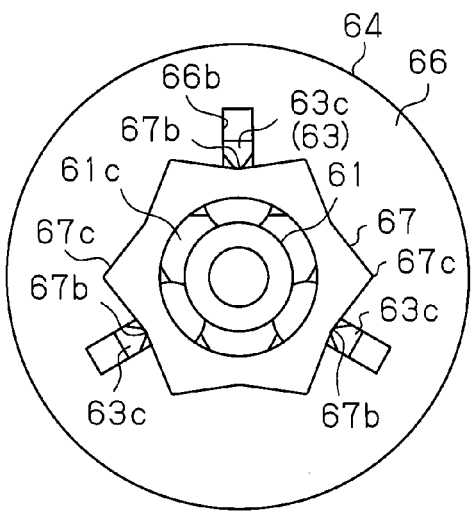
FIG. 12B is a plan view showing the relation between a fixed gear and a second contact protrusion, in the second clutch shown in FIG. 12A.

As shown in FIG. 12A, if each of the first contact protrusions 63b is arranged in an innermost portion of the corresponding drive recess 61e, that is, a center of the drive recess 61*e*, each of the first contact protrusions 63*b* is not locked to the driven outer ring 62*b*. In other words, a state in which the first contact protrusions 63*b* respectively exist in the centers of the corresponding drive recesses 61*e* will be referred to as a state in which "the contact member 63 exists at a unlockable position". The contact member 63 located at the unlockable position cannot be locked to the driven rotor 62 with respect to the rotating direction. In this case, the driven rotor 62 is shut off from the drive rotor 61. Each of the coil springs 65 brings the corresponding second contact protrusion 63*c* into contact with the support plate 64 in the center of the fixed recess 67*b* as shown in FIG. 12B. In other words, each of the coil springs 65 urges the corresponding contact member 63 toward the unlockable position. As a result, each of the contact members 63 is regulated in the rotation with respect to the fixed gear 67. The support plate 64 locked to the contact member 63 in the circumferential direction is also regulated in the rotation with respect to the fixed gear 67.

Figure 15A:
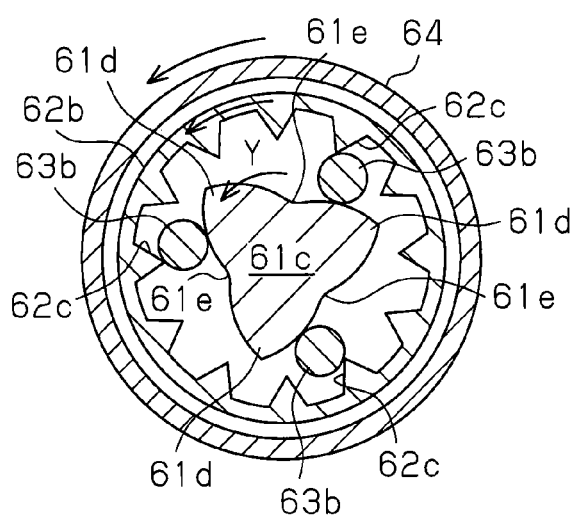
Figure 15B:
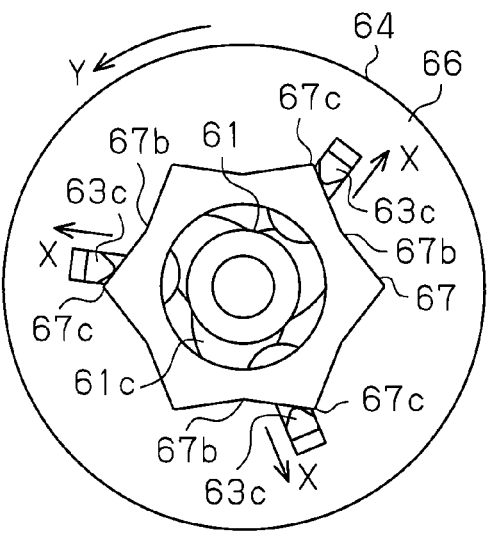
Figure 16A:
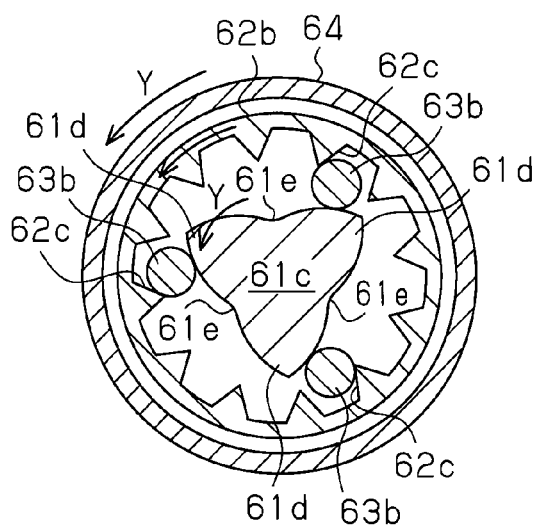
Figure 16B:
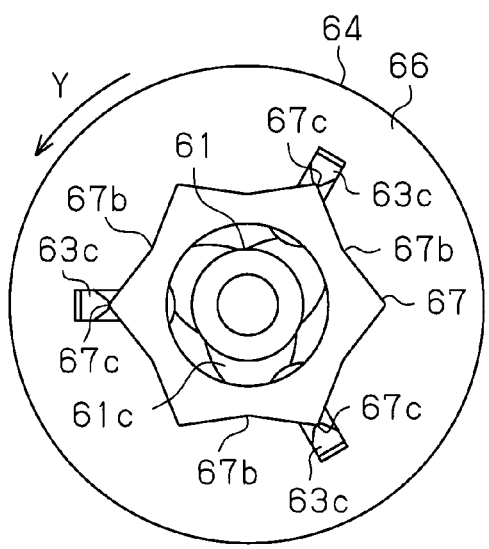
Figure 17A:
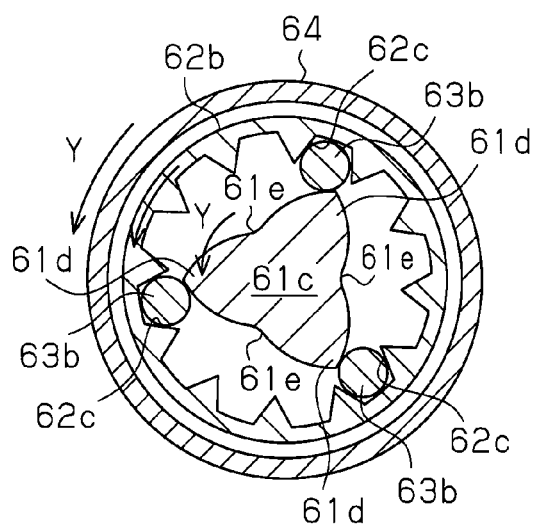
Figure 17B:
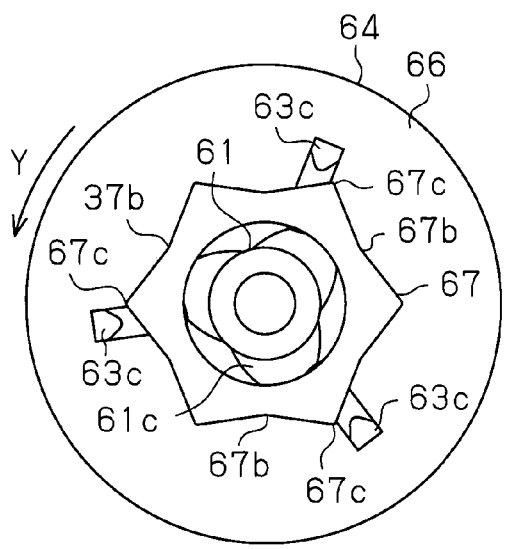

FIGS. 12A to 17B show the case that the rotating direction Y of the drive rotor 61 is a counterclockwise direction. FIGS. 13A and 13B show the second clutch 142 at the same time. FIGS. 14A and 14B show the second clutch 142 at the same time. On the basis of the rotation of the drive rotor 61, each of the first contact protrusions 63*b* is moved to an outer side in the radial direction along the side surface of each of the drive protrusions 61*d*, and the first contact protrusion 63*b* is arranged in the driven recess 62*c* as shown in FIG. 17A. Accordingly, as shown in FIG. 17B, each of the first contact protrusions 63*b* is locked to the driven outer ring 62*b* in the rotating direction against the urging force of the coil spring 65. In this case, the drive rotor 61 is coupled to the driven rotor 62 via each of the contact members 63, that is, the first contact protrusion 63*b*. In other words, each of the contact members 63 is locked to the driven rotor 62 with respect to the rotating direction, by being positioned at a lockable position located in an outer side in the radial direction than the unlockable position.

The drive rotor 61 in the rotating state urges each of the contact members 63 toward an outer side in the radial direction, that is, toward the lockable position. Since each of the contact members 63 is moved outward in the radial direction, each of the second contact protrusions 63*c* is moved away from each of the fixed corner portions 67*c*, and is moved outward in the radial direction. Accordingly, the second contact protrusion 63*c* comes to the state in which the second contact protrusion 63*c* cannot be locked to the fixed gear 67. As a result, the rotation suppressing state of the support plate 64 is cancelled, and the support plate 64 is rotated together on the basis of the rotation of the drive rotor 61. Therefore, the driven rotor 62 locked to each of the first contact protrusions 63*b* in the circumferential direction is rotated.

A dimension of each of the contact member 63, the drive disc 61*c* and the driven outer ring 62*b* is set in such a manner that the operation mentioned above is smoothly executed.

When the rotating force is not generated in the rotary shaft 10 such as the time when the motor main body 2 is not driven, each of the first contact protrusions 63*b* is guided to the center of the corresponding drive recess 61*e* as shown in FIG. 12A, by the urging of the contact member 63 inward in the radial direction by the coil spring 65. In this case, as shown in FIG. 12B, each of the second contact protrusions 63*c* is guided to the center of each of the fixed recesses 67*b*.

When each of the first contact protrusions 63*b* is not guided to the center of the corresponding drive recess 61*e* only by the urging force of the coil spring 65, and when the second contact protrusion 63*c* is not guided to the center of the corresponding fixed recess 67*b*, each of the first contact protrusions 63*b* collides with the driven outer ring 62*b* on the basis of the rotation of the driven outer ring 62*b*. As a result, each of the first contact protrusions 63*b* is guided to the center of the corresponding drive recess 61*e*. In the same manner, each of the second contact protrusions 63*c* is guided to the center of the corresponding fixed recess 67*b* on the basis of the collision of the driven outer ring 62*b* to each of the first contact protrusions 63*b*.

If each of the first contact protrusions 63*b* is arranged in the center of each of the drive recesses 61*e*, each of the first contact protrusions 63*b* is positioned to the driven outer ring 62*b* so that it cannot be locked to the driven outer ring 62*b*. Accordingly, the worm shaft 22 is shut off from the rotary shaft 10, and the rotary shaft 10 is disconnected from the worm shaft 22. As a result, the rotary load of the output shaft 23*a* is reduced. Accordingly, the rotation of the output shaft 23*a* is easy, and the slide door 152 can be manually operated.

Since each of the second contact protrusions 63*c* is positioned at the corresponding fixed recess 67*b*, each of the contact members 63 is locked to the fixed gear 67 in the circumferential direction. Accordingly, the rotation of the support plate 64 is suppressed. In other words, it is possible to prevent the support plate 64 from being rotated together with the driven rotor 62 at a time of manually operating the slide door 152.

Figure 13A:
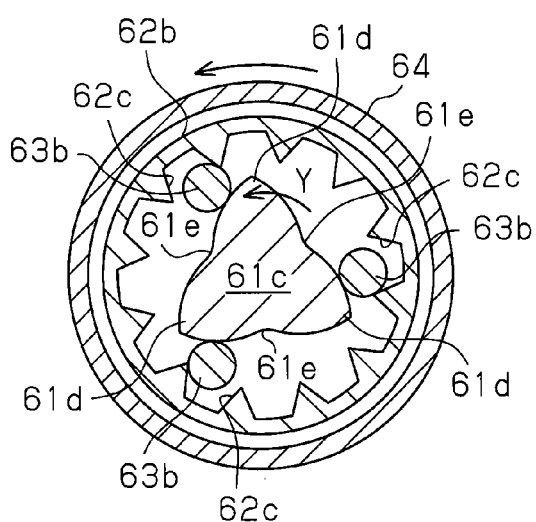

If the motor main body 2 is driven so as to electrically operate the slide door 152, the drive rotor 61 is rotated together with the rotary shaft 10. Accordingly, as shown in FIG. 13A, each of the first contact protrusions 63*b* is guided by the side surface of the drive protrusions 61*d*, and is pushed outward in the radial direction. Each of the contact members 63 is moved outward in the radial direction against the urging force of the coil spring 65.

Figure 13B:
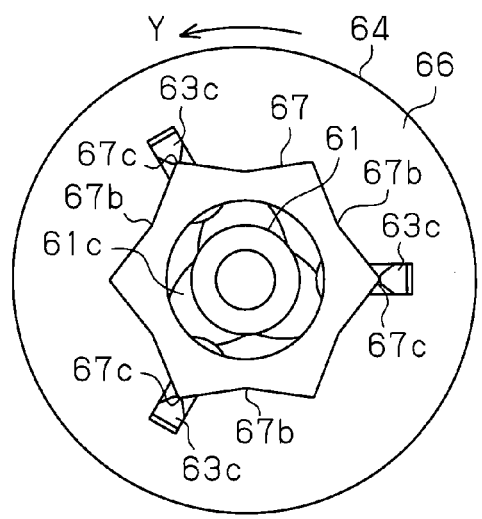

As shown in FIG. 13A, since each of the first contact protrusions 63*b* receives the rotating force from the drive disc 61*c*, the support plate 64 is also rotated. Accordingly, as shown in FIG. 13B, each of the second contact protrusions 63*c* is guided by an inclined surface of the fixed recess 67*b*, and each of the contact members 63 is smoothly moved outward in the radial direction. The first contact protrusion 63*b* is moved outward in the radial direction toward the corresponding driven recess 62*c*.

Figure 14A:
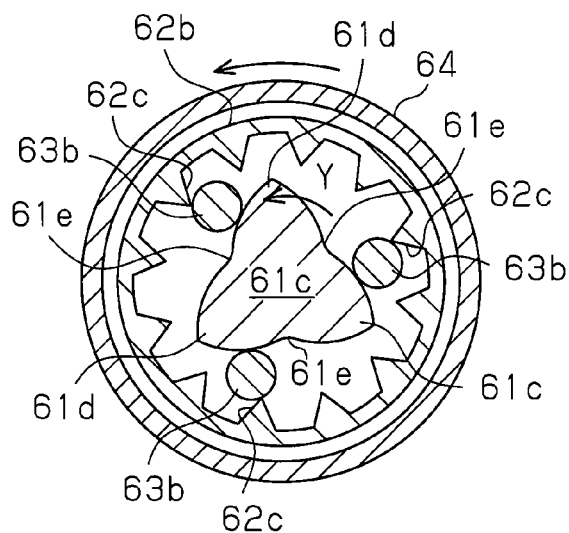
Figure 14B:
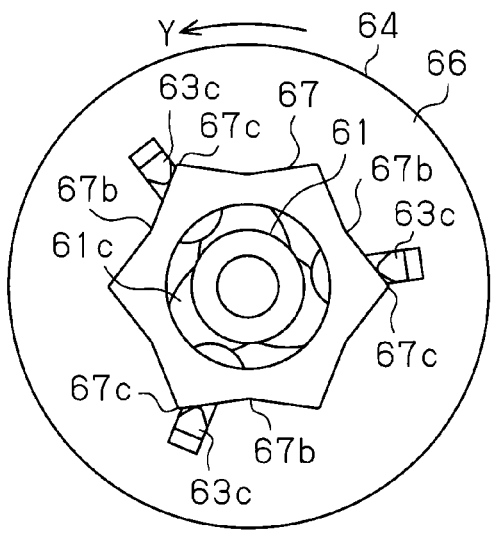

If the drive disc 61*c* is further rotated, each of the first contact protrusions 63*b* is engaged with the side surface of the driven recess 62*c* as shown in FIG. 14A. As shown in FIG. 15A, if the drive rotor 61 is further rotated, each of the first contact protrusions 63*b* is guided by the side surface of each of the drive protrusions 61*d*. As shown in FIG. 15B, the second contact protrusion 63*c* is guided by the inclined surface in the fixed recess 67*b*, and is moved along arrow X directed toward the outer side in the radial direction. As a result, as shown in FIG. 16A, each of the first contact members 63 further moves to the other side in the radial direction. As shown in FIG. 16, each of the first contact protrusions 63*b* enters the driven recess 62*c*.

FIG. 17A shows a state in which each of the first contact protrusions 63*b* is arranged in an outermost portion of the driven outer ring 62*b* in such a manner as to be in the engaged state with the driven outer ring 62*b* with respect to the rotating direction. Accordingly, each of the second contact protrusions 63*c* comes to the non-engaged state with the outer circumferential surface of the fixed gear 67 as shown in FIG. 17B, while the rotating force of the drive rotor 61 is transmitted to the driven outer ring 62*b*. As a result, the support plate 64 is smoothly rotated. The operations of FIGS. 13A to 17B are the same when the drive rotor 61 is rotated in the clockwise direction.

As mentioned above, the rotating force of the motor main body 2 is transmitted to the driven outer ring 62*b* from the drive rotor 61 via each of the first contact protrusions 63*b*. In other words, if the motor main body 2 rotates the drive rotor 61, each of the contact members 63 is moved outward in the radial direction against the urging force of the coil spring 65. As a result, the drive rotor 61 is coupled to the driven rotor 62 through each of the contact members 63. Accordingly, the worm shaft 22 is rotated, and the slide door 152 is opened and closed.

In the case of manually operating the slide door 152, the rotating force is applied to the worm shaft 22 from the slide door 152 via the wire cable 55. At this time, each of the contact members 63 is positioned in the driven rotor 62 such that it cannot be locked to the driven rotor 62, on the basis of the urging force of the coil spring 65. Accordingly, the rotary shaft 10 is shut off from the worm shaft 22. The rotation of the worm shaft 22 is not transmitted to the rotary shaft 10. The slide door 152 is manually operated easily without requiring any great operating force.

The second embodiment has the following advantages.

(8) If the drive rotor 61 is rotated at a time of driving the motor main body 2, each of the contact members 63 is moved outward in the radial direction against the urging force of the coil spring 65, and is locked to the driven rotor 62. As a result, the drive rotor 61 is coupled to the driven rotor 62 through each of the contact members 63. In other words, the second clutch 142 couples the rotary shaft 10 to the worm shaft 22 so as to be integrally rotatable by driving the motor main body 2. Accordingly, the second clutch 142 enables the electric motor control of the slide door 152.

At a time when the motor main body 2 is not driven, each of the contact members 63 is positioned such that it cannot be locked to the driven rotor 62 on the basis of the urging force of the coil spring 65. Accordingly, the driven rotor 62 is shut off from the drive rotor 61. In other words, the second clutch 142 shuts off the rotary shaft 10 from the worm shaft 22 at a time when the motor main body 2 is not driven. Accordingly, it is possible to reduce the load of the manual operation of the slide door 152.

(9) The fixed gear 67 having a plurality of fixed recesses 67*b* is fixed to the brush holder 7. Each of the fixed recesses 67*b* guides the contact member 63 to the position capable of being locked to the driven rotor 62. In other words, each of the contact members 63 is moved along the fixed recess 67*b* at a time of being moved outward in the radial direction on the basis of the rotating force of the drive rotor 61 so as to be locked to the driven rotor 62. Accordingly, each of the contact members 63 is smoothly moved. The second clutch 142 is further stably operated.

The fixed gear 67 is fixed to the brush holder 7, which is an existing motor part. Accordingly, it is not necessary to be independently provided with the member for fixing the fixed gear 67, and it is possible to limit the number of the parts of the motor device 1 small.

(10) The second clutch 142 has the support plate 64 holding the contact member 63 and the coil spring 65. Accordingly, the second clutch 142 is easily assembled to form a single unit. Further, it is possible to prevent the contact member 63 and the coil spring 65 from affecting the other member or being affected from the other member. The second clutch 142 is further stably operated.

A description will be given of a third embodiment of the present invention with reference to FIGS. 18 to 25B.

Figure 18:
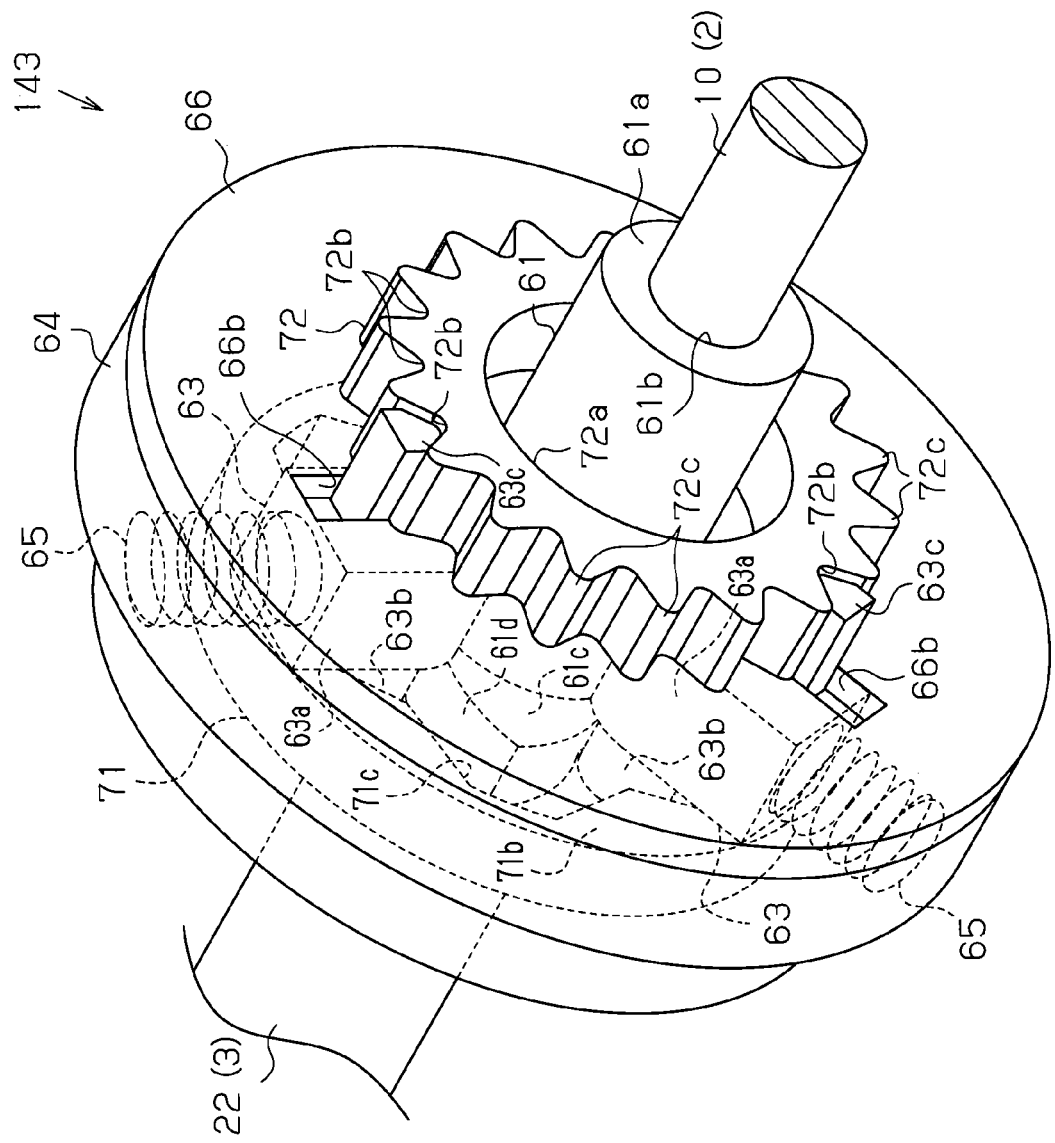
FIG. 18 is a perspective view of a third clutch in accordance with a third embodiment of the present invention.

As shown in FIGS. 18 and 19, a third clutch 143 in accordance with the third embodiment is structured such that a driven rotor 71 and a fixed gear 72 are modified in comparison with the second clutch 142 in accordance with the second embodiment. The same reference numerals are attached to the same structure as the second embodiment, and a description thereof will be omitted.

As shown in FIGS. 18 and 19, the driven rotor 71 has six driven recesses 71*c*. In other words, the number of the driven recesses 71*c* in accordance with the third embodiment is half of the twelve driven recesses 62*c* in the driven rotor 62 in accordance with the second embodiment.

An outer circumferential surface of the fixed gear 72 has eighteen fixed recesses 72*b* and eighteen fixed corner portions 72*c* alternately one by one. The outer circumferential surface of the fixed gear 72 is formed in a wavy shape. Each of the numbers of the fixed recesses 72*b* and the fixed corner portions 72*c* in the third embodiment is threefold of the six fixed recess 67*b* and six fixed corner portions 67*c* in the second embodiment. The fixed gear 72 is fixed to the brush holder 7 or integrally formed with the brush holder 7.

Figure 20A:
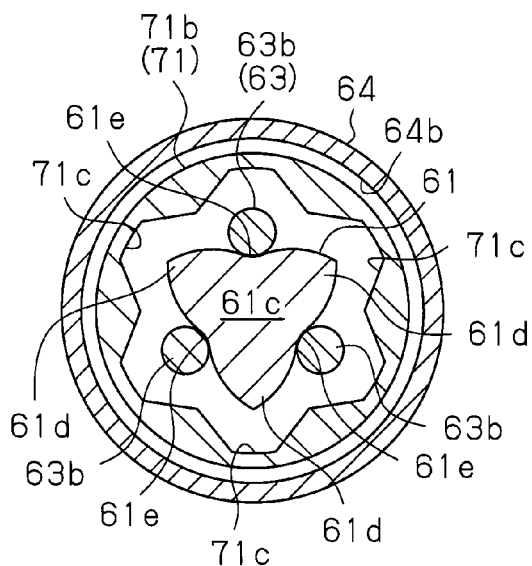
FIG. 20A is a cross-sectional view of the third clutch shown in FIG. 18, and shows a relation among a drive disc, a driven rotor, and a first contact protrusion.
Figure 20B:
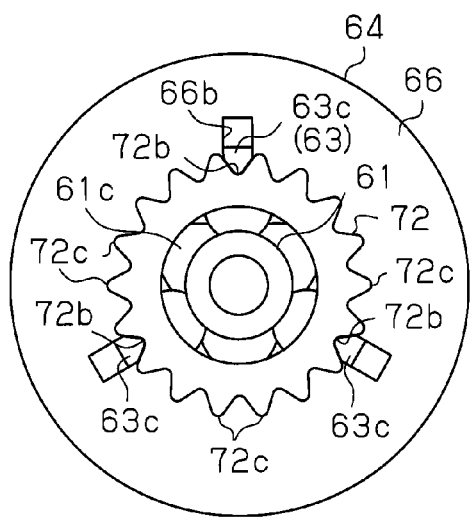
FIG. 20B is a plan view showing the relation between a fixed gear and a second contact protrusion, in the third clutch shown in FIG. 20A.
Figure 21A:
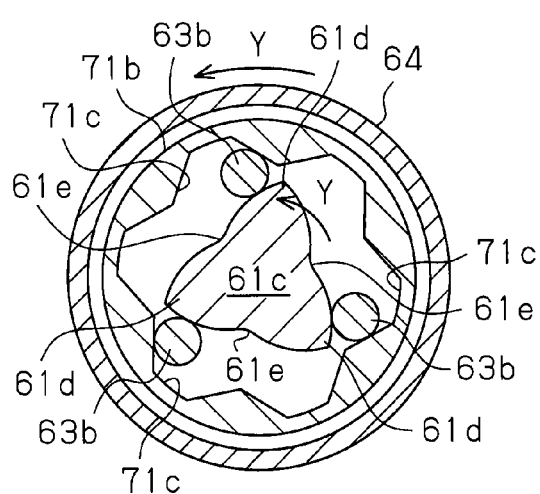
Figure 21B:
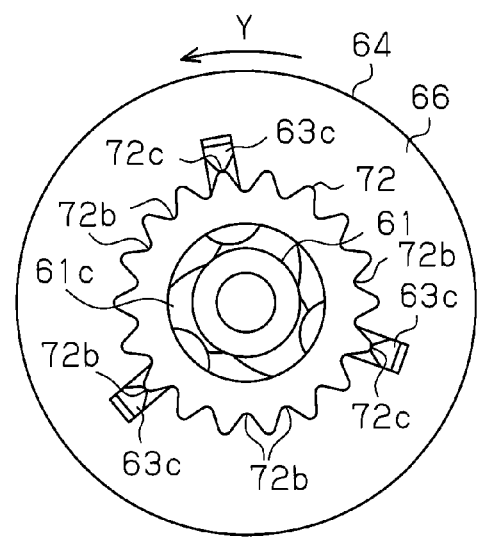
Figure 22A:
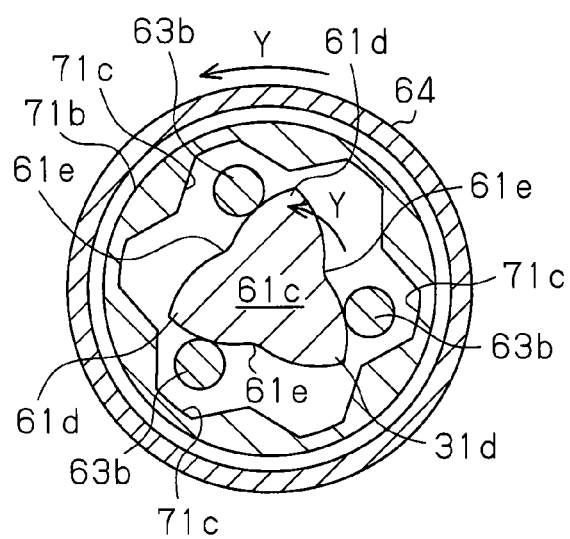
Figure 22B:
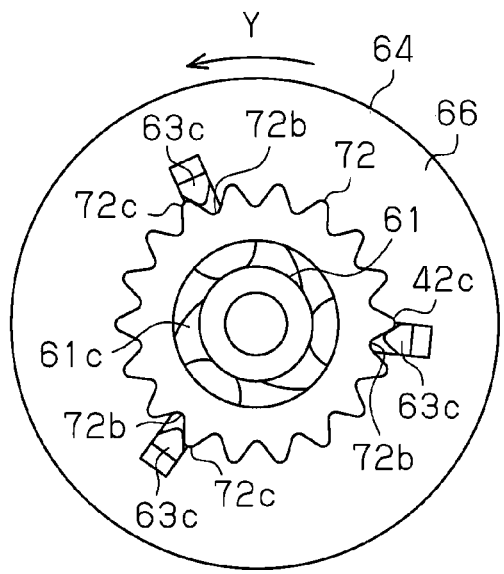
Figure 23A:
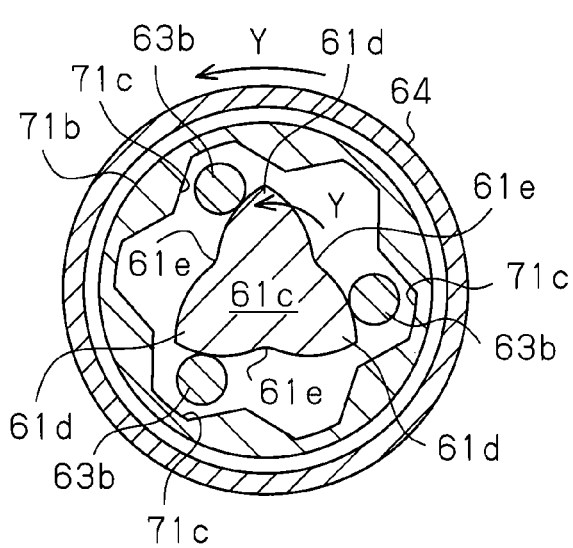
Figure 23B:
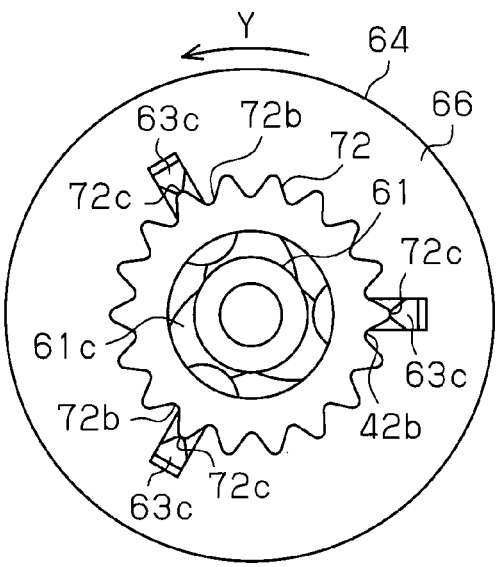
Figure 24A:
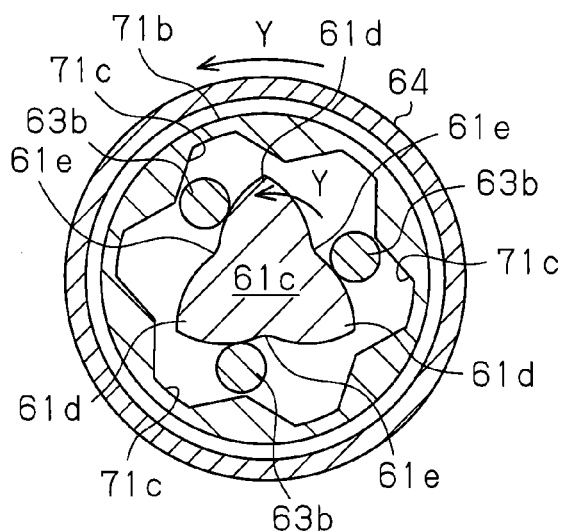
Figure 24B:
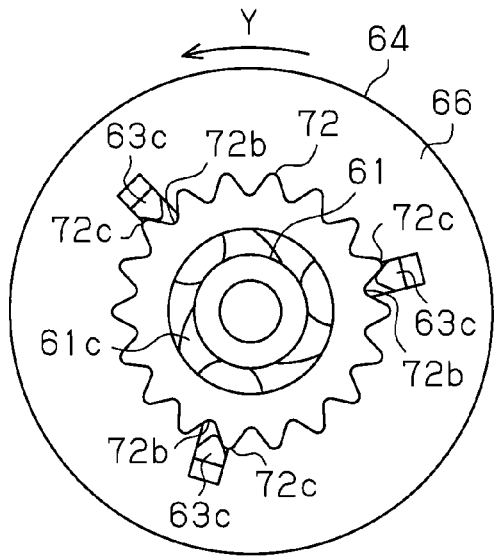

The third clutch 143 is also operated in the same manner as the second clutch 142 mentioned above. In other words, when the rotation driving force is not generated in the rotary shaft 10 such as the time when the motor main body 2 is not driven, each of the first contact protrusions 63*b* is positioned in a driven outer ring 71*b* of the driven rotor 71 such that the first contact protrusions 63*b* cannot be locked to the driven outer ring 71*b* as shown in FIG. 20A on the basis of the urging of the contact member 63 inward in the radial direction by the coil spring 65. As a result, the worm shaft 22 is shut off from the rotary shaft 10, and it is possible to manually operate the slide door 152 easily.

Since each of the second contact protrusions 63*c* is arranged within the fixed recess 72*b* of each of the fixed gears 72, the rotation of the support plate 64 is suppressed, and it is possible to prevent the rotation together with the driven rotor 71 (the driven outer ring 71*b*) which is rotated at a time of manually operating the slide door 152. The fixed gear 72 has a lot of fixed recesses 72*b*. Accordingly, each of the second contact protrusions 63*c* is easily fitted, and the engaging force with respect to the rotating direction is great, in comparison with the second clutch 142.

If the motor main body 2 is driven so as to automatically open and close the slide door 152 and the drive rotor 61 is rotated together with the rotary shaft 10, each of the first contact protrusions 63*b* is pushed outward in the radial direction against the urging force of the coil spring 65 on the basis of the rotation of the drive disc 61*c*, that is, the rotation of each of the drive protrusions 61*d*.

Since each of the first contact protrusions 63*b* receives the rotating force from the drive disc 61*c*, the support plate 64 is rotated in the same direction, and each of the second contact protrusions 63*c* is guided to an inclined surface of the fixed recess 72*b*. As a result, each of the contact members 63 is smoothly moved outward in the radial direction easily. The first contact protrusion 63*b* enters the driven recess 71*c*.

Figure 25A:
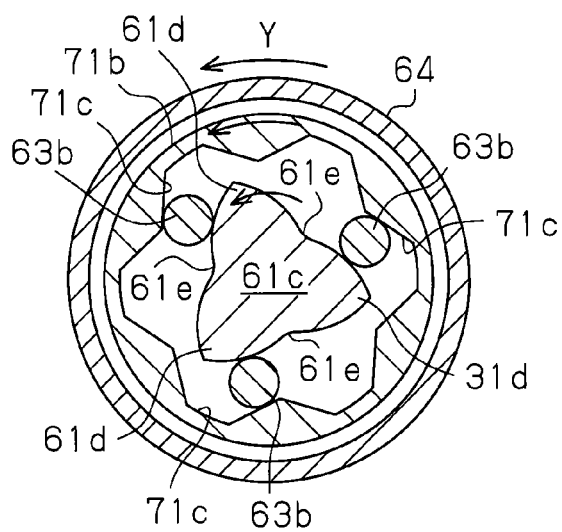
Figure 25B:
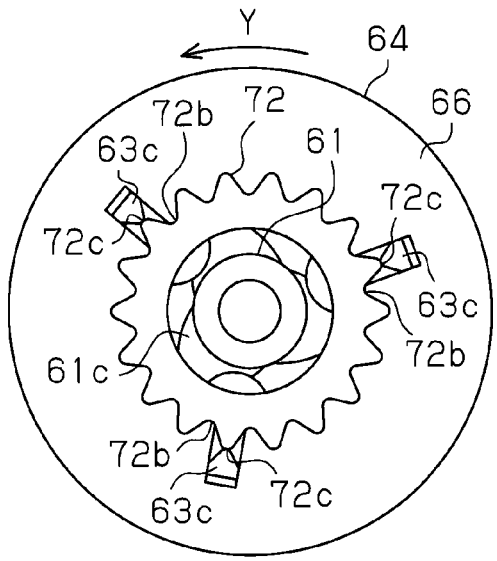

If the drive disc 61*c* is further rotated, the fixed recess 72*b* is set more finely in the circumferential direction than the driven recess 71*c*, as shown in FIGS. 22A to 24B. Accordingly, each of the second contact protrusions 63*c* repeats entering the fixed recess 72*b* and getting over the fixed corner portion 72*c* several times. Each of the first contact protrusions 63*b* is eventually engaged with a side surface of the driven recess 71*c* in the rotating direction, as shown in FIG. 25A.

Each of the first contact protrusions 63*b* is guided to the side surface of each of the drive protrusions 61*d* and is fitted deeply into the driven recess 71*c*, on the basis of the further rotation of the drive rotor 61. As a result, each of the second contact protrusions 63*c* is not engaged with an outer circumferential surface of the fixed gear 72. Accordingly, the rotating force of the drive rotor 61 is transmitted to the driven outer ring 71b. As mentioned above, in the present embodiment, the rotating force of the rotary shaft 10 generated by driving the motor main body 2 is transmitted to the worm shaft 22 and the output shaft 23a. As a result, the motor device 1 opens and closes the slide door 152.

The third clutch 143 has the same advantages as those of the second clutch 142 mentioned above.

A description will be given of a fourth embodiment of the present invention with reference to FIGS. 26 to 32B.

Figure 27:
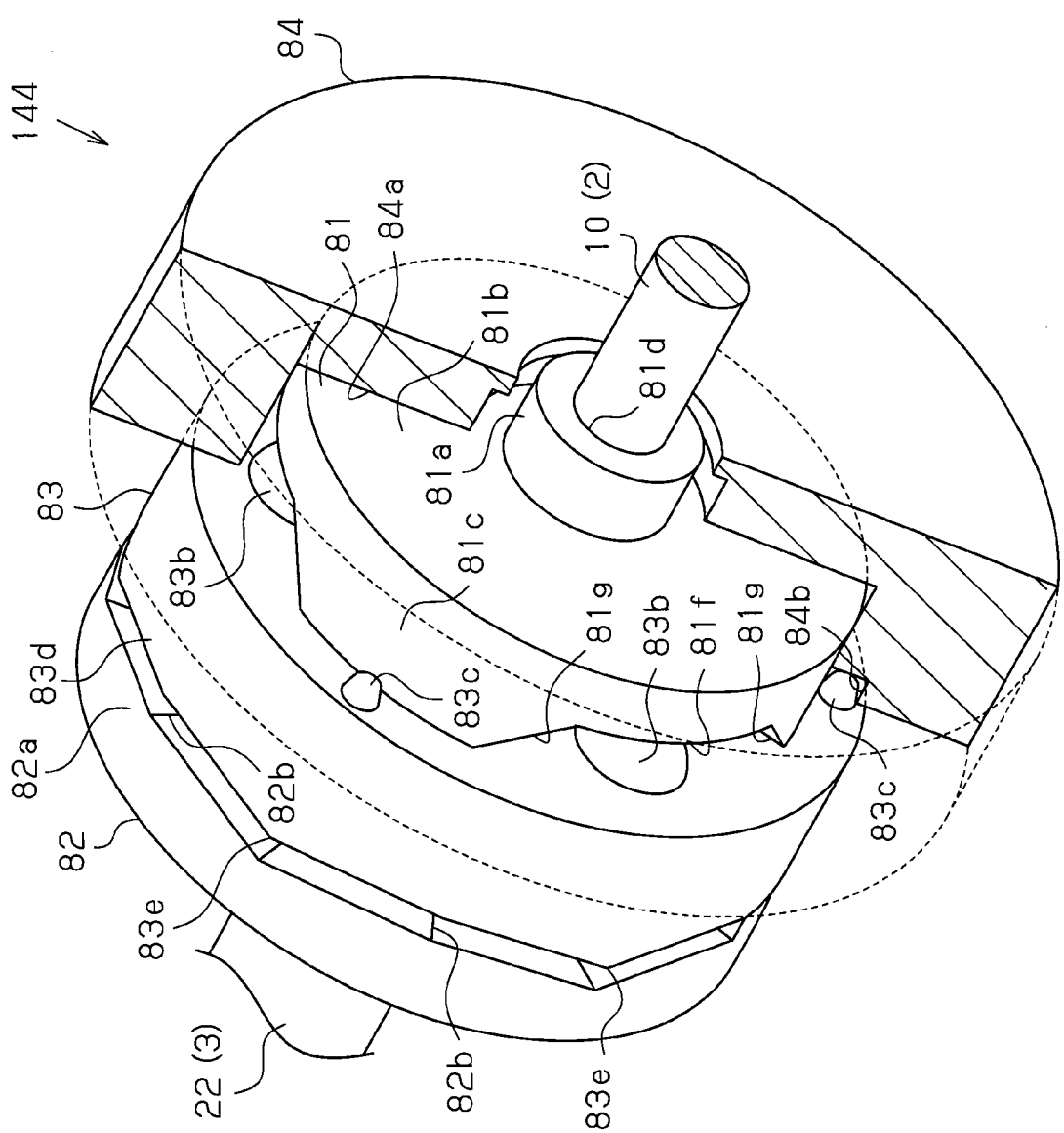
FIG. 27 is a perspective view of the fourth clutch shown in FIG. 26.
Figure 28:
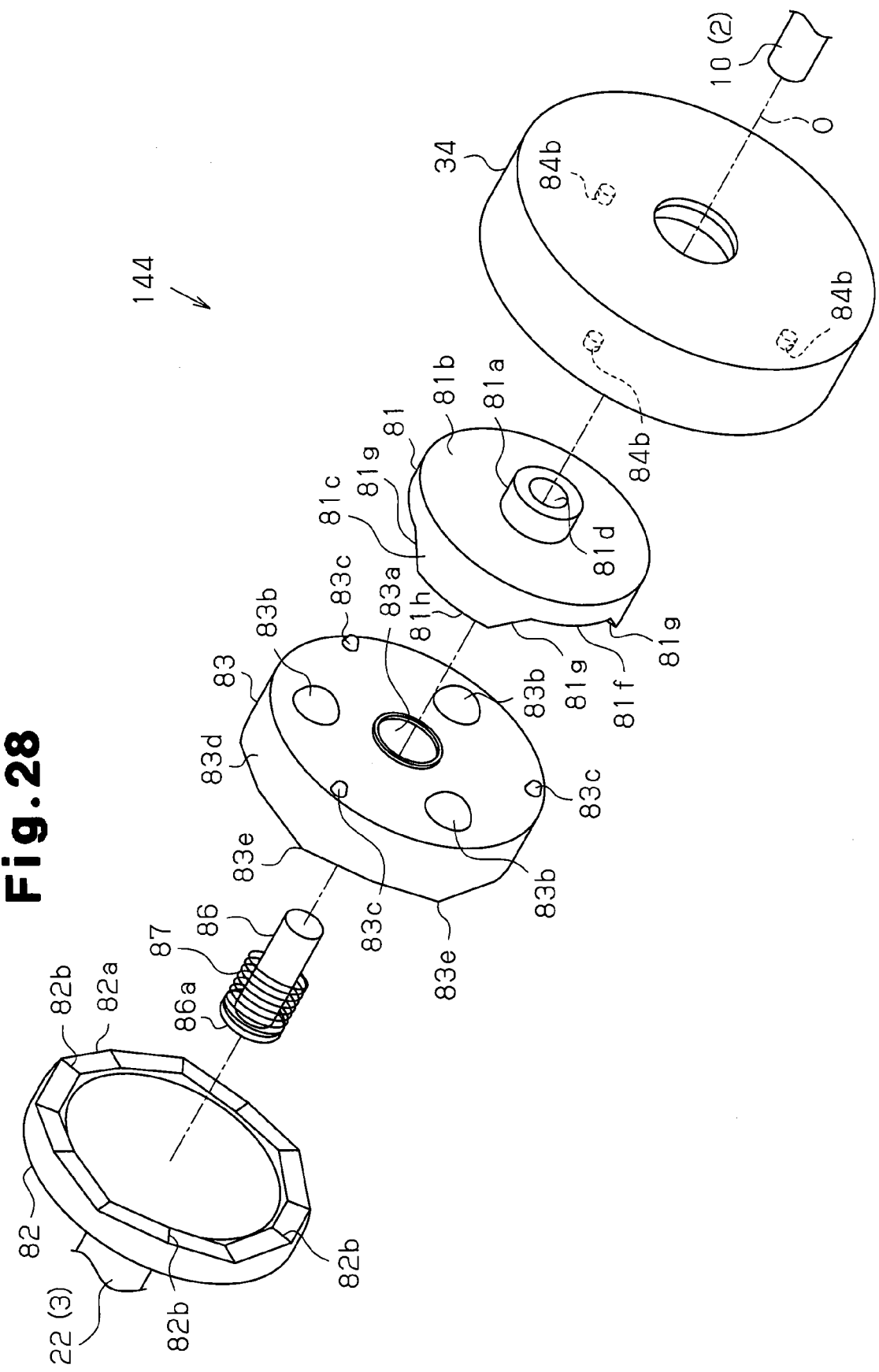
FIG. 28 is an exploded perspective view of the fourth clutch shown in FIG. 27.

A fourth clutch 144 is provided with a drive rotor 81 provided in the rotary shaft 10, a driven rotor 82 provided in the worm shaft 22, and a coupling plate 83, as shown in FIGS. 27 to 29. The coupling plate 83 serves as a coupling member provided between the drive rotor 81 and the driven rotor 82. The drive rotor 81 serves as a first rotor, and the driven rotor 82 serves as a second rotor.

Figure 26:
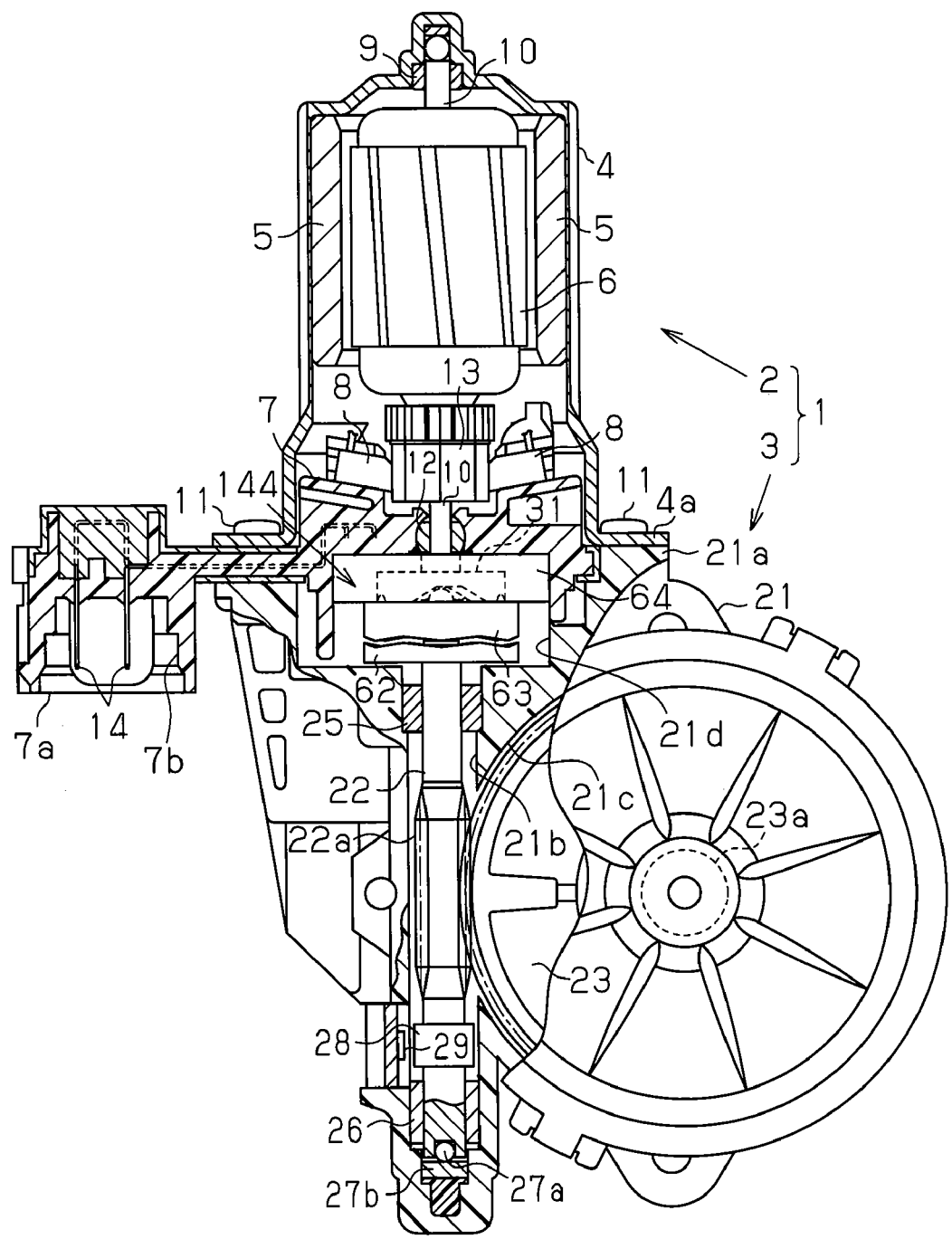
FIG. 26 is a vertical cross-sectional view of a motor device including a fourth clutch in accordance with a fourth embodiment of the present invention.

As shown in FIG. 26, a discoid fixed plate 84 is fixed to the brush holder 7. The fixed plate 84 is not limited to this, but may be integrally formed with the brush holder 7. For example, the fixed plate 84 serving as a base member made of a resin has an accommodating recess 84a having a circular cross-sectional shape. The accommodating recess 84a rotatably accommodates the drive rotor 81. As shown in FIG. 29B, a center of a bottom surface of the accommodating recess 84a accommodates a fifth bearing 85. The fifth bearing 85 rotatably supports a mounting cylinder 81a.

For example, the metal drive rotor 81 has a discoid flange 81b, a mounting cylinder 81a passing through a center portion of the flange 81b, and a drive outer ring 81c protruding in an axial direction from an outer circumferential portion of the flange 81b. The flange 81b is expanded in a radial direction from a center in an axial direction of the mounting cylinder 81a. The drive outer ring 81c protrudes toward an opposite side to the rotary shaft 10 from the flange 81b. In other words, the drive outer ring 81c protrudes toward the coupling plate 83 and the driven rotor 82 from the flange 81b. The mounting cylinder 81a has a first mounting hole 81d to which the rotary shaft 10 is fitted and inserted, and a second mounting hole 81e to which a support pin 86 is fitted and inserted. The drive rotor 81 and the support pin 86 extend coaxially with the rotary shaft 10. The drive rotor 81 is integrally rotated with the rotary shaft 10.

As shown in FIG. 27, the drive outer ring 81c has a drive contact surface 81h which can be brought into contact with the coupling plate 83. The annular drive contact surface 81h faces the coupling plate 83. The drive contact surface 81h has three drive recesses 81f facing the coupling plate 83 at a uniform interval (at an interval of 120 degrees) in a circumferential direction. Each of the drive recesses 81f is defined by a pair of drive inclined surfaces 81g in such a manner as to form a trapezoidal shape expending toward the driven rotor 82. In other words, a pair of drive inclined surfaces 81g correspond to both side surfaces of each of the drive recesses 81f which move away from each other in accordance with being closer to the driven rotor 82.

A support pin 86, for example, made of a metal, is fitted and inserted to the second mounting hole 81e in such a manner as to be coaxial with the drive rotor 81. The support pin 86 inserts the coupling plate 83 thereto. The support pin 86 supports the coupling plate 83 so as to be rotatable and movable in the axial direction. An end of the support pin 86 facing the worm shaft 22 has a flange-shaped locking piece 86a. A coil spring 87 is arranged between the locking piece 86a and the coupling plate 83. The support pin 86 extends through the coil spring 87 thereto. The coil spring 87 serves as an urging member urging the coupling plate 83 toward the drive rotor 81 from the locking piece 86a. A center portion of the locking piece 86a has a semispherical contact protrusion 86b brought into contact with the driven rotor 82.

The coupling plate 83, for example, made of a metal, includes a closed-end coupling cylinder 83d which is open toward the driven rotor 82. The coupling cylinder 83d has a diameter which is somewhat larger than the drive rotor 81. A center of the coupling plate 83 has an insertion hole 83a through which the support pin 86 extends. The coupling plate 83 is supported to the support pin 86 so as to be rotatable and movable in the axial direction. In other words, the coupling plate 83 can be brought into contact with and be detached from the driven rotor 82.

The coupling plate 83 has a first coupling surface 83f facing the drive rotor 81. The coupling cylinder 83d has a second coupling surface 83g facing the driven rotor 82. The first coupling surface 83f has three first locking protrusions 83b at a uniform interval (at an interval of 120 degrees) in a circumferential direction. Each of the semispherical first locking protrusions 83b can be accommodated in the drive recess 81f. The coupling plate 83 can be moved in an axial direction between a state of being brought into contact with the drive rotor 81 and a state of being brought into contact with the driven rotor 82. Whatever position the position in the axial direction of the coupling plate 83 is, each of the first locking protrusions 83b is positioned within the corresponding drive recess 81f. In other words, the coupling plate 83 can be engaged with the drive rotor 81 in the rotating direction regardless of the position in the axial direction of the coupling plate 83.

The first coupling surface 83f has three second locking protrusions 83c at a uniform interval (at an interval of 120 degrees) in the circumferential direction. Each of the second locking protrusions 83c is positioned between the first locking protrusions 83b and in the outer side in the radial direction than the first locking protrusion 83b. In other words, each of the second locking protrusions 83c is positioned on the concentric circle in an outer side in the radial direction than the drive contact surface 81h, and faces an opening peripheral edge of the accommodating recess 84a. Each of the second locking protrusions 83c is sufficiently smaller than the first locking protrusion 83b. The drive contact surface 81h has three fixed recesses 84b at a uniform interval (at an interval of 120 degrees). Each of the second locking protrusions 83c can be inserted to the corresponding fixed recess 84b. In other words, each of the fixed recesses 84b is positioned on the same circumference as each of the second locking protrusions 83c. The second locking protrusion 83c and the fixed recess 84b serve as a rotation regulating portion regulating the rotation of the coupling plate 83.

The second coupling surface 83g has six third locking protrusions 83e at a uniform interval in the circumferential direction. Each of the third locking protrusions 83e is formed in a triangular shape which somewhat protrudes toward the driven rotor 82.

The driven rotor 82 is formed in a disc shape having the same diameter as the coupling plate 83. The driven rotor 82 is integrally formed in the end of the worm shaft 22. The driven rotor 82 is not limited to this, but may be coupled to the worm shaft 22 after being formed as an independent member from the worm shaft 22. The driven rotor 82 is formed coaxial with the worm shaft 22. Both of the driven rotor 82 and the worm shaft 22 are made of, for example, a metal. An outer circumferential portion of the driven rotor 82 has a driven cylinder 82a which somewhat protrudes toward the coupling plate 83.

The driven cylinder 82a has a driven surface 82c facing the coupling plate 83. The driven surface 82c has six driven protrusions 82b at a uniform interval in the circumferential direction. Each of the driven protrusions 82b can be engaged with a third locking protrusion 83e. Each of the driven protrusions 82b is formed in a triangular shape which is the same shape as the third locking protrusion 83e. The driven protrusion 82b and the third locking protrusion 83e serve as a triangular contact portion protruding so as to be brought into contact with each other. When the coupling plate 83 is brought into contact with the drive contact surface 81h, a gap exists between the driven rotor 82 and the coupling plate 83 in such a manner that the driven rotor 82 comes to a non-coupled state with the coupling plate 83.

Figure 32A:
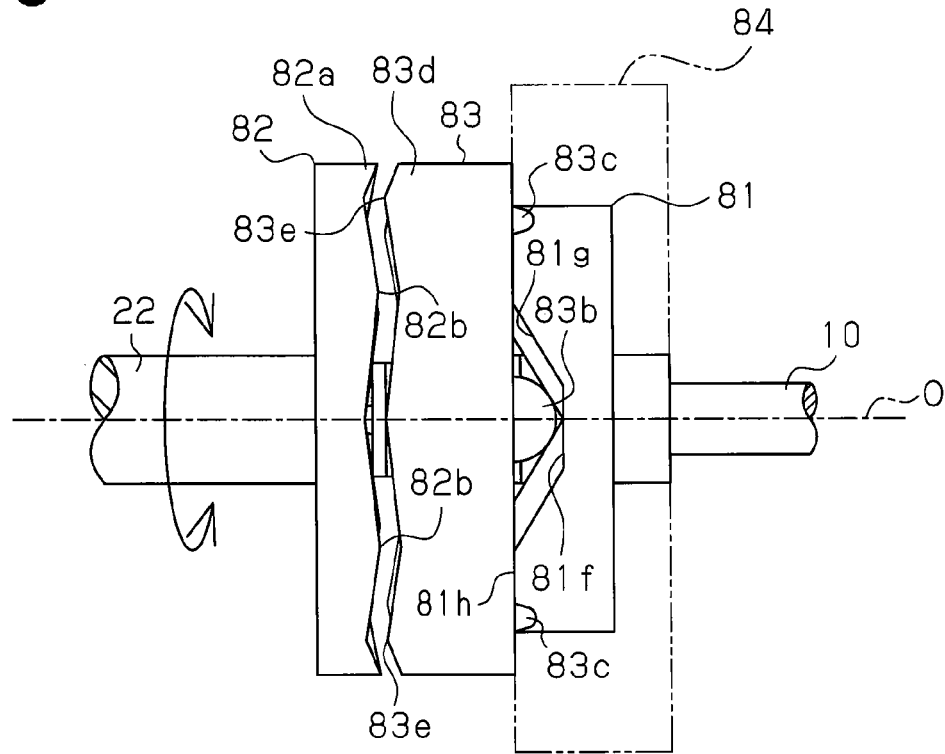
Figure 32B:
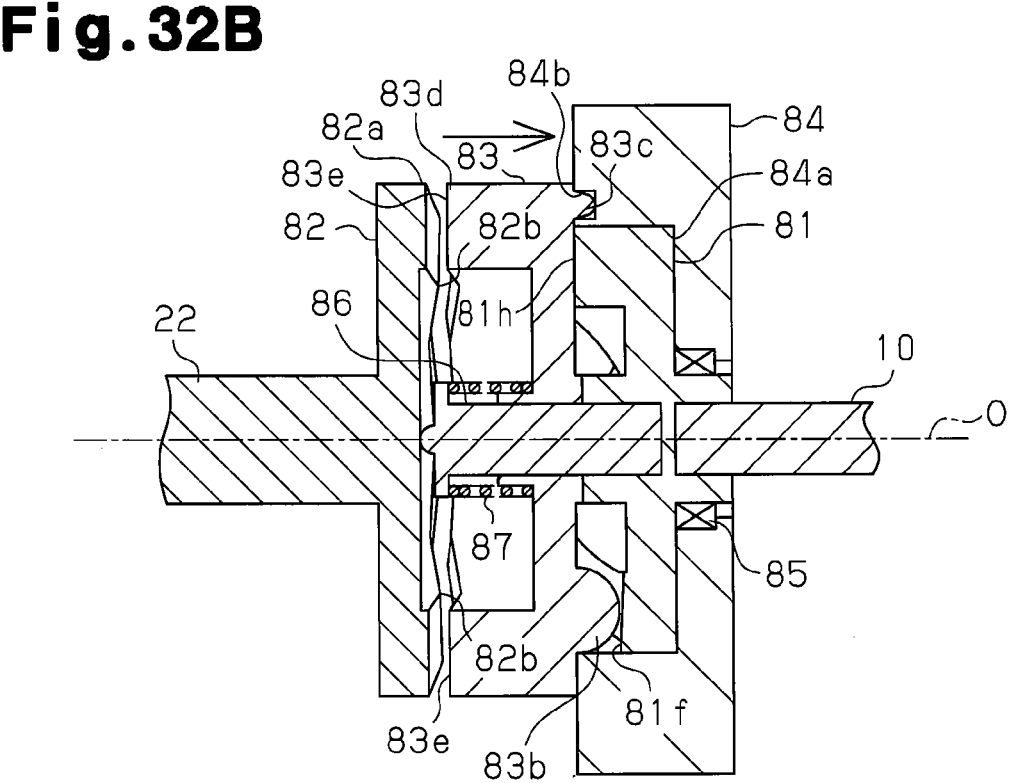

When the motor main body 2 is not driven for manually operating the slide door 152, the coil spring 87 brings the coupling plate 83 into contact with the drive contact surface 81h as shown in FIG. 32B. In this case, each of the drive recesses 81f accommodates the entirety of the corresponding first locking protrusion 83b. Each of the fixed recesses 84b accommodates the entirety of the corresponding second locking protrusion 83c.

As shown in FIGS. 29A, 29B, 32A, and 32B, when the coupling plate 83 is brought into contact with the drive contact surface 81h, the coupling plate 83 is in a non-coupled state with respect to the driven rotor 82. Accordingly, the worm shaft 22 is shut off from the rotary shaft 10. In other words, the rotary load of the output shaft 23a is reduced. Accordingly, the output shaft 23a is easily rotated from the load portion, and the slide door 152 is manually operated easily.

Figure 31A:
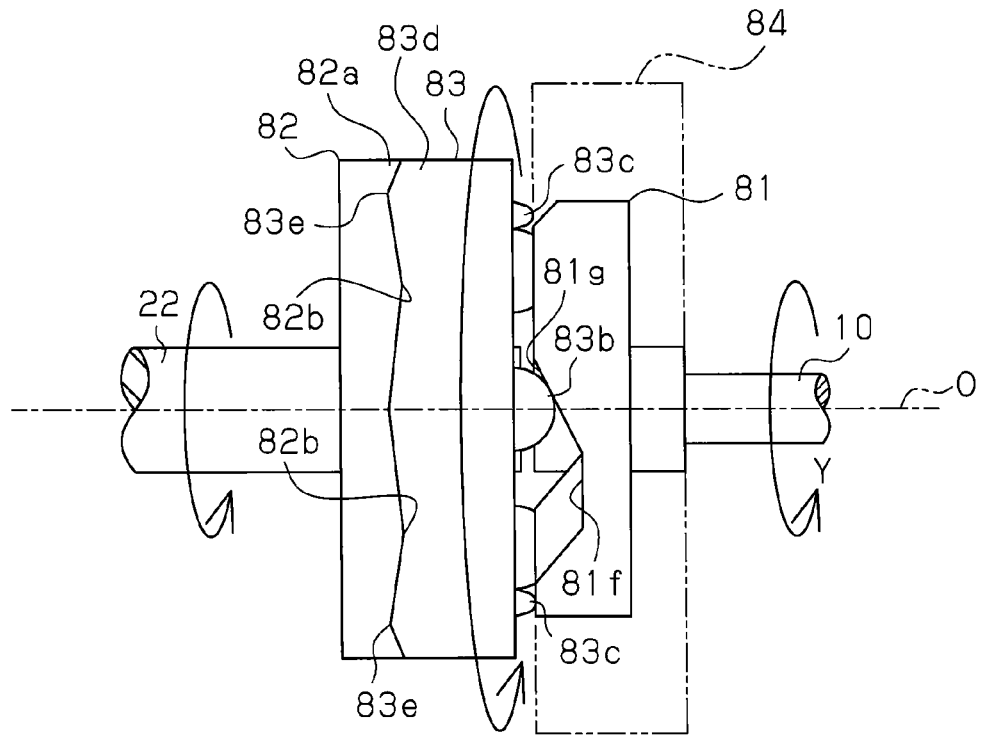
Figure 31B:
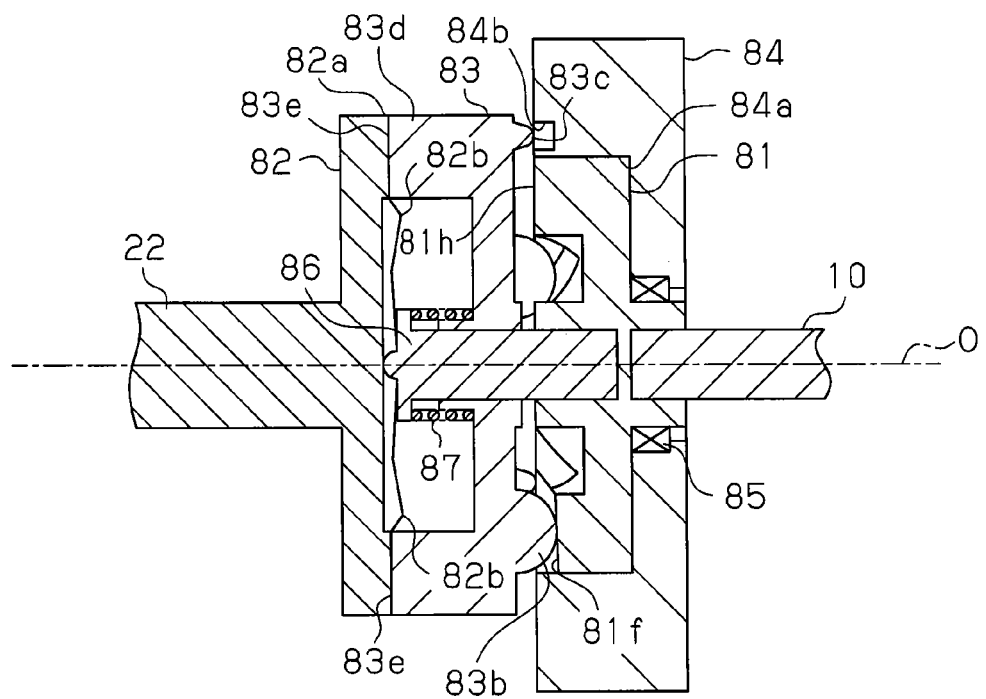

As shown in FIGS. 31A and 31B, when each of the second locking protrusions 83c is disengaged from the fixed recess 84b, if the driven cylinder 82a is rotated so as to be brought into contact with the coupling cylinder 83d at a time when the motor main body 2 is not driven, the coupling cylinder 83d is rotated together therewith by a certain amount. As a result, each of the fixed recesses 84b faces the second locking protrusion 83c and accommodates the second locking protrusion 83c.

As shown in FIGS. 29B and 32B, since each of the fixed recesses 84b accommodates the second locking protrusion 83c, the coupling plate 83 is locked to the fixed plate 84 in the circumferential direction. Therefore, the coupling plate 83 is not rotated. In other words, even if the driven rotor 82 is rotated at a time of manually operating the slide door 152, the coupling plate 83 is prevented from being rotated together therewith.

Figure 29A:
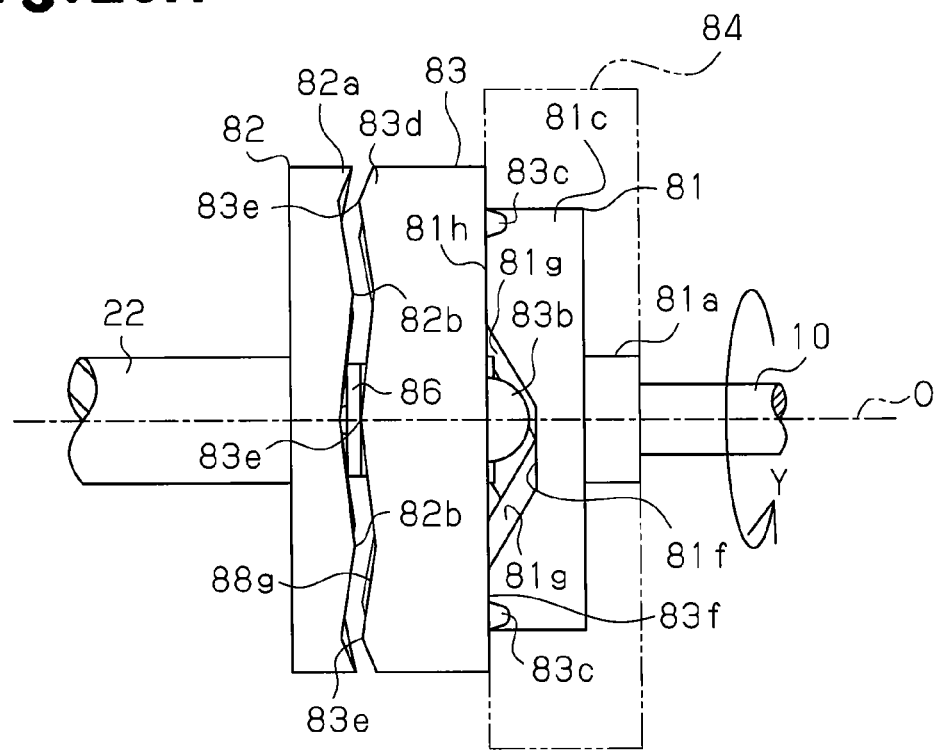
FIG. 29A is a side elevational view of the fourth clutch shown in FIG. 27.
Figure 29B:
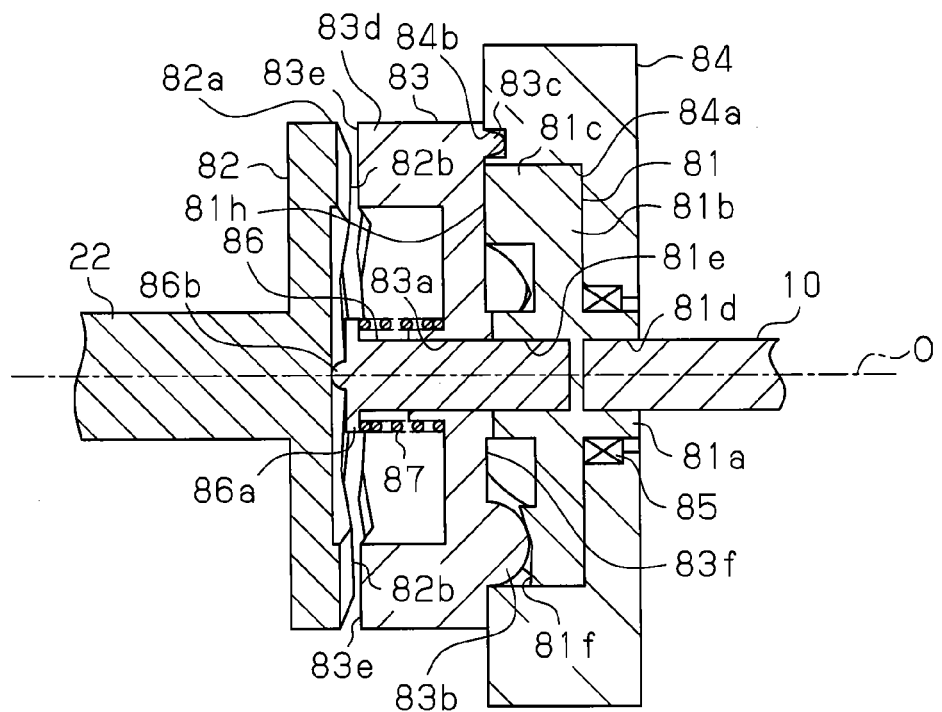
FIG. 29B is a cross-sectional view of the fourth clutch shown in FIG. 29A.

When the motor main body 2 is in the drive state for electrically operating the slide door 152, if the drive rotor 81 is rotated in a rotating direction Y as shown in FIGS. 29A and 29B, each of the first locking protrusions 83b is brought into contact with the drive inclined surface 81g.

Figure 30A:
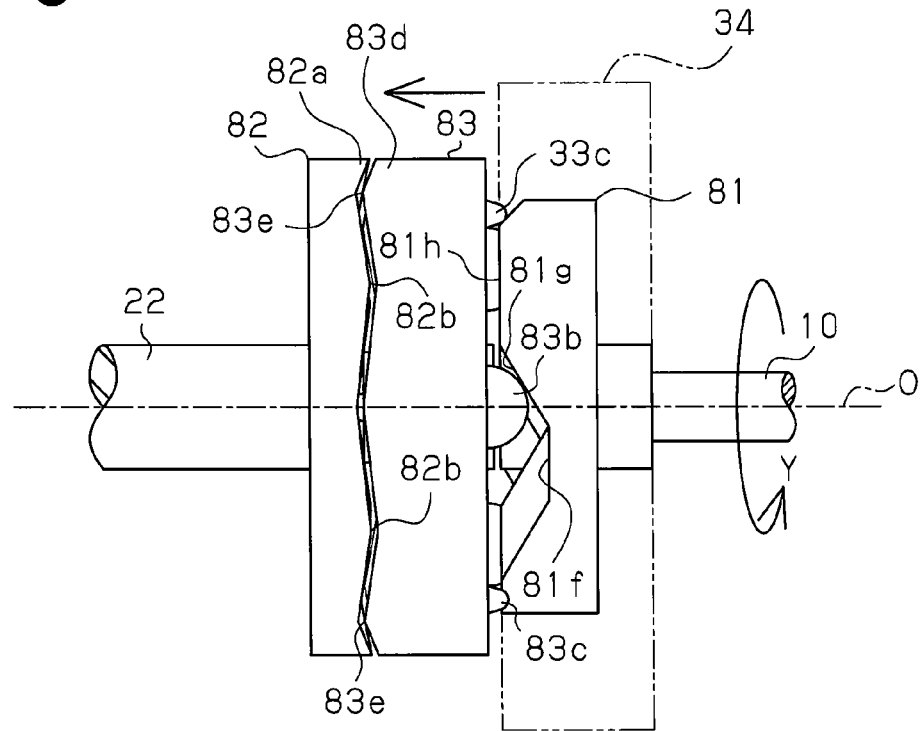
Figure 30B:
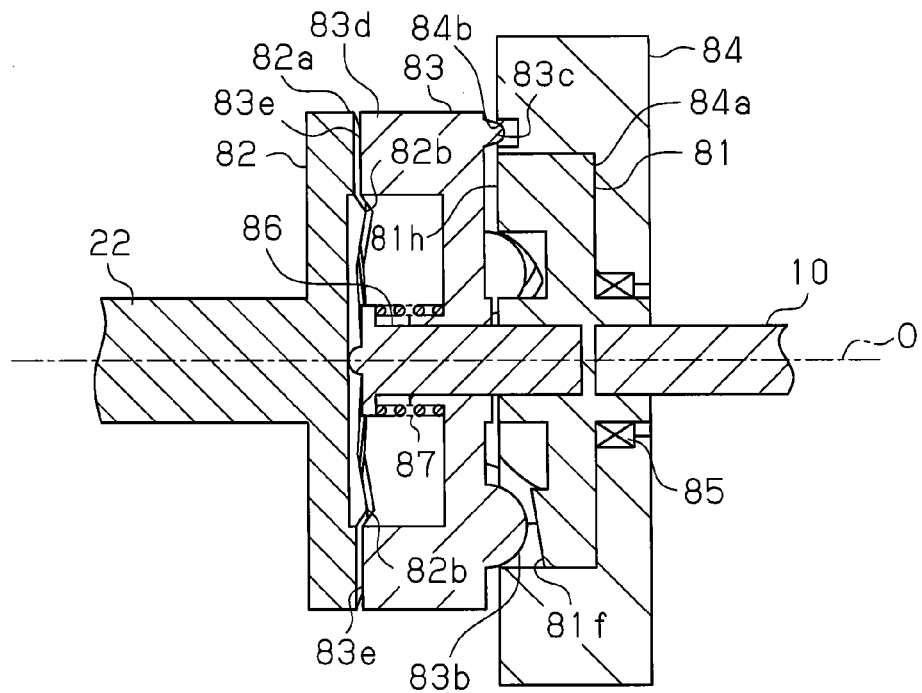

As shown in FIG. 30B, as long as each of the second locking protrusions 83c is accommodated in the fixed recess 84b, even if the drive rotor 81 is further rotated, the coupling plate 83 is not rotated, but is moved in the axial direction so as to approach the driven rotor 82. In other words, the rotating force which the drive inclined surface 81g applies to the first locking protrusion 83b is converted into the urging force in the axial direction, and moves the coupling plate 83 toward the driven rotor 82 against the urging force of the coil spring 87. As a result, each of the second locking protrusions 83c is moved in a direction of being disengaged from the fixed recess 84b.

As shown in FIGS. 31A and 31B, in a state in which the coupling cylinder 83d is brought into contact with the driven cylinder 82a, the third locking protrusion 83e is engaged with the driven protrusion 82b. In this state, the entirety of each of the second locking protrusions 83c is disengaged from the fixed recess 84b. In other words, the rotation of the coupling plate 83 is allowed. As a result, the drive inclined surface 81g rotates the coupling plate 83 and the driven rotor 82 while pressing the coupling plate 83 to the driven rotor 82. The operations in FIGS. 29A to 31B are the same when the drive rotor 81 is rotated in the opposite direction.

As mentioned above, the rotating force of the rotary shaft 10 generated by driving the motor main body 2 is transmitted to the driven rotor 82 via the drive rotor 81 and the coupling plate 83. As a result, the slide door 152 is electrically operated.

If the motor main body 2 is stopped, the coil spring 87 brings the coupling plate 83 into contact with the drive rotor 81, and makes the coupling plate 83 be disconnected from the driven rotor 82, as shown in FIG. 32B. In other words, the worm shaft 22 is returned to the state of being shut off from the rotary shaft 10.

In the case of manually operating the slide door 152, the coil spring 87 makes the coupling plate 83 separate from the driven rotor 82. In other words, the rotary shaft 10 is shut off from the worm shaft 22. Accordingly, it is easy to manually operate the slide door 152.

The fourth embodiment has the following advantages.

(11) If the drive rotor 81 transmits the rotating force to the coupling plate 83 at a time of driving the motor main body 2, the coupling plate 83 is moved in the axial direction. In other words, the coupling plate 83 is moved against the urging force of the coil spring 87 so as to be coupled to the driven rotor 82. Since the coupling plate 83 is coupled to the driven rotor 82, the drive rotor 81 rotates the driven rotor 82 via the coupling plate 83. Since the second locking protrusion 83c is disconnected from the fixed recess 84b, the rotation of the coupling plate 83 is allowed.

At a time when the motor main body 2 is not driven, the fourth clutch 144 is arranged at a position where the coupling plate 83 cannot be locked with the driven rotor 82 in the rotating direction by the urging force of the coil spring 87. Accordingly, the driven rotor 82 is shut off from the drive rotor 81. As a result, the fourth clutch 144 shuts off the rotary shaft 10 and the worm shaft 22 at a time when the motor main body 2 is not driven. Therefore, in the case of manually operating the slide door 152 or the like, it is not necessary to rotate the rotary shaft 10, and it is possible to reduce the load of the manual operation of the slide door 152.

Since the fixed recess 84b accommodates the second locking protrusion 83c, it is possible to prevent an unnecessary rotation of the coupling plate 83. Accordingly, it is easy to prevent an erroneous operation of the fourth clutch 144. As a result, the fourth clutch 144 and the motor device 1 are likely to be stably operated.

(12) The second locking protrusion 83c is formed in the coupling plate 83, and the fixed recess 84b is formed in the fixed plate 84. Since the coupling plate 83 is moved in the axial direction, the second locking protrusion 83c is inserted to or disengaged from the fixed recess 84b. As a result, the rotation of the coupling plate 83 is regulated or allowed. Therefore, it is possible to regulate or allow the rotation of the coupling plate 83 on the basis of the comparatively easy structure.

The fixed plate 84 is fixed to the brush holder 7, which is an existing motor part. Accordingly, any member for fixing the fixed plate 84 is not independently necessary, and it is possible to suppress an increase of the parts of the motor device 1.

(13) The driven rotor 82 and the coupling plate 83 respectively have the driven protrusion 82b and the third locking protrusion 83e protruding so as to be brought into contact with each other. Accordingly, the coupling plate 83 is easily and securely locked to the driven rotor 82 in the rotating direction. A protruding shape of each of the driven protrusion 82b and the third locking protrusion 83e is a triangular shape. Accordingly, the driven protrusion 82b is easily engaged with the third locking protrusion 83e.

FIGS. 33 to 39 show a fifth clutch 40 according to a fifth embodiment of the present invention. Same or like reference numerals are given to components of the fifth embodiment that are the same as or like corresponding components of the first clutch 30, which is shown in FIGS. 1 to 7. Explanation of these components are omitted from the following description.

Figure 35:
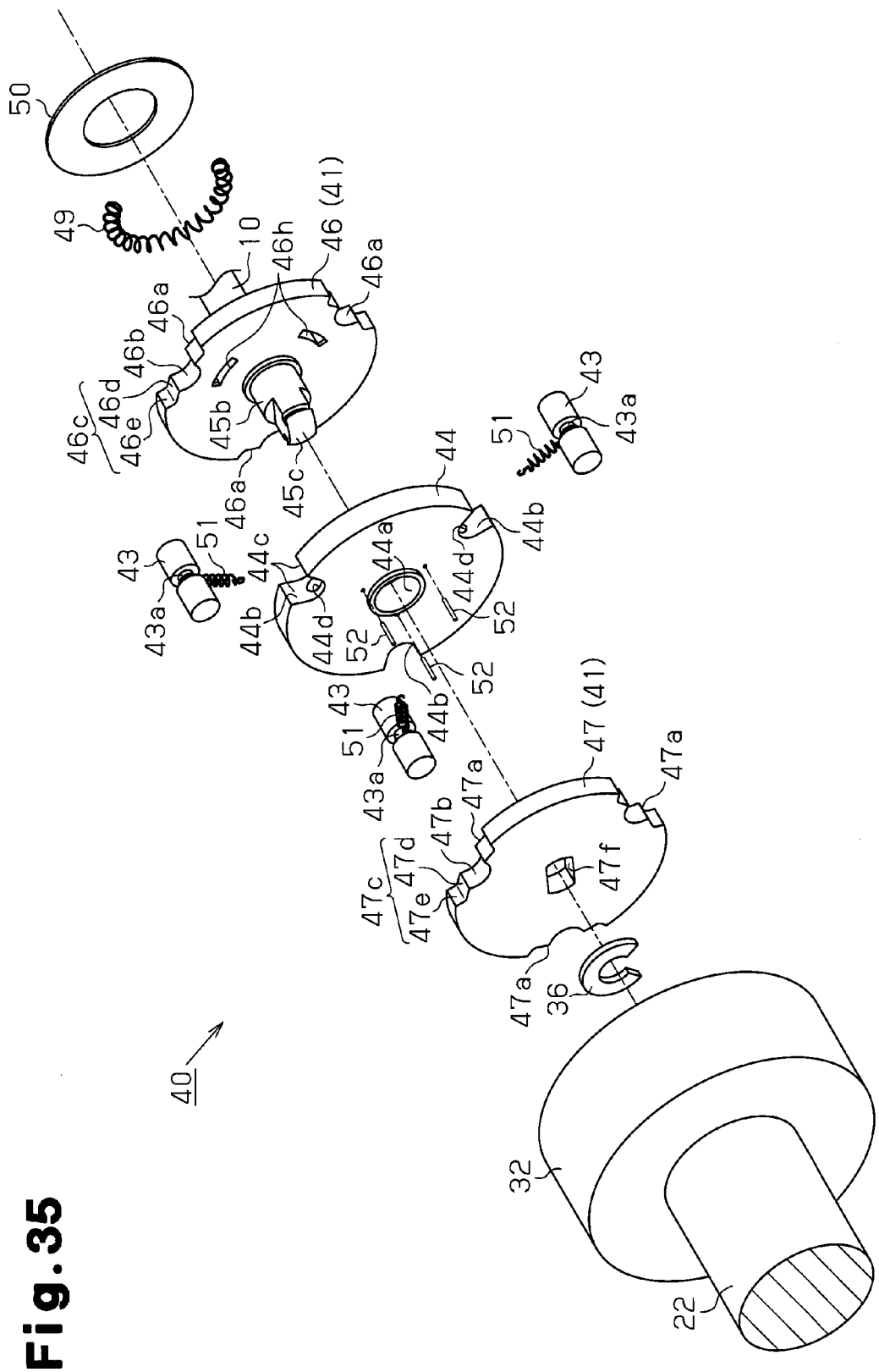
FIG. 35 is an exploded perspective view of the fifth clutch shown in FIG. 33 as viewed from the side corresponding to a worm shaft.

As shown in FIG. 35, the fifth clutch 40 includes a first drive rotor 41, a driven cylinder 32, three roller members 43, and a second drive rotor 44. The first drive rotor 41 functions as a drive coupling portion and the second drive rotor 44 functions as an intermediate plate. Each of the roller members 43 functions as a power transmitting member arranged between the first drive rotor 41 and the driven cylinder 32. The driven cylinder 32 is identical with the corresponding component shown in FIGS. 1 to 7. The second drive rotor 44 has a support hole 44a, which is identical with the support hole 34a of the second drive rotor 34 shown in FIGS. 1 to 7. The second drive rotor 44 also has a second drive recess 44b, which is identical with the second drive recess 34b, and a second drive inclined surface 44c, which is identical with the second drive inclined surface 34c.

Figure 36:
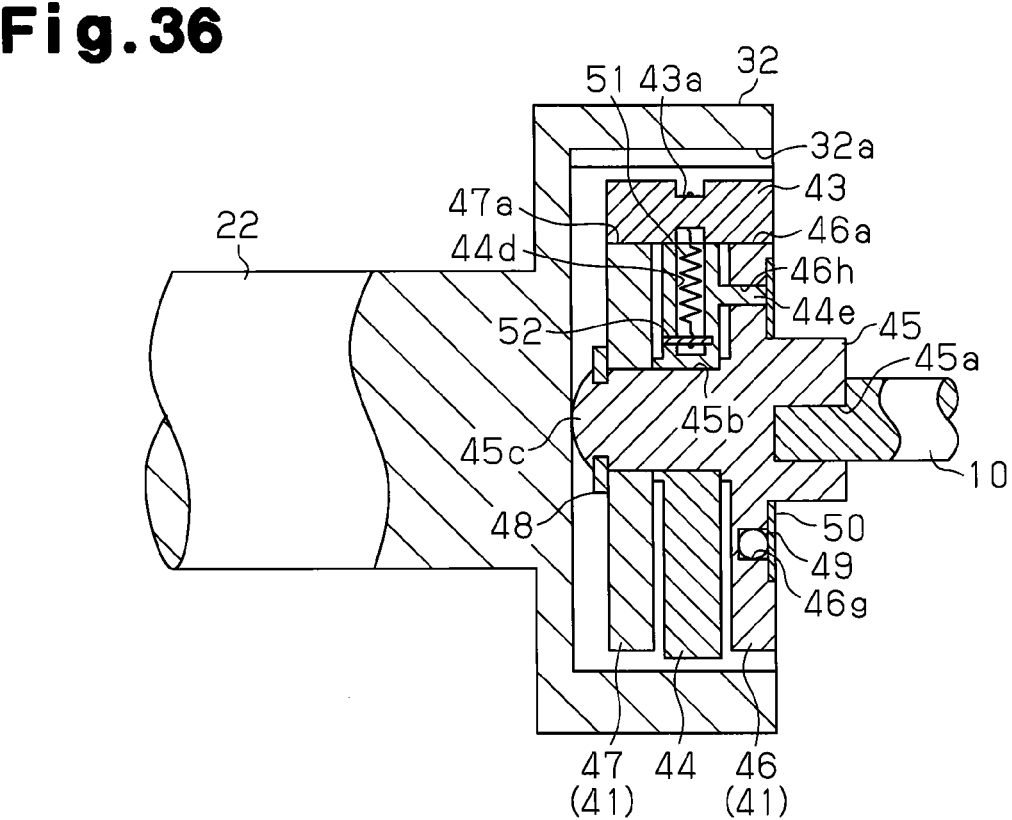
FIG. 36 is a vertical cross-sectional view of FIG. 33.
Figure 37:
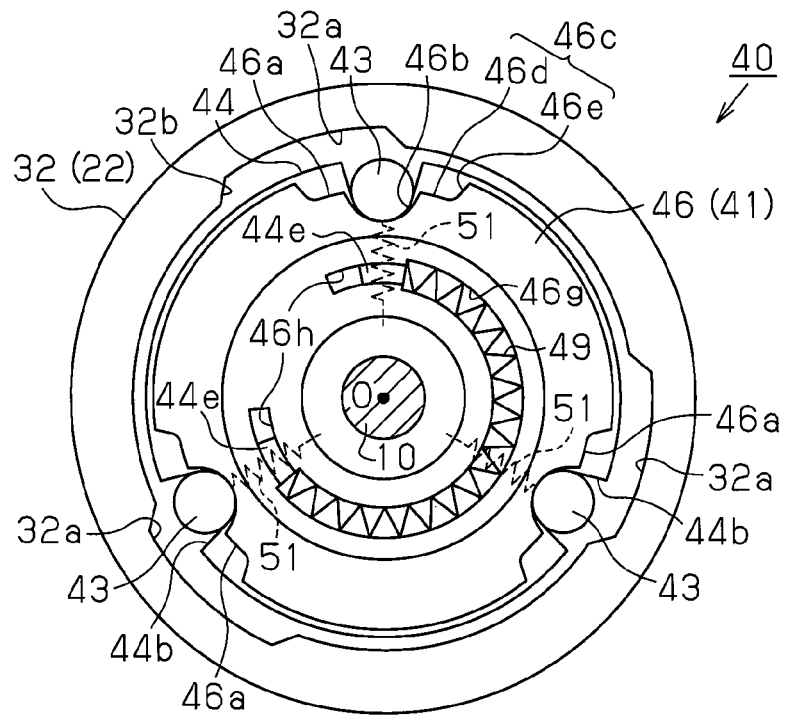
FIG. 37 is a plan view of the fifth clutch shown in FIG. 36 as viewed from the side corresponding to a rotary shaft.
Figure 38:
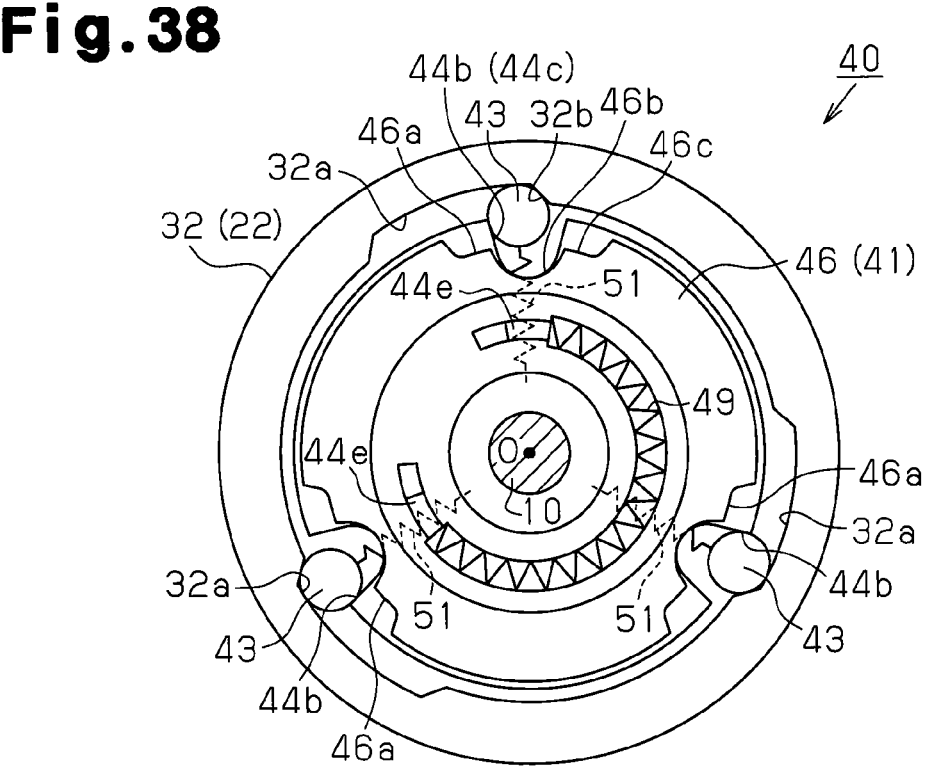
FIGS. 38 and 39 are plan views illustrating operation of the fifth clutch shown in FIG. 37.
Figure 39:
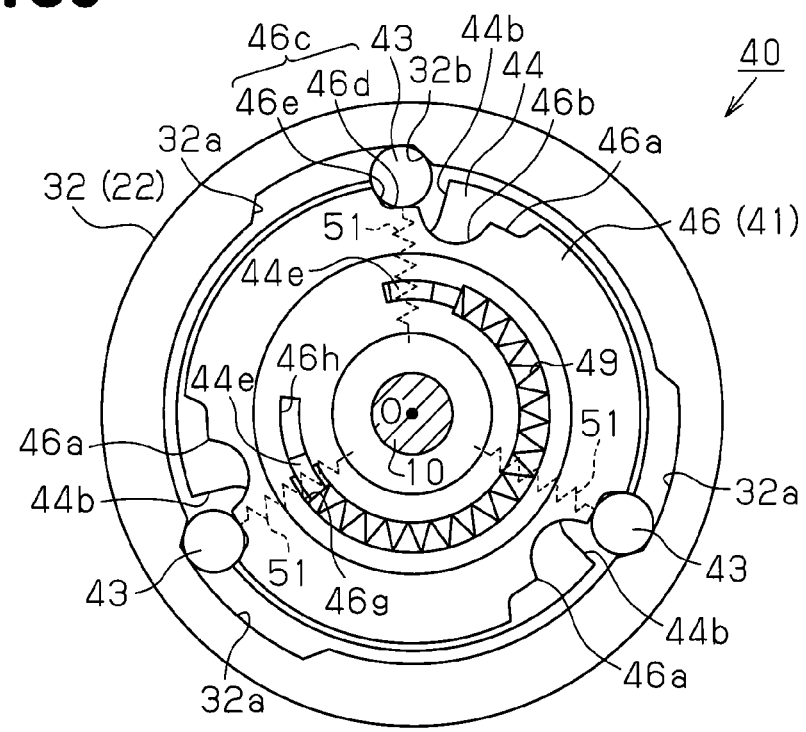

With reference to FIGS. 35 and 36, the first drive rotor 41 includes a coupling shaft 45, a first clamping plate 46, and a second clamping plate 47. The first clamping plate 46 is a disk functioning as a first drive plate and a second clamping plate 47 is a disk functioning as a second drive plate. The coupling shaft 45 is connected to a rotary shaft 10 in such a manner that the coupling shaft 45 is rotatable coaxially and integrally with the rotary shaft 10. The first clamping plate 46 and the second clamping plate 47 rotate integrally with the coupling shaft 45. The coupling shaft 45 has a substantially columnar shape. In FIGS. 37 to 39, the second clamping plate 47 is located behind the second drive rotor 44 and thus invisible. However, the second clamping plate 47 is arranged in the same manner as the first clamping plate 46.

As illustrated in FIG. 36, a proximal end surface of the coupling shaft 45 has a coupling hole 45a through which the coupling shaft 45 is engaged with the rotary shaft 10 in such a manner that the coupling shaft 45 becomes rotatable coaxially and integrally with the rotary shaft 10. The coupling hole 45a has a substantially D-shaped cross section. The first clamping plate 46 is formed integrally with the coupling shaft 45 at an axial central position of the coupling shaft 45 and in a flange-like shape. The coupling shaft 45 has a shaft support portion 45b and a fixing portion 45c, which are arranged in this order from the side corresponding to the first clamping plate 46 toward the distal end of the coupling shaft 45. The shaft support portion 45b supports the second drive rotor 44 in such a manner as to allow the second drive rotor 44 to rotate relative to the first drive rotor 41. The fixing portion 45c is engaged with a central hole 47f of the second clamping plate 47 in such a manner that the fixing portion 45c becomes rotatable integrally with the second clamping plate 47. The fixing portion 45c and the central hole 47f each have two parallel surfaces through which the fixing portion 45c and the central hole 47f are engaged with each other in a manner rotatable integrally. A lock ring 36 prevents the second clamping plate 47 from separating from the fixing portion 45c. The first clamping plate 46 and the second clamping plate 47 are arranged parallel with each other with the second drive rotor 44 located between the first clamping plate 46 and the second clamping plate 47 in the axial direction, in such a manner that the first and second clamping plates 46, 47 rotate integrally with the coupling shaft 45.

Figure 34:
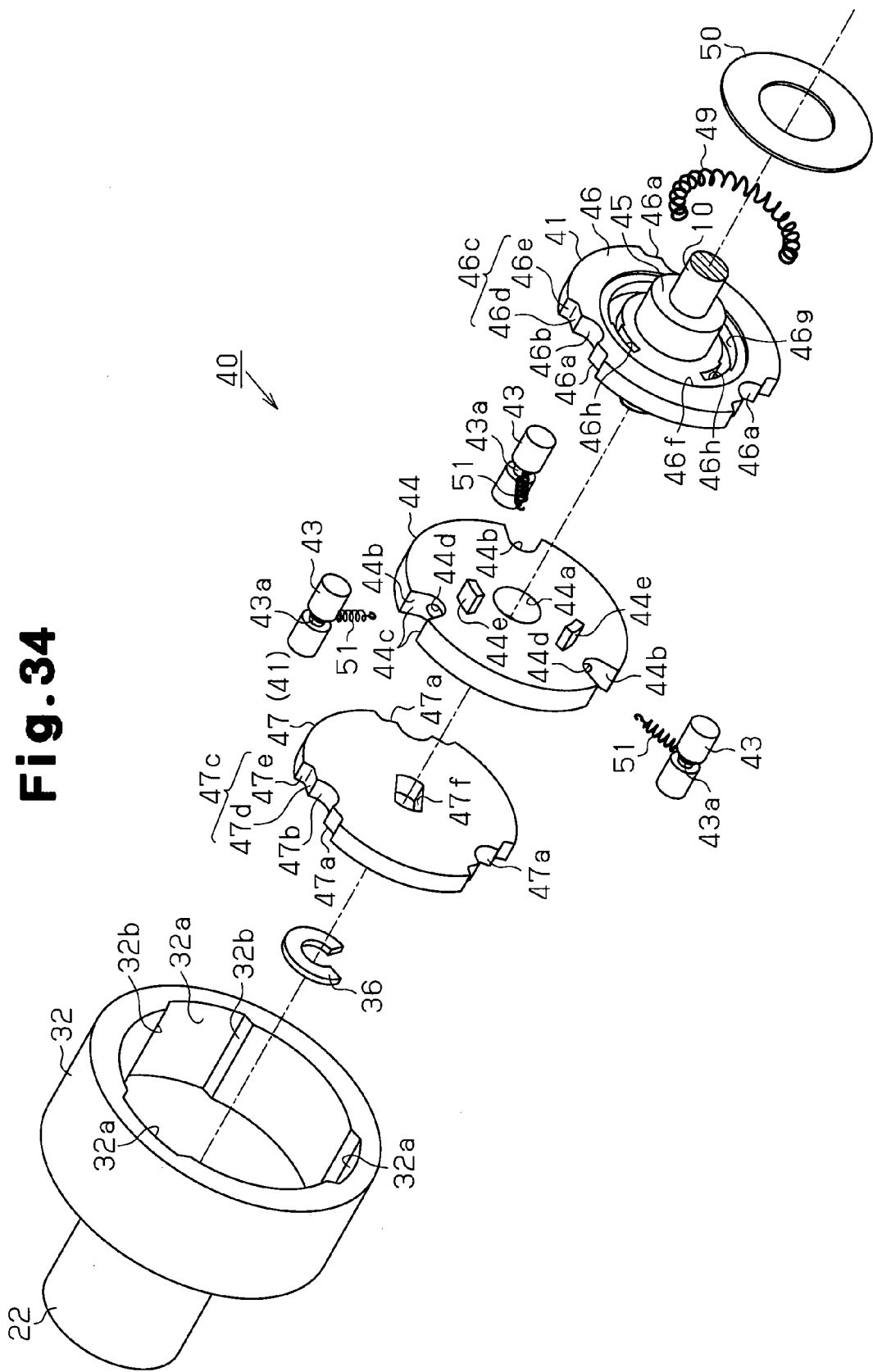
FIG. 34 is an exploded perspective view of the fifth clutch shown in FIG. 33 as viewed from the side corresponding to a motor main body.

With reference to FIGS. 34 and 35, an outer circumferential portion of the first clamping plate 46 and an outer circumferential portion of the second clamping plate 47 are shaped and sized identically with each other. The first clamping plate 46 has three drive recesses 46a, which are recessed inwardly from the outer circumferential surface of the first clamping plate 46. Similarly, the second clamping plate 47 has three drive recesses 47a. The drive recesses 46a, 47a each function as engagement recesses with respect to the corresponding roller members 43. The drive recesses 46a, 47a are shaped and sized identically with each other and spaced at 120 degrees in a circumferential direction. The second clamping plate 47 is positioned with respect to the coupling shaft 45 in such a manner that the drive recesses 46a are aligned with the corresponding drive recesses 47a in the axial direction. Each of the drive recesses 46a has a drive accommodating portion 46b and a pair of drive engagement portions 46c. The drive engagement portions 46c are located at opposing sides of the drive accommodating portion 46b. In other words, the drive engagement portions 46c are arranged at positions corresponding to both directions of rotation with respect to the drive accommodating portion 46b. Similarly, each of the drive recesses 47a has a drive accommodating portion 47b and a pair of drive engagement portions 47c. Since the drive recess 47a is shaped identically with the drive recess 46a, the drive recess 46a will be mainly explained in the following description. Each one of the drive accommodating portions 46b functions as an accommodating portion capable of accommodating the corresponding one of the roller members 43. Each of the drive engagement portions 46c functions as an engagement portion with respect to the corresponding one of the roller members 43.

As shown in FIG. 37, each drive accommodating portion 46b is recessed in a semi-circular shape in a radial inward direction as viewed in the axial direction. The total of three drive accommodating portions 46b are spaced at regular intervals in a circumferential direction of the first clamping plate 46. Each of the drive recesses 46a is shaped to have two portions shaped to form mirror images to each other with respect to a radial line extending in a radial direction and on the rotational center O. The rotational center O is located on the axes of the rotary shaft 10 and the worm shaft 22. The circumferential dimension of each drive recess 46a corresponds to an angular range of approximately 60 degrees with respect to the rotational center O. In other words, one of the drive engagement portions 46c, the drive accommodating portion 46b, and the other one of the drive engagement portions 46c extend in a circumferential direction in such a manner as to cover the angular range of approximately 60 degrees. Each of the drive recesses 46a extends in the circumferential direction substantially in correspondence with the same angular range as the driven recesses 32a of the driven cylinder 32.

With reference to FIG. 37, the depth of each drive accommodating portion 46b is set in such a manner that the drive accommodating portion 46b fully accommodates the corresponding roller member 43 in a radial inward direction with respect to the outer circumferential surface of the first clamping plate 46. In other words, the radial dimension of each drive accommodating portion 46b is set in such a manner that the roller member 43 is accommodated in the drive accommodating portion 46b without projecting from the outer circumferential surface of the first clamping plate 46. That is, the radial dimension between the outer circumferential surface of the first clamping plate 46 and the bottom of each drive accommodating portion 46b is equal to the radial dimension between the outer circumferential surface of the second drive rotor 44 and the bottom of each second drive recess 44b.

As illustrated in FIG. 39, the radial dimension of each drive engagement portion 46c is set in such a manner that the corresponding roller member 43, which is received in the drive engagement portion 46c, slightly projects from the outer circumferential surface of the first clamping plate 46 in a radial outward direction. Each drive engagement portion 46c includes a drive restricting surface 46d and a drive inclined surface 46e. Each drive engagement portion 47c also includes a drive restricting surface 47d and a drive inclined surface 47e. The drive restricting surface 46d functions as a restricting surface portion that restricts movement of the roller member 43 in a radial inward direction. The drive restricting surface 46d is formed continuously from the drive accommodating portion 46b. The drive restricting surface 46d is a flat surface that extends substantially vertical with respect to a radial line extending on the drive accommodating portion 46b. In other words, the drive restricting surface 46d is shaped as a flat surface formed by moving a corresponding portion of the outer circumferential surface of the first clamping plate 46 in a radial inward direction and in a manner substantially parallel with the remaining portions of the outer circumference of the first clamping plate 46.

The drive inclined surface 46e is an inclined surface portion extending between the drive restricting surface 46d and the outer circumferential surface of the first clamping plate 46. Each of the drive inclined surfaces 46e are inclined in such a manner that of each of the drive recesses 46a is spread toward an outer side in a radial outward direction. With reference to FIG. 39, the interval between each drive restricting surface 46d and the bottom of the corresponding driven recess 32a is slightly greater than, but substantially equal to, the diameter of each roller member 43. Thus, when the roller members 43 are located in the corresponding drive engagement portions 46c as illustrated in FIG. 39, a portion of each roller member 43 projects radially outward from the outer circumferential surface of the first clamping plate 46 and received in the corresponding driven recess 32a.

The characteristics of the first clamping plate 46, which are not exhibited by the second clamping plate 47, will be explained in the following. As shown in FIG. 34, the surface of the first clamping plate 46 facing the rotary shaft 10 has an annular step portion 46f, which forms an annular groove arranged around the rotational center O. In other words, the annular step portion 46f is located at a position opposite to the second clamping plate 47. An arcuate accommodating groove 46g is defined in the bottom surface of the annular step portion 46f. The accommodating groove 46g accommodates a compression coil spring 49 in a compressed state.

The accommodating groove 46g extends in such a manner as to cover a range corresponding to substantially three fourths of the circumference about the rotational center O. That is, the accommodating groove 46g has an arcuate shape extending over to the range including the three drive recesses 46a. Both ends of the accommodating groove 46g radially face the corresponding separate ones of the drive recesses 46a. A guide groove 46h is formed in each of the ends of the accommodating groove 46g. With reference to FIG. 35, the guide grooves 46h axially extend through the first clamping plate 46. However, the accommodating groove 46g has a bottom wall and does not extend through the first clamping plate 46. Each of the guide grooves 46h extends in an arcuate shape and continuously from the accommodating groove 46g in a circumferential direction. The radial dimension of each guide groove 46h is smaller than the radial dimension of the accommodating groove 46g. The radial dimension, or the width, of the accommodating groove 46g is uniform in the circumferential dimension. The radial dimension of each guide groove 46h is also uniform in the circumferential direction.

Figure 33:
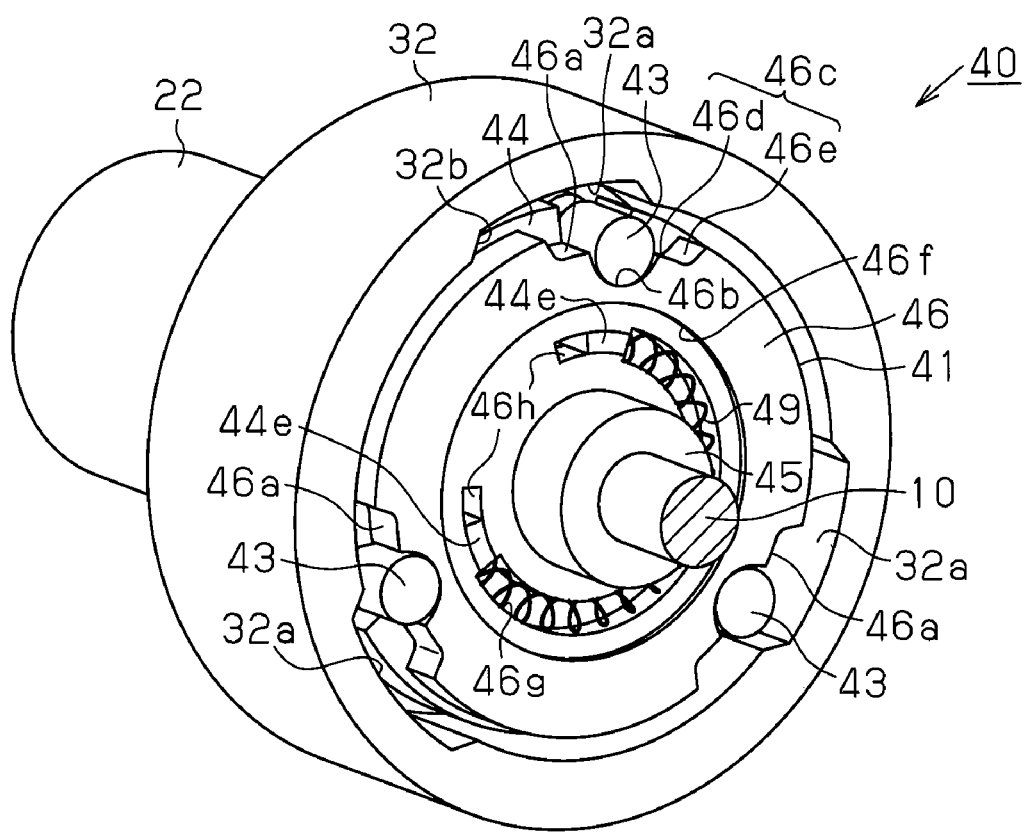
FIG. 33 is a perspective view showing a fifth clutch according to a fifth embodiment.

As illustrated in FIGS. 33 and 37, each of the ends of the compression coil spring 49 is locked to a step between the corresponding guide groove 46h and the accommodating groove 46g. With reference to FIGS. 34 and 36, an annular lid member 50 closes an annular step portion 46f to prevent the compression coil spring 49 from falling off. The second drive rotor 44 has a pair of insertion projections 44e facing the first clamping plate 46. Each of the insertion projections 44e has a square pole-like shape and is received in the corresponding one of the guide grooves 46h. As shown in FIG. 37, the circumferential interval between the insertion projections 44e is equal to the circumferential dimension of the accommodating groove 46g. Specifically, when the second drive rotor 44 does not move relative to the first clamping plate 46 as illustrated in FIG. 37, the insertion projections 44e are prevented from entering the accommodating groove 46g. FIG. 37 represents a state in which the second drive rotor 44 is arranged at a predetermined rotational position relative to the first clamping plate 46. When the second drive rotor 44 moves relative to the first clamping plate 46 as illustrated in FIG. 39, the insertion projections 44e are received in the accommodating groove 46g.

As shown in FIGS. 36 and 37, the second drive rotor 44 is a disk having a substantially equal diameter with the diameter of the first clamping plate 46. Like the second drive rotor 34 shown in FIGS. 1 to 7, the second drive rotor 44 has three second drive recesses 44b. The shaft support portion 45b, which is located between the first clamping plate 46 and the second clamping plate 47, is passed through the support hole 44a formed at the center of the second drive rotor 44. The second drive rotor 44 is supported by and rotatable relative to the shaft support portion 45b. After the second drive rotor 44 is secured to the shaft support portion 45b, the second clamping plate 47 is secured to the shaft support portion 45b. This prevents the second clamping plate 47 from separating from the shaft support portion 45b. Each roller member 43 is passed through and received in the drive recess 46a, the second drive recess 44b, and the drive recess 47a.

With reference to FIGS. 35 and 36, the second drive rotor 44 accommodates three tension coil springs 51 in the interior of the second drive rotor 44. Each one of the tension coil springs 51 functions as a second urging member that urges the corresponding one of the roller members 43 in a radial inward direction of the second drive rotor 44. The second drive rotor 44 has accommodating holes 44d in which the corresponding tension coil springs 51 are received. Each one of the accommodating holes 44d extends radially inward from the deepest point of the corresponding one of the second drive recesses 44b. Each accommodating hole 44d has a circular cross-sectional shape. The radial outer end of each tension coil spring 51 is locked to a locking portion 43a formed at the center of the corresponding roller member 43. The radial inner end of the tension coil spring 51 is locked to the second drive rotor 44 through a locking pin 52.

Each tension coil spring 51 urges the corresponding roller member 43 toward the bottom of the associated second drive recess 44b. In other words, the tension coil spring 51 urges the roller member 43 to be maintained in the drive accommodating portions 46b, 47b. As a result, the roller members 43 are prevented from abruptly popping out from the drive accommodating portions 46b, 47b in radial outward directions. The urging force of each tension coil spring 51 is set in such a manner as to allow centrifugal force produced through rotation of the first clamping plate 46, the second clamping plate 47, and the second drive rotor 44 by the motor main body 2 to act to move each roller member 43 radially outward. In other words, the roller members 43 are each allowed to be moved toward a first clamping position and a second clamping position by the centrifugal force. With reference to FIG. 39, when located at the first clamping position, each roller member 43 is clamped by the first clamping plate 46, the second clamping plate 47, and the driven cylinder 32. With reference to FIG. 38, when arranged at the second clamping position, the roller member 43 is clamped by the second drive rotor 44 and the driven cylinder 32.

As illustrated in FIG. 34, the two insertion projections 44e of the second drive rotor 44 radially face the corresponding two of the three second drive recesses 44b. As the second drive recesses 44b are located at the positions coinciding with the positions of the corresponding drive accommodating portions 46b, 47b as viewed in the axial direction, with reference to FIGS. 37 and 38, the insertion projections 44e are arranged in the guide grooves 46h. Specifically, each of the insertion projections 44e is located at an end of the corresponding one of the guide grooves 46h closer to the accommodating groove 46g. In this state, each insertion projection 44e contacts the end of the compression coil spring 49 without further compressing the compression coil spring 49.

As the second drive rotor 44 rotates relative to the first clamping plate 46 as illustrated in FIG. 39, one of the insertion projections 44e is received in the accommodating groove 46g, thus further compressing the compression coil spring 49. The compression coil spring 49 thus urges the second drive rotor 44 in such a manner that the second drive recesses 44b are located at the positions coinciding with the positions of the corresponding drive accommodating portions 46b, 47b. In other words, the compression coil spring 49 operates to maintain the second drive rotor 44, the first clamping plate 46, and the second clamping plate 47 at predetermined positions relative to one another.

The driven cylinder 32 accommodates the first clamping plate 46 and the second clamping plate 47. The inner circumferential surface of the driven cylinder 32 faces the outer circumferential surface of the first clamping plate 46 and the outer circumferential surface of the second clamping plate 47.

As shown in FIG. 34, each of the roller members 43 has a substantially cylindrical body and a locking portion 43a with a smaller diameter, which is arranged at the axial center of the body. The axial dimension of the locking portion 43a is smaller than the thickness of the second drive rotor 44. The body of each roller member 43 thus contacts the second drive inclined surface 44c. With reference to FIG. 37, when each roller member 43 is fully received in the corresponding drive recesses 46a, 47a and the associated second drive recess 44b, the roller member 43 is located outside the corresponding driven recess 32a. In FIG. 37, the roller members 43 are held in non-engaged states, in which the roller members 43 are not engaged with the driven cylinder 32.

When the motor main body 2 is in a non-driven state, that is, when rotational drive force is not applied to the rotary shaft 10, the compression coil spring 49 operates to arrange the second drive recesses 44b at the positions coinciding with the positions of the drive accommodating portions 46b, 47b. In the state illustrated in FIG. 37, each of the tension coil springs 51 operates to accommodate the corresponding one of the roller members 43 in the interiors of the associated ones of the drive accommodating portions 46b, 47b and the second drive recesses 44b. Thus, the roller members 43 are each maintained in a non-engaged state with respect to the driven cylinder 32.

Accordingly, if the slide door 152 is manually opened or closed in the state of FIG. 37, the output shaft 24, the worm shaft 22, and the driven cylinder 32 are smoothly rotated while held in a state disconnected from the rotary shaft 10. In other words, the driven cylinder 32 races without becoming engaged with the second clamping plate 47 or the second drive rotor 44 in the rotational direction. Specifically, the rotary shaft 10, which may cause rotational load on the slide door 152, is disconnected from the worm shaft 22, thus allowing the output shaft 24 to rotate smoothly. This allows the slide door 152 to be manually opened or closed easily without requiring great manipulating force.

In contrast, if a command to automatically open or close the slide door 152 is generated, the motor main body 2 operates to rotate the rotary shaft 10, thus rotating the first clamping plate 46, the second clamping plate 47, and the second drive rotor 44. As a result, as illustrated in FIG. 38, each of the roller members 43 revolves about the rotational center O while maintained in a state engaged with the associated one of the second drive inclined surfaces 44c. While revolving, each roller member 43 receives centrifugal force produced through such revolution. This moves the roller member 43 in a radial outward direction against the urging force of the corresponding tension coil spring 51. The roller member 43 thus reaches the interior of the corresponding one of the driven recesses 32a. This clamps the roller member 43 between the corresponding driven inclined surface 32b and the associated drive inclined surface 44c. That is, the second drive rotor 44 first becomes engaged with the driven cylinder 32 in the rotational direction through the roller members 43.

As the roller members 43 are clamped between the driven inclined surfaces 32b and the second drive inclined surfaces 44c as illustrated in FIG. 38, the second drive rotor 44 receives reaction force from the driven cylinder 32. This rotates the second drive rotor 44 relative to the first clamping plate 46 and the second clamping plate 47 against the urging force of the compression coil spring 49. Each of the roller members 43 thus contacts the corresponding ones of the drive inclined surfaces 46e, 47e, as shown in FIG. 39. This causes the drive inclined surfaces 46e, 47e and the associated driven inclined surface 32b to clamp the roller member 43. As a result, the driven cylinder 32 becomes engaged with the first clamping plate 46 and the second clamping plate 47 through the roller members 43 in the rotational direction. Specifically, the first clamping plate 46 and the second clamping plate 47 transmit power to the driven cylinder 32 through the roller members 43. Since the drive restricting surfaces 46d, 47d restrict radial inward movement of the roller members 43, the driven cylinder 32, the first clamping plate 46, and the second clamping plate 47 are prevented from being abruptly disengaged from one another. In other words, the first drive rotor 41 has the drive restricting surfaces 46d, 47d that function as restricting surface portions.

As illustrated in FIG. 39, when the first drive rotor 41 and the driven cylinder 32 clamp the roller members 43, the drive restricting surfaces 46d, 47d restrict radial inward movement of the roller members 43. In other words, the roller members 43 are prevented from moving toward non-clamping positions, or non-engaging positions, with respect to the driven cylinder 32. The drive restricting surfaces 46d, 47d maintain the roller members 43 at projecting positions at which the roller members 43 are engaged with the driven inclined surfaces 32*b*. The rotary shaft 10 is thus maintained connected to the worm shaft 22.

When the motor main body 2 is deactivated and thus the rotary shaft 10 is stopped, the reaction force applied to the second drive rotor 44 by the driven cylinder 32 through the roller members 43 decreases. Thus, the compression coil spring 49 operates to rotate the second drive rotor 44 relative to the first clamping plate 46 in a returning direction so that the positions of the second drive recesses 44*b* coincide with the positions of the drive accommodating portions 46*b*, 47*b*. As a result, the urging force of each tension coil spring 51 releases the corresponding roller member 43 from a clamped state. In other words, the first clamping plate 46 and the second clamping plate 47 are disengaged from the driven cylinder 32. The state illustrated in FIG. 37 is thus restored and the rotary shaft 10 is disconnected from the worm shaft 22. This permits manual opening and closing of the slide door 152. That is, like the first clutch 30, the fifth clutch 40 effectively operates in a switchable manner so that automatic opening and closing of the slide door 152 by the motor device 1 and manual opening and closing of the slide door 152 are both allowed.

The fifth clutch 40, which is shown in FIGS. 33 to 39, has the following advantages.

(14) As shown in FIG. 34, the first clamping plate 46 and the second clamping plate 47 form the first drive rotor 41. With reference to FIG. 39, the first clamping plate 46 and the second clamping plate 47 include the drive restricting surfaces 46*d* and the drive restricting surfaces 47*d*, respectively, which restrict radially inward movement of the roller members 43 that are engaged with the driven cylinder 32.

That is, when the motor main body 2 runs, the drive restricting surfaces 45*d*, 47*d* restrict movement of the roller members 43 that are clamped by the first and second clamping plates 46, 47 and the driven cylinder 32 toward the drive accommodating portions 46*b*, 47*b*, which correspond to the non-clamping positions. The first clamping plate 46 and the second clamping plate 47 are thus easily maintained in the states engaged with the driven cylinder 32 in the rotational direction. This facilitates reliable transmission of power generated by the motor main body 2 to the worm shaft 22. In other words, operation of the fifth clutch 40 is reliably stabilized.

(15) As shown in FIG. 37, the first clamping plate 46 has the two arcuate guide grooves 46*h*, which extend circumferentially from the accommodating groove 46*g*. The second drive rotor 44 has the two insertion projections 44*e*, which are received in the corresponding guide grooves 46*h*. The insertion projections 44*e* guide the second drive rotor 44 to rotate relative to the first clamping plate 46 and the second clamping plate 47. The compression coil spring 49 is received in the accommodating groove 46*g* in such a manner that the compression coil spring 49 is arranged between the two insertion projections 44*e*. As the second drive rotor 44 rotates relative to the first clamping plate 46 as illustrated in FIG. 39, one of the insertion projections 44*e* is received in the accommodating groove 46*g*, thus compressing the compression coil spring 49. Thus, the compression coil spring 49 maintains the second drive rotor 44 at the position at which the positions of the drive accommodating portions 46*b* coincide with the positions of the second drive recesses 44*b*, or a predetermined rotational position relative to the first clamping plate 46.

In this manner, the guide groove 46*h* and the insertion projections 44*e* allow smooth rotation of the second drive rotor 44 relative to the first and second clamping plates 46, 47 and further stabilize switching of the fifth clutch 40.

The urging member that maintains the second drive rotor 44 at the predetermined relative rotational position is configured by the single compression coil spring 49. The compression coil spring 49 is accommodated in the accommodating groove 46*g*. This reduces the size of the fifth clutch 40.

(16) As shown in FIG. 36, the second drive rotor 44 has the tension coil springs 51, which urge the roller members 43 towards the corresponding drive accommodating portions 46*b*, 47*b*. The urging force of each of the tension coil springs 51 is set in such a manner as to allow movement of the roller members 43 toward the driven recesses 32*a* due to the centrifugal force produced by revolution of the roller members 43 about the rotational center O. That is, the roller members 43 are movable in a manner switchable between the drive accommodating portions 46*b*, 47*b* corresponding to the non-clamping positions with respect to the driven cylinder 32 and the driven recesses 32*a* corresponding to the clamping positions with respect to the driven cylinder 32. Thus, when the roller members 43 are free from the centrifugal force, the roller members 43 are not clamped by the first and second clamping plates 46, 47, the second drive rotor 44, and the driven cylinder 32. In other words, when the motor main body 2 is in a stopped state, the first clamping plate 46, the second clamping plate 47, and the second drive rotor 44 are maintained in states disengaged from the driven cylinder 32 in the rotational direction. Operation of the fifth clutch 40 is thus easily stabilized.

(17) As shown in FIG. 36, the second drive rotor 44 has the accommodating holes 44*d* in which the corresponding tension coil springs 51 are accommodated. In other words, the tension coil springs 51 are received in the interior of the second drive rotor 44. Thus, the tension coil springs 51 do not interfere with the operation of the first clamping plate 46, the operation of the second clamping plate 47, and the operation of the second drive rotor 44. Further, this structure eliminates the necessity to save separate spaces for installing the tension coil springs 51. Accordingly, the tension coil springs 51 are arranged in such a manner that the first clamping plate 46, the second clamping plate 47, and the second drive rotor 44 are arranged mutually adjacently.

(18) As shown in FIG. 36, the first drive rotor 41 includes the first clamping plate 46 and the second clamping plate 47, which are provided at opposing sides of the second drive rotor 44. The first and second clamping plates 46, 47 transmit power to the driven cylinder 32 through the roller members 43. This allows the fifth clutch 40 to stably perform such transmission. Since the roller members 43 are urged by the tension coil springs 51, the operation of the roller members 43 may become unstable. However, the first clamping plate 46 and the second clamping plate 47 support the respective roller members 43 while clamping the associated locking portions 43*a*. This stabilizes operation of the roller members 43, which stabilizes, in turn, the operation of the fifth clutch 40.

Each of the embodiments mentioned above may be modified as follows.

The shapes of the first drive rotor 31, the driven cylinder 32, the roller member 33, and the second drive rotor 34, which form the first clutch 30 mentioned above, may be modified if necessary.

The first drive surface 31*a* is not limited to be defined by a pair of V-shaped first drive inclined surfaces 31*b*. For example, the entire first drive surface 31*a* may be formed in a curved surface.

The number of the guide grooves 31*c* is not limited to three, but may be modified as necessary.

The structure is made such that the driven recesses 32*a* are provided in the driven cylinder 32 and the roller member 33 is clamped by the driven recesses 32a. However, the driven recesses 32a may be omitted. Alternatively, roller members 33 may be clamped by inner circumferential surfaces having no recesses or protrusions.

The roller member 33 is not limited to the columnar shape, but may be formed in a spherical shape or an oval cross-sectional shape. The cross section of the roller member 33 may be formed in shapes other than the circular shape.

The number of the roller members 33 provided in the first clutch 30 is not limited to three, but may be set to two or less, or four or more. The number of each of the first drive surface 31a, the driven recess 32a and the second drive recess 34b is set to correspond to the number of the roller member 33.

The number of the insertion projections 34d provided in the second drive rotor 34 is not limited to three, but may be modified as necessary. The guide groove 31c may be provided in the second drive rotor 34, and the insertion projection 34d may be provided in the first drive rotor 31. Similarly, the accommodating groove 46g and the two guide grooves 46h may be formed in the second drive rotor 44 of the fifth clutch 40 and the two insertion projections 44e may be provided in the first clamping plate 46. Alternatively, the insertion projections 44e may be formed in the second clamping plate 47.

The urging member holding the second drive rotor 34 at the predetermined relative rotating position with respect to the first drive rotor 31 is not limited to the coil spring 37, but may be springs other than the coil-shaped spring. The urging member may be formed by elastic material other than a spring.

In the same manner as the first clutch 30 according to the first embodiment, the fifth clutch 40 according to the fifth embodiment may me modified in various other forms. Further, configuration of the fifth clutch 40 may be applied to configuration of the first clutch 30.

The urging member that maintains the second drive rotor 44 of the fifth clutch 40 at a predetermined rotational position relative to the first clamping plate 46 does not necessarily have to be the compression coil spring 49. The urging member may be a spring having a shape other than the coiled shape or any suitable elastic component other than the spring. Alternatively, the total of six coil springs 37 of the first clutch 30 may be replaced by the single compression coil spring 49 of the fifth clutch 40.

The second urging member that urges the roller members 43 of the fifth clutch 40 in radial inward directions does not necessarily have to be the tension coil spring 51. The second urging member may be a spring other than a coil or any suitable elastic component other than the spring. The tension coil spring 51 does not necessarily have to be received in the interior of the second drive rotor 44 but may be exposed from such interior or arranged in the first clamping plate 46 or the second clamping plate 47.

It is possible to modify, as necessary, the shape of each of the members of the second clutch 142, that is, the drive rotor 61, the driven rotor 62, the contact member 63, the support plate 64, the coil spring 65, and the fixed gear 67. It is possible to modify, as necessary, the shape of each of the members of the third clutch 143, that is the driven rotor 71 and the fixed gear 72. It is possible to modify the number of the contact member 63 and the number or the coil spring 65. The fixed gears 67 and 72 may be omitted.

The drive rotor 61, the contact member 63, the support plate 64 and the fixed gears 67 and 72 are not limited to be made of resin, but may be made of metal. The driven rotor 62 is not limited to be made of metal, but may be made of resin.

The fixed gears 67 and 72 are not limited to be fixed to the brush holder 7, but may be integrally formed in the brush holder 7. In the case of being integrally formed, it is preferable that the fixed gears 67 and 72 be made of the same material as the brush holder 7. Further, the fixed gears 67 and 72 may be fixed to the gear housing 21. The fixed gears 67 and 72 may be made of the same material as the gear housing 21 so as to be integrally formed with the gear housing 21.

It is possible to modify, as necessary, the shape of each of the members of the fourth clutch 144, that is, the drive rotor 81, the driven rotor 82, the coupling plate 83, the support pin 86, and the coil spring 87. The support pin 86 is not limited to be assembled in the drive rotor 81, but may be integrally formed in the drive rotor 81 or the rotary shaft 10. The support pin 86 may be assembled in the driven rotor 82. The support pin 86 may be integrally formed in the driven rotor 82 or the worm shaft 22. It is possible to reverse the recess/protrusion relation between the coupling plate 83 and the drive rotor 81, and the recess/protrusion relation between the coupling plate 83 and the fixed plate 84. The number of the recesses and protrusions may be modified as necessary.

The drive rotor 81, the driven rotor 82, the coupling plate 83 and the support pin 86 are not limited to be made of metal, but may be made of resin. The fixed plate 84 is not limited to be made of resin, but may be made of metal.

The fixed plate 84 is not limited to be fixed to the brush holder 7, but may be integrally formed in the brush holder 7. In this case, it is preferable that the fixed plate 84 be made of the same material as the brush holder 7. The fixed plate 84 may be fixed to the gear housing 21. The fixed plate 84 may be made of the same material as the gear housing 21, and the fixed plate 84 may be integrally formed with the gear housing 21.

The speed reducing mechanism 3 is not limited to the structure having the worm shaft 22 and the worm wheel 23.

The first clutch 30 to the fifth clutch 40 are not limited to be arranged between the rotary shaft 10 and the worm shaft 22, but may be arranged, for example, between the worm wheel 23 and the output shaft 23a. Further, the first clutch 30 to the fifth clutch 40 may be arranged between the output shaft 23a and the drive pulley (not shown) around which the wire cable 55 is wound.

The door opening and closing apparatus 150 in which the motor device 1 is assembled, is not limited to open and close the slide door 152 in the side surface of the vehicle, but may be structured as a vehicle back door opening and closing apparatus for opening and closing a back door in a rear portion of the vehicle. The back door is rotatably supported to the vehicle. In the case of the back door opened and closed in a vertical direction, a comparatively great operating force is necessary for manually opening and closing, in the same manner as the slide door 152. Accordingly, a great significance is obtained by reducing the rotary load of the output shaft 23a on the basis of the shut off of the motor main body 2 with respect to the worm shaft 22 by each of the first clutch 30 to the fifth clutch 40. The motor device 1 may be applied to the other apparatuses than the door opening and closing apparatus 150.

The invention claimed is:

1. A clutch arranged between a drive shaft and a driven shaft, in which the driven shaft is arranged coaxially with the drive shaft, the clutch couples the drive shaft to the driven shaft when the drive shaft is in a drive state, the clutch shuts off the driven shaft from the drive shaft when the drive shaft is in a non-drive state, the clutch comprises:

a first drive rotor which is integrally rotatable with the drive shaft, the first drive rotor being arranged coaxiall with the drive shaft;

a second drive rotor provided coaxially with the first drive rotor;

an urging member arranged between the first drive rotor and the second drive rotor, the urging member holding the second drive rotor at a predetermined relative rotational position with respect to the first drive rotor;

a driven rotor which is integrally rotatable with the driven shaft, the driven rotor being arranged coaxially with the driven shaft; and a power transmitting member arranged between the first drive rotor and the driven rotor, and between the second drive rotor and the driven rotor, with respect to a radial direction, the power transmitting member being movable among a first clamping position, a second clamping position, and a non-engaging position, the non-engaging position being at an inner side in a radial direction relative to the first clamping position and the second clamping position, the first drive rotor and the driven rotor clamping the power transmitting member located at the first clamping position, the second drive rotor and the driven rotor clamping the power transmitting member located at the second clamping position, the first drive rotor and the driven rotor not clamping the power transmitting member located at the non-engaging position, and the second drive rotor and the driven rotor not clamping the power transmitting member located at the non-engaging position, wherein when the drive shaft is in a non-drive state, the power transmitting member exists at the non-engaging position, so that the second drive rotor is in a non-engaging state with the driven rotor with respect to its own rotating direction, and wherein when the drive shaft is in a drive state, a rotating force of the first drive rotor is transmitted to the second drive rotor through the urging member, so that the second drive rotor is rotated, and the power transmitting member revolves accordingly, a centrifugal force caused by the revolution arranges the power transmitting member at the second clamping position, the second drive rotor receives a reaction force from the driven rotor via the power transmitting member, so that the second drive rotor is relatively rotated in an opposite direction to the rotating direction of the first drive rotor with respect to the first drive rotor, against the urging force of the urging member, and the power transmitting member is arranged at the first clamping position, so that the first drive rotor is engaged with the driven rotor with respect to its own rotating direction, wherein the first drive rotor has a restricting surface portion, and wherein, with the first drive rotor and the second drive rotor clamping the power transmitting member, the restricting surface portion restricts radial inward movement of the power transmitting member toward the non-engaging position.

2. A clutch arranged between a drive shaft and a driven shaft, in which the driven shaft is arranged coaxially with the drive shaft, the clutch couples the drive shaft to the driven shaft when the drive shaft is in a drive state, the clutch shuts off the driven shaft from the drive shaft when the drive shaft is in a non-drive state, the clutch comprises:

a first drive rotor which is integrally rotatable with the drive shaft, the first drive rotor being arranged coaxially with the drive shaft;

a second drive rotor provided coaxially with the first drive rotor;

an urging member arranged between the first drive rotor and the second drive rotor, the urging member holding the second drive rotor at a predetermined relative rotational position with respect to the first drive rotor;

a driven rotor which is integrally rotatable with the driven shaft, the driven rotor being arranged coaxiall with the driven shaft; and a power transmitting member arranged between the first drive rotor and the driven rotor, and between the second drive rotor and the driven rotor, with respect to a radial direction, the power transmitting member being movable among a first clamping position, a second clamping position, and a non-engaging position, the non-engaging position being at an inner side in a radial direction relative to the first clamping position and the second clamping position, the first drive rotor and the driven rotor clamping the power transmitting member located at the first clamping position, the second drive rotor and the driven rotor clamping the power transmitting member located at the second clamping position, the first drive rotor and the driven rotor not clamping the power transmitting member located at the non-engaging position, and the second drive rotor and the driven rotor not clamping the power transmitting member located at the non-engaging position, wherein when the drive shaft is in a non-drive state, the power transmitting member exists at the non-engaging position, so that the second drive rotor is in a non-engaging state with the driven rotor with respect to its own rotating direction, and wherein when the drive shaft is in a drive state, a rotating force of the first drive rotor is transmitted to the second drive rotor through the urging member, so that the second drive rotor is rotated, and the power transmitting member revolves accordingly, a centrifugal force caused by the revolution arranges the power transmitting member at the second clamping position, the second drive rotor receives a reaction force from the driven rotor via the power transmitting member, so that the second drive rotor is relatively rotated in an opposite direction to the rotating direction of the first drive rotor with respect to the first drive rotor, against the urging force of the urging member, and the power transmitting member is arranged at the first clamping position, so that the first drive rotor is engaged with the driven rotor with respect to its own rotating direction, wherein one of the first drive rotor and the second drive rotor has an accommodating groove in which the urging member is accommodated and a pair of arcuate guide grooves extending in the circumferential direction continuously from the accommodating groove, the other one of the first drive rotor and the second drive rotor including a pair of insertion projections each received in one of the guide grooves, the insertion grooves guiding rotation of the second drive rotor relative to the first drive rotor, the urging member being located between the insertion projections, and wherein the rotation of the second drive rotor relative to the first drive rotor causes the urging member to receive an urging force from one of the insertion projections, whereby maintaining the second drive rotor at the predetermined rotational position relative to the first drive rotor.

3. A clutch arranged between a drive shaft and a driven shaft, in which the driven shaft is arranged coaxially with the drive shaft, the clutch couples the drive shaft to the driven shaft when the drive shaft is in a drive state, the clutch shuts off the driven shaft from the drive shaft when the drive shaft is in a non-drive state, the clutch comprises:

a first drive rotor which is integrally rotatable with the drive shaft, the first drive rotor being arranged coaxiall with the drive shaft;

a second drive rotor provided coaxially with the first drive rotor;

an urging member arranged between the first drive rotor and the second drive rotor, the urging member holding the second drive rotor at a predetermined relative rotational position with respect to the first drive rotor;

a driven rotor which is integrally rotatable with the driven shaft, the driven rotor being arranged coaxially with the driven shaft; and a power transmitting member arranged between the first drive rotor and the driven rotor, and between the second drive rotor and the driven rotor, with respect to a radial direction, the power transmitting member being movable among a first clamping position, a second clamping position, and a non-engaging position, the non-engaging position being at an inner side in a radial direction relative to the first clamping position and the second clamping position, the first drive rotor and the driven rotor clamping the power transmitting member located at the first clamping position, the second drive rotor and the driven rotor clamping the power transmitting member located at the second clamping position, the first drive rotor and the driven rotor not clamping the power transmitting member located at the non-engaging position, and the second drive rotor and the driven rotor not clamping the power transmitting member located at the non-engaging position, wherein when the drive shaft is in a non-drive state, the power transmitting member exists at the non-engaging position, so that the second drive rotor is in a non-engaging state with the driven rotor with respect to its own rotating direction, and wherein when the drive shaft is in a drive state, a rotating force of the first drive rotor is transmitted to the second drive rotor through the urging member, so that the second drive rotor is rotated, and the power transmitting member revolves accordingly, a centrifugal force caused by the revolution arranges the power transmitting member at the second clamping position, the second drive rotor receives a reaction force from the driven rotor via the power transmitting member, so that the second drive rotor is relatively rotated in an opposite direction to the rotating direction of the first drive rotor with respect to the first drive rotor, against the urging force of the urging member, and the power transmitting member is arranged at the first clamping position, so that the first drive rotor is engaged with the driven rotor with respect to its own rotating direction, the clutch further comprising a second urging member, wherein the second urging member urges the power transmitting member toward the non-engaging position, and wherein the second urging member is set in such a manner as to allow the power transmitting member to move toward the first clamping position and the second clamping position due to a centrifugal force produced through revolution of the power transmitting member.

4. The clutch according to claim 3, wherein the second urging member is accommodated in the interior of the second drive rotor.

5. A clutch arranged between a drive shaft and a driven shaft, in which the driven shaft is arranged coaxially with the drive shaft, the clutch couples the drive shaft to the driven shaft when the drive shaft is in a drive state, the clutch shuts off the driven shaft from the drive shaft when the drive shaft is in a non-drive state, the clutch comprises:

a first drive rotor which is integrally rotatable with the drive shaft, the first drive rotor being arranged coaxially with the drive shaft;

a second drive rotor provided coaxially with the first drive rotor;

an urging member arranged between the first drive rotor and the second drive rotor, the urging member holding the second drive rotor at a predetermined relative rotational position with respect to the first drive rotor;

a driven rotor which is integrally rotatable with the driven shaft, the driven rotor being arranged coaxiall with the driven shaft; and a power transmitting member arranged between the first drive rotor and the driven rotor, and between the second drive rotor and the driven rotor, with respect to a radial direction, the power transmitting member being movable among a first clamping position, a second clamping position, and a non-engaging position, the non-engaging position being at an inner side in a radial direction relative to the first clamping position and the second clamping position, the first drive rotor and the driven rotor clamping the power transmitting member located at the first clamping position, the second drive rotor and the driven rotor clamping the power transmitting member located at the second clamping position, the first drive rotor and the driven rotor not clamping the power transmitting member located at the non-engaging position, and the second drive rotor and the driven rotor not clamping the power transmitting member located at the non-engaging position, wherein when the drive shaft is in a non-drive state, the power transmitting member exists at the non-engaging position, so that the second drive rotor is in a non-engaging state with the driven rotor with respect to its own rotating direction, and wherein when the drive shaft is in a drive state, a rotating force of the first drive rotor is transmitted to the second drive rotor through the urging member, so that the second drive rotor is rotated, and the power transmitting member revolves accordingly, a centrifugal force caused by the revolution arranges the power transmitting member at the second clamping position, the second drive rotor receives a reaction force from the driven rotor via the power transmitting member, so that the second drive rotor is relatively rotated in an opposite direction to the rotating direction of the first drive rotor with respect to the first drive rotor, against the urging force of the urging member, and the power transmitting member is arranged at the first clamping position, so that the first drive rotor is engaged with the driven rotor with respect to its own rotating direction, wherein the first drive rotor has a first drive plate and a second drive plate that are arranged at opposing sides of the second drive rotor, and wherein the first drive plate and the second drive plate transmit power to the driven rotor.

* * * * *